US005990904A

United States Patent [19]
Griffin

[11] Patent Number: 5,990,904
[45] Date of Patent: Nov. 23, 1999

[54] METHOD AND SYSTEM FOR MERGING PIXEL FRAGMENTS IN A GRAPHICS RENDERING SYSTEM

[75] Inventor: Kent E. Griffin, Bellevue, Wash.

[73] Assignee: Microsoft Corporation, Redmond, Wash.

[21] Appl. No.: 08/672,425

[22] Filed: Jun. 27, 1996

Related U.S. Application Data

[63] Continuation-in-part of application No. 08/560,114, Nov. 17, 1995, abandoned, which is a continuation of application No. 08/511,553, Aug. 4, 1995, abandoned.

[51] Int. Cl.⁶ .................................................... G06F 15/00
[52] U.S. Cl. ........................................................ 345/435
[58] Field of Search ................................ 345/430–2, 426, 345/136, 149–50, 153, 435

[56] References Cited

U.S. PATENT DOCUMENTS

| | | | |
|---|---|---|---|
| 4,631,690 | 12/1986 | Corthout et al. | 364/518 |
| 4,645,459 | 2/1987 | Graf et al. | 434/43 |
| 5,287,438 | 2/1994 | Kellher | 345/432 |
| 5,295,235 | 3/1994 | Newman | 345/433 |
| 5,299,298 | 3/1994 | Elmquist et al. | 345/421 |
| 5,363,475 | 11/1994 | Baker et al. | 345/422 |
| 5,392,385 | 2/1995 | Evangelist et al. | 345/431 |
| 5,488,684 | 1/1996 | Gharahorlii et al. | 345/423 |
| 5,522,018 | 5/1996 | Takeda et al. | 345/422 |
| 5,561,752 | 10/1996 | Jevans | 345/433 |
| 5,563,989 | 10/1996 | Billyard | 345/426 |
| 5,586,234 | 12/1996 | Sakuraba et al. | 345/430 |
| 5,596,686 | 1/1997 | Duluk, Jr. | 345/122 |
| 5,598,517 | 1/1997 | Watkins | 345/441 |
| 5,613,048 | 3/1997 | Chen et al. | 345/419 |
| 5,630,043 | 5/1997 | Uhlin | 345/425 |
| 5,634,850 | 6/1997 | Kitahara et al. | 463/33 |
| 5,651,104 | 7/1997 | Cosman | 345/428 |
| 5,673,401 | 9/1997 | Volk et al. | 345/327 |
| 5,684,935 | 11/1997 | Demesa, III et al. | 345/419 |
| 5,684,939 | 11/1997 | Foran et al. | 345/431 |
| 5,710,876 | 1/1998 | Peercy et al. | 345/426 |
| 5,729,669 | 3/1998 | Appleton | 345/422 |
| 5,729,672 | 3/1998 | Ashton | 345/426 |
| 5,742,749 | 4/1998 | Foran et al. | 345/426 |

OTHER PUBLICATIONS

Akerly, Kurt, "RealityEngine Graphics", *ACM Siggraph, Conference Proceedings*, pp. 109–116, Aug. 1–6, 1993.

Bae, Seong–Ok, et al, "Patch Rendering: A New Parallel Hardware Architecture for Fast Polygon Rendering", *Circuits and Systems, 1991 IEEE International Symposium*, pp. 3070–3073, 1991.

Bergman, et al "Image Rendering by Adaptive Refinement", *ACM Siggraph '86*, vol. 20, No. 4, pp. 29–37, Aug. 18–22, 1986.

Bove, Jr., V. Michael, et al, "Real–Time Decoding and Display of Structured Video", *IEEE Multimedia, 1994 international Conference*, pp. 456–462, 1994.

Chen, Chein–Liang, et al, "A Raster Engine for Computer Graphics and Image Compositing", *Abstract, APCCAS '94, IEEE*, pp. 103–108, Dec. 5–8, 1994.

Chrysanthou, Y and Slater, M, "Computing Dynamic Changes to BSP Trees", *Computer graphics Forum*, vol. II, No. 3, Conference Issue, pp. C–321 to C–342, Sep. 7–11, 1992.

(List continued on next page.)

*Primary Examiner*—Phu K. Nguyen
*Attorney, Agent, or Firm*—Klarquist Sparkman Campbell Leigh & Whinston LLP

[57] ABSTRACT

A method for merging pixel fragments to reduce memory usage in a graphics rendering system. In rendering a graphics scene, geometric primitives of objects in the scene are rasterized to create pixel data including pixel fragments representing partially covered pixels. Lists of pixel fragments having color, depth, and coverage data are stored in a fragment buffer. When a new fragment is generated, an attempt is made to merge the fragment with the last fragment stored for a corresponding pixel location. Fragments are merged if they are within predefined depth and color tolerances.

23 Claims, 29 Drawing Sheets

OTHER PUBLICATIONS

Collaborative work, "Pixel–Planes", *Pixel Planes Home Page*, uri—http://www.cs.unc.edu/~pxpl/, University of North Carolina, pp. 1–25, update, Sep. 26, 1995.

Crawfis, Roger A., et al, "A Scientific Visualization Synthesizer", *Visualization, 1991 Conference*, pp. 262–267, 1991.

Deering, "Explorations of Display Interfaces for Virtual Reality", *IEEE Virtual Reality*, 1993 International Symposium, pp. 141–147, 1993.

Deering, Michael, et al, "Leo: A System for Cost Effective 3D Shaded Graphics", *ACM Siggraph, Conference Proceedings*, pp. 101–108, Aug. 1–6, 1993.

Foley, James D., et al, "Computer Graphics: Principles and Practices", *Addison–Wesley Publishing Co., 2nd ed.* pp. 806–813, 855–921, 1990.

Haeberli, Paul, et al, "The Accumulation Buffer: Hardware Support for High–Quality Rendering", *ACM Computer Graphics*, vol. 24, No. 4, pp. 309–318, Aug. 1990.

Heb, Andreas, et al, "Three Dimensional Reconstruction of Brains from 2–Deoxyglucose Serial Section Autoradiographs", *Image Processing*, 1994 International Conference, vol. 3, pp. 290–294, 1994.

Hu, Lincoln, "Computer Graphics in Visual Effects", *COMPCON Spring '92, IEEE Computer Society International Conference*, pp. 472–474, 1992.

Mcmillan, Leonard, et al, "Plenoptic Modeling: An Image–Based Rendering System", *ACM Siggraph, Conference Proceedings*, pp. 39–46, Aug. 6–11, 1995.

Oak Technology WARP5 Press Releases, "Oak Technology Sets New Standard for 3D Realism with Breakthrough WARP 5 Chip Architecture", Atlanta, GA, Jun. 19, 1997.

Regan, Matthew and Ronald Pose, "A Interactive Graphics Display Architecture", *IEEE Virtual Reality, 1993 International Symposium*, pp. 293–299, 1993.

Regan, Matthew and Ronald Pose, "Priority Rendering with a Virtual Reality Address Recalculation Pipeline", *ACM Siggraph, '94, Computer Graphics Proceedings, Annual Conference Series*, pp. 155–162, 1994.

Regan, Matthew and Ronald Pose, "Low Latency Virtual Reality Display System", *Technical report No. 92/166*, Monash University, Victoria, Australia, pp. 1–13, Sep. 1992.

Reichlen, "Sparcchair: A One Hundred Million Pixel Display", *IEEE Virtual Reality, 1993 International Symposium*, pp. 300–307, May 28, 1993.

Runyon, Kenneth R., "Advanced Graphics Processor", *Digital Avionics System, 1993 Conference*, pp. 394–399, 1993.

Slater, Mel, et al, "Liberation from Flatland: 3D Interaction Based on the Desktop Bat", *Eurographics '91*, pp. 209–221, 1991.

Slater, Mel, et al, "Liberation from Rectangle: A Tiling Method for Dynamic Modification of Objects on Raster Displays", *Eurographics '88, Conference date*, Sep. 12–16, 1988, pp. 381–392, 1988.

Slater, Mel, "An Algorithm to support 3D Interaction on Relatively Low Performance Graphics Systems", *Comput. & Graphics*, vol. 16, No. 3, pp. 311–315, 1992.

Slater, Mel, "Segments on Bit–mapped Graphics Displays", *Software—Practice and Experience*, vol. 16(II), pp. 965–980, Nov. 1986.

Tan, Wee–Chiew, et al, "Low–Power polygon Renderer for Computer Graphics", *Application Specific Array Processors, 1993 International Conference*, pp. 200–213, 1993.

Torborg, Jay, et al, "Talisman: Commodity Realtime 3D Graphics for the PC", *ACM Siggraph, Conference Proceedings*, pp. 353–363, Aug. 4–9, 1996.

Yoo, Terry S., et al, "Direct Visualization of Volume Data", *IEEE Computer Graphics and Applications Magazine*, vol. 12, No. 4, pp. 63–71, Jul. 92.

Blythe, David, et al, "10 Different Shadow Flavors", *Advanced Programming with OpenGL, accessed on internet on May 5, 1998*, http://www–europe.sgi.com/Technology/OpenGL/advanced/node45.htm, updated May 21, 1997.

The NuGraf Developer's 3D Toolkit, "A Technical White Paper", Mar. 1995, accessd on the internet on May 5, 1998, http://www.okino.com/toolkit/overview/main.htm.

"The Accumulation Buffer: Hardware Support for High–Quality Rendering", by P. Haeberli and K. Akeley, *Computer Graphics*, vol. 24, No. 4, Aug. 1990, pp. 309–318.

"The A–buffer, an Antialiased Hidden Surface Method", by Loren Carpenter, *Computer Graphics*, vol. 18, No. 3, Jul. 1984, pp. 103–108.

"A New Simple and Efficient Antialiasing with Subpixel Masks", by Andreas Schilling, *Computer Graphics*, Vo. 25, No. 4, Jul. 1991, pp. 133–141.

"Exact: Algorithm and Hardware Architecture for an Improved A–Buffer", by A. Schilling and W. Strasser, *Computer Graphics* Proceedings, Annual Conference Series, 1993, pp. 85–91.

METHOD AND SYSTEM FOR MERGING PIXEL FRAGMENTS IN A GRAPHICS RENDERING SYSTEM

REFERENCE TO PRIOR APPLICATIONS

This is a continuation-in-part of application Ser. No. 08/560,114, filed Nov. 17, 1995, now abandoned application Ser. No. 08/560,114 is a continuation of application Ser. No. 08/511,553, filed Aug. 4, 1995, which is now abandoned.

TECHNICAL FIELD

The invention generally relates to graphics rendering systems that generate pixel fragments to perform anti-aliasing, and more specifically relates to a method and system for generating and storing fragment data.

BACKGROUND

Graphics rendering refers generally to the process of generating a two-dimensional image from graphical models. A graphical model defines attributes of a real or imaginary object which are to be represented in a rendered image. These attributes include, for example, color, shape, and position of an object in a graphics scene. In the process of rendering these models, a graphics system generates a display image, which is comprised of an array of pixel data.

A pixel is a point or picture element in a display device, and in the context of graphics processing, also corresponds to a point in the two-dimensional space to which the graphical models are rendered. Each pixel element of a rendered image includes one or more data values describing attributes of the pixel used to display it. For instance in color graphics, this pixel data can include intensity values for color components that give the pixel element its color. The intensity values stored in an array of pixel elements are then used to display the array on physical output device such as a raster display device.

Graphics processing is often classified by the dimension of the models to be rendered to an image. For instance, two-dimensional graphics processing ("2-D graphics") refers to the generation of an image from graphical models having two dimensions (x and y coordinates) and three-dimensional graphics processing ("3-D graphics") refers the processing of three-dimensional models.

Graphics processing can also be classified as "real-time" which means that 1) the display image is updated so that the user perceives continuous motion of the objects in the scene; and 2) there is minimal and predictable "transport delay" between user input, which change the position of objects or the viewpoint of the scene, and the display of an image in response to this input. To achieve this affect, objects in the scene, must be rendered within a predefined period of time.

In 3-D graphics applications, an object in a scene is represented by a 3-D graphical model, which includes geometric data used to model the surface and position of the object, and visual attributes used to model the appearance of the object. There are a number of ways that a geometric model can represent a 3-D object, including polygon meshes, parametric surfaces, or quadratic surfaces. Using a polygon mesh, for example, the surface of an object is modeled with several interconnected polygons,. The surface elements, in this case polygons, are referred to as geometric primitives. Visual attributes such as red, green, and blue color data, and possibly other model data is stored at the vertices of the polygon.

In the rendering process, the geometric primitives corresponding to objects in a scene are processed to generate a display image. In the context of 3-D graphics, the rendering process includes transforming the graphical models in a scene, and rasterizing the geometric primitives in the models to generate pixel data. In some systems, this pixel data is processed further to enhance image quality. The final product of the rendering process is a display image comprised of a collection of pixel values. To display the image, these pixel values are transferred from a memory buffer, such as a frame buffer, to a display controller.

The typical graphics processing system includes a physical output device that displays rendered images. Although other forms of display devices have been developed, the predominant technology today is referred to as raster graphics. A raster display device includes an array of individual points or picture elements (i.e., pixels), arranged in rows and columns, to produce the image. In a CRT, these pixels correspond to a phosphor array provided on the glass faceplate of the CRT. The emission of light from each phosphor in the array is independently controlled by an electron beam that "scans" the array sequentially, one row at a time, in response to stored information representative of each pixel in the image. The array of pixel values that map to the screen is often referred to as a bitmap or pixmap.

The rendering process typically begins by transforming the vertices of the geometric primitives to prepare the model data for the rasterizing step. While the specific details of the transformation phase varies, a few examples will illustrate the process. The modeling transform, in some systems, is used to convert the vertices of a model from the model's local coordinates to world coordinates, the coordinates in which a complete scene is represented. The next step is to determine potentially visible objects in a 3-D space referred to as the view volume. This step is commonly performed in view reference coordinates, which describes object locations relative to a viewpoint or eyepoint. Objects that are not potentially visible at this stage can be disregarded while objects that are at least partially in the view volume are "clipped" to the view volume.

After transforming the objects, the geometric primitives for the objects are "rasterized" or "scan converted." Rasterizing refers generally to the process of computing a pixel value for a pixel in the image being rendered based on data from the geometric primitives that project onto or "cover" the pixel. Rasterizing is sometimes referred to as "tiling" because of the analogy to tiling a floor. Imagine that the pixels are square elements or tiles, and that a polygon is the floor plan. The rasterizing step includes tiling this floor plan by computing pixel values for the pixels or "tiles" within the polygon. The pixel values can include, for example, intensity values representing the red, green, and blue (R, G, B) color components of a pixel.

While there are a number of ways to raisterize a geometric primitive, this process generally involves computing a pixel intensity value or values based on the data from a primitive that projects onto or "covers" a pixel. For example, color values stored at the vertices of a polygon can be interpolated to find a color value at a given pixel. During this process, lighting and shading models can also be used to compute pixel values for pixels across the surface of the polygon.

From the tiling analogy above, it is clear that discrete pixels cannot precisely represent continuous surfaces. For example, a polygon may only partially cover a pixel region. In this case, the edge or edges of a polygon cross over the pixel region. If the pixel were approximated as being fully covered by this polygon, anomalies such as jaggy edges in the rendered image would likely result. A technique known generally as anti-aliasing attempts to address this problem. In general, anti-aliasing is used to compute pixel intensities for partially covered pixels to reduce the discontinuities introduced by representing a continuos object with a discrete array of pixels.

In a given 3-D graphics scene, a number of polygons may project onto the same area of the view space, and some of these polygons may occlude others. As such, some primitives may not be "visible" in the scene. Hidden surface removal is the process of determining which objects or portions of objects are, and conversely, are not visible in the scene. There are a number of approaches to hidden surface removal. Some approaches involve pre-sorting primitives before the rasterizing step. Examples of these types of approaches include: 1) sorting primitives and then rendering the primitives in back to front order so that pixels for visible objects overwrite pixels for occluded objects; and 2) sorting primitives in depth order *and then clipping the primitives relative to each other to eliminate hidden portions of the primitive. Of course there are a number of variations to these examples as well as a variety of additional examples.

These approaches are generally not preferred because they are computationally complex and therefore consume precious processing resources. Additional processing is required to sort the primitives in the scene before the rasterizing step. For real-time systems where objects are in motion from scene to scene, the computations required to sort and/or clip primitives makes them untenable alternatives. In any practical system, there is a trade-off between image quality and computational complexity. If the hidden surface removal technique is complex, yet does not improve image quality relative to other alternatives, it is not an acceptable solution.

In other approaches, the primitives are not sorted before scan conversion, but instead, the pixel data generated from the scan conversion process includes depth values used to perform hidden surface removal. The Z-buffer is one such approach. The Z-buffer includes an array having elements for storing pixel data including depth values for every pixel location in a display image. As geometric primitives are rasterized, the depth value for newly generated pixel data is compared with a depth value of pixel data stored in the z buffer. If the newly generated pixel data is closer to the viewpoint, it is written over the current values in the Z-buffer for the corresponding pixel location. If :not, it is disregarded.

The primary advantages of the Z-buffer approach are computational speed and simplicity. However, by itself, the Z-buffer approach provides no support for dealing with partially covered pixels or translucent pixels.

One improvement to the Z-buffer approach is known as the A-buffer and is described in: L. Carpenter "The A-Buffer, An Anti-Aliased Hidden Surface Method," in *Computer Graphics*, SIGGRAPH '84 proceedings, July 1984, Vol. 18, No. 3, pp. 103–108.

In this approach, polygons are clipped into fragments at the boundaries of a pixel region. For example, assume a pixel is represented as a square. If 3-sided polygon (triangle) partially covers this square, a pixel fragment is generated to represent the portion of the triangle covering the square. A bit mask, created by exclusive ORing masks representing polygons edges, is used to describe how a polygon partially covers the pixel region.

In the A-buffer approach, there are two different data types representing pixel data. One type data type, called a "pixelstruct," is used to store color and depth of a fully covered pixel, and a pointer to a depth sorted fragment list for partially covered pixels. The other data type is called a "fragment," which can store a pointer to the next fragment in a linked list, color, opacity, area, an object tag, a pixel mask, and a range of z values. Pixelstructs are stored in an array having the size and shape of the final image.

Geometric prirnitives are rasterized to generate the pixel data in the pixelstruct array and fragment lists. After the pixel data is generated for the pixelstruct array, the pixels having fragment lists are processed in a technique called "packing." Packing refers to the process of computing pixel values from a depth sorted fragment list.

The primary advantage of the A-buffer approach is that it supports high-quality anti-aliasing and translucency computations. The A-buffer improves the general Z-buffer approach so that anti-aliasing for partially covered pixels and translucency for non-opaque pixels can both be supported.

One problem with the A-buffer approach is that it requires additional memory to store the fragment lists. The memory required to store fragments for an entire frame of image data can be enormous. The Carpenter paper refers to a software implementation where the pixelstruct array is "paged in software to save virtual memory space." This approach assumes that the computer system used to render an image has enough memory to store fragments generated during the rendering process.

Carpenter uses a technique referred to as fragment merging in which two or more fragments are combined into a single fragment. According to Carpenter, "merging two or more fragments simplifies the data structure and reclaims the space used by the merged-in fragments." Carpenter's approach merges fragments if they have the same object tag and overlap in Z. The object tag identifies an object from which the fragment originates and also includes data indicating whether the surface of the object faces forward or backward. While not described fully in the paper, the Z overlap appears to refer to the case where the range of z values overlap for fragment merge candidates.

In Carpenter's approach, the test to determine whether to merge a fragment is performed "whenever a new fragment is added to the pixelstruct list."

While fragment merging can reduce memory consumption, Carpenter's approach has a number of drawbacks. Every fragment must have an object tag. This complicates the rasterizing process because the object tag, including data indicating a front or back facing surface, must be determined and stored for each fragment. In addition, Carpenter's method has to maintain a Zmax and Zmin value for each fragment, which complicates processing and requires more storage. Carpenter further suggests that fragments should be maintained in a sorted order. While this can improve the efficiency by reducing the number of fragments that need to be examined to merge a fragment, this type of sorting further complicates the fragment generation process.

Carpenter describes fragment processing in terms of a software implementation, which cannot generate images for real-time, interactive applications. While the Carpenter approach is an improvement to the Z-buffer algorithm, it is extremely difficult to implement in a real-time system. In a real-time system, each pixel must be processed very quickly so that a new image can be generated within rigorous timing constraints. In Carpenter's A-buffer approach, this is not a concern because it is only used to compute images in a non-real time software system.

SUMMARY OF THE INVENTION

The invention provides an improved method and a hardware system for merging pixel fragments. One embodiment of the invention is implemented in a real-time graphics rendering system. In this embodiment, geometric primitives are rasterized to generate pixel data including pixel fragments for pixels partially covered by geometric primitives. The pixel fragments are stored in lists corresponding to a pixel locations in an image. When a new pixel fragment is generated, an attempt is made to merge this pixel fragment with one or more previously generated pixel fragments stored for the pixel location. If the color and depth of the newly generated fragment are within predefined tolerances of the color and depth of a stored fragment in the list for the pixel location, then the newly generated and stored fragments are merged.

One specific implementation of the invention includes a rasterizer, a pixel engine, a pixel buffer and a fragment buffer. The rasterizer receives geometric primitives and generates instances of pixel data, including color, depth., and coverage data. The pixel engine controls the transfer of the pixel data to the pixel and fragment buffers. The pixel buffer comprises an array of elements corresponding to pixel locations, and each element stores color and depth data for fully covered pixels closest to the viewpoint. The fragment buffer stores color, depth, and coverage data for partially covered pixels. If pixel fragments are generated for a given pixel location, the pixel buffer element corresponding to that location stores a pointer to the head of a list of the pixel fragments in the fragment buffer.

The pixel engine performs a depth compare operation on newly generated pixel data. If a generated pixel is occluded by the pixel in the pixel buffer, it is discarded. If the generated pixel is a fully covered pixel and is not occluded by the pixel in the pixel buffer, it replaces the pixel in the pixel buffer. Candidates for pixel fragment merging include generated pixel fragments not occluded by a fully covered pixel at the pixel location of the generated pixel fragments. The color and depth of a candidate pixel fragment are checked to determine whether they are within predefined tolerances of the most recent fragment added to the list at the pixel location of the fragment. If so, the pixel engine merges the two fragments and stores the merged fragment at the head of the list. In one specific implementation, the pixel engine also determines whether the alpha of a generated and the most recent fragment are within a pre-determined tolerance before merging the two fragments.

A system designed according to the invention has several advantages. One advantage to this approach is that it reduces the storage requirement to support fragment list processing. This approach does not require storage of an object tag or two depth values for each fragment. Another important advantage is that fragments can be resolved faster because there are generally fewer fragments to resolve.

Specifically attempting to merge an incoming fragment with the most recent fragment generated during the rasterizing process is advantageous because the most frequent fragment is a likely merge candidate. In addition, merging with the most recent fragment saves hardware and clock cycles because it does not require fragment depth sorting or searching of the fragment list for each incoming fragment. The vast majority of candidates for fragment merging originate from geometric primitives that are adjacent to each other. Since adjacent geometric primitives are typically rasterized in close proximity to each other, the most recent fragment generated for a pixel location is likely to have common depth and color. Therefore, attempting to merge with the most recent fragment has the potential to save a significant amount of fragment memory.

Further advantages and features of the invention will become apparent with reference to the following detailed description with reference to the accompanying drawings.

DETAILED DESCRIPTION

System Overview

In the following detailed description, we describe several embodiments with reference to an image processing system.

The image processing system supports real time image rendering and generation for both graphics and video processing. Due to the novel architecture and image processing techniques employed in the system, it can produce sophisticated real time 3-D animation at a significant cost savings over present graphics systems. In addition to graphics processing, the system supports video processing such as video editing applications, and can also combine video and graphics. For instance, the system can be used to apply video to graphical objects, or conversely, can be used to add graphical objects to video data.

The system supports a wide range of interactive applications. Its ability to support advanced real time animation makes it well-suited for games, educational applications, and a host of interactive applications. The system supports sophisticated user interfaces including 3-D graphics or combined graphics and video. Improving upon the limited graphics capabilities of today's windowing environments for personal computers, the system can support improved 3-D graphical user interfaces for applications ranging from office information processing on desktop computers to interactive television applications in a set-top box. The system makes very efficient use of memory and processor time and therefore can provide impressive image processing and display without unduly hindering performance of the application or responsiveness of the user interface to user actions.

Figure 1:
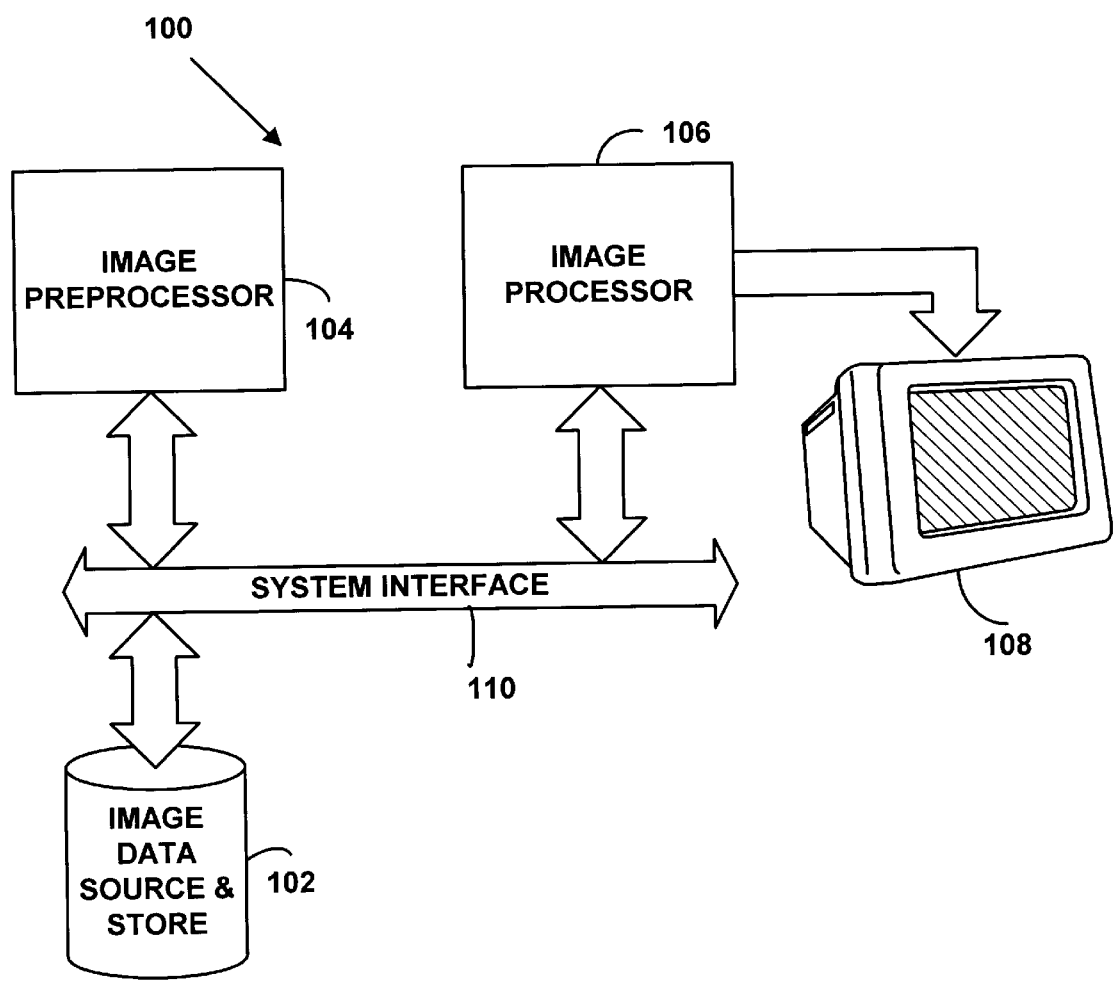
FIG. 1 is a block diagram of an image processing system.

FIG. 1 is a block diagram of the image processing system 100. The image processing system comprises an image data source and store 102, an image preprocessor 104, an image processor 106, and a display device 108, if immediate display of rendered images is desired. The elements in the system communicate through a system interface 110. The image data source and store 102 supplies image data to the system, and stores image data and commands. The image preprocessor 104 is responsible for manipulating the image data to prepare it for rendering. Examples of preprocessing functions include: defining objects in terms of geometric models, defining lighting and shadowing models, determining object locations, determining the location of a viewpoint and light sources, and geometry processing.

The image processor 106 renders the images, and generates a display image to be displayed on the display device 108. Rendering refers to the process of creating images from models and includes such functions as geometry processing (note that geometry processing can also be a preprocessing function), visible-surface determination, scan conversion, and lighting, to name a few. After rendering an image or parts of an image, the image processor 106 transfers rendered image data to the display device for display.

Below, we describe several features of the image processing system 100 in detail with reference to specific hardware and software architectures. However, it is important to note that the image processing described below can be implemented in a variety of alternative architectures.

The image processing system 100 achieves a vast price-performance improvement over existing high quality 3-D graphics systems known to the inventors. A number of advances in computer graphics contribute to this improvement. These advances include: composited image layers, image compression, chunking, and multi-pass rendering. We introduce these advances here, and describe these and other advances in more detail below.

Composited Image Layers (Gsprites)

In our system, multiple independent image layers may be composited together at video rates to create the output video signal. These image layers, which we refer to as generalized sprites, or gsprites, can be rendered into and manipulated independently. The system will generally use an independent gsprite for each non-interpenetrating object in the scene. This allows each object to be updated independently, so that object update rate can be optimized based on scene priorities. For example, an object that is moving in the distant background may not need to be updated as often, or with as much accuracy, as a foreground object.

Gsprites can be of arbitrary size and shape. In one implementation, we use rectangular gsprites. Pixels in the gsprite have color and alpha (opacity) information associated with them, so that multiple gsprites can be composited together to create the overall scene.

Several different operations may be performed on gsprites at video rates, including scaling, rotation, subpixel positioning, and transformations to mimic motion, such as affine warps. So, while gsprite update rates are variable, gsprite transformations (motion, etc.) may occur at full video rates, resulting in much more fluid dynamics than could be achieved by a conventional 3-D graphics system that has no update rate guarantees.

Many 3-D transformations can be simulated by 2-D imaging operations. For example, a receding object can be simulated by scaling the size of the gsprite. By utilizing 2-D transformations on previously rendered images for intermediate frames, overall processing requirements are significantly reduced, and 3-D rendering power can be applied where it is needed to yield the highest quality results. This is a form of temporal level of detail management.

By using gsprite scaling, the level of spatial detail can also be adjusted to match scene priorities. For example, background objects, cloudy sky, etc., can be rendered into a small gsprite (low resolution) which is then scaled to the appropriate size for display. By utilizing high quality filtering, the typical low resolution artifacts are not as noticeable.

A typical 3-D graphics application (particularly an interactive game) trades off geometric level of detail to achieve higher animation rates. Gsprites allow the system to utilize two additional scene parameters—temporal level of detail and spatial level of detail—to optimize the effective performance as seen by the user. The spatial resolution at which the image of an object is rendered does not have to match the screen resolution at which it will be rendered. Further, the system can manage these trade-offs automatically without requiring application support.

Image Compression

Perhaps the most significant factor in determining system cost and performance is memory. A traditional high-end 3-D graphics system, for example, has over 30 Mbytes of memory, including frame buffers (double buffered), a depth buffer, a texture buffer, and an anti-aliasing buffer. And most of this is specialized memory which is significantly more expensive than DRAM. Memory bandwidth is always a critical bottleneck. The cost of high performance systems are often driven by the need to provide numerous banks of interleaved memory to provide adequate bandwidth for pixel and texture data accesses.

The system broadly applies image compression technology to solve these problems. Image compression has traditionally not been used in graphics systems because of the computational complexity required for high quality, and because it does not easily fit into a conventional graphics architecture. By using a concept we call chunking (described below), we are able to effectively apply compression to images and textures, achieving a significant improvement in price-performance.

In one respect, graphics systems have employed compression to frame buffer memory. High end systems utilize eight bits for each of three color components, and often also include an eight bit alpha value. Low end systems compress these 32 bits per pixel to as few as four bits by discarding information and/or using a color palette to reduce the number of simultaneously displayable colors. This compression results in very noticeable artifacts, does not achieve a significant reduction in data requirements, and forces applications and/or drivers to deal with a broad range of pixel formats.

The compression used in our system can achieve very high image quality yet still provide compression ratios of 10:1 or better. Another benefit of our approach is that a single high quality image format can be used for all applications, as distinguished from the standard PC graphics architecture which requires a trade-off between spatial resolution and color depth.

Chunking

Another significant advance in our system is referred to as chunking. A traditional 3-D graphics system (or any frame buffer for that matter), can be (and is) accessed randomly. Arbitrary pixels on the screen can be accessed in random order. Since compression algorithms rely on having access to a fairly large number of neighboring pixels (in order to take advantage of spatial coherence), compression can only be applied after all pixel updates have been made, due to the random access patterns utilized by graphics algorithms. This makes the application of compression technology to display buffers impractical.

This random access pattern also means that per-pixel hidden surface removal and anti-aliasing algorithms must maintain additional information for every pixel on the screen. This dramatically increases the memory size requirements, and adds another performance bottleneck.

Our system takes a different approach. A scene, or portions of a scene, can be divided into pixel regions (32×32 pixels in one specific implementation), called chunks. In one implementation, the system divides the geometry assigned to gsprites into chunks, but an alternative implementation could perform chunking without gsprites. The geometry is presorted into bins based on which chunk the geometry will be rendered into. This process is referred to as chunking. Geometry that overlaps a chunk boundary is preferably referenced in each chunk it is visible in. As the scene is animated, the data structure is modified to adjust for geometry that moves from one chunk to another.

Chunking provides several significant advantages. The use of chunking provides an effective form of compression. Since all the geometry in one chunk is rendered before proceeding to the next, the depth buffer need only be as large as a single chunk. By using a relatively small chunk size such as 32×32 pixels, the depth buffer can be implemented directly on the graphics rendering chip. This eliminates a considerable amount of memory, and also allows the depth buffer to be implemented using a specialized memory architecture which can be accessed with very high bandwidth and cleared during double buffer operations, eliminating the traditional frame buffer memory clearing overhead between frames.

Anti-aliasing is also considerably easier since each chunk can be dealt with independently. Most high-end Z-buffered graphics systems which implement anti-aliasing utilize a great deal of additional memory, and still perform relatively simplistic filtering. With chunking however, the amount of data required is considerably reduced (by a factor of 1000), allowing practical implementation of a much more sophisticated anti-aliasing algorithm.

In addition to Z-buffering and anti-aliasing, the system can also simultaneously support translucency in a correct and seamless manner. While a chunk is being built, the system can perform both anti-aliasing and translucency computations on another chunk. In other words, in the time required to build a chunk, the system can perform anti-aliasing and translucency processing on another chunk. The system can "ping-pong" between chunks, and thus perform sophisticated processing without adding delay in processing an image for real time applications.

Yet another advantage is that chunking enables block oriented image compression. Once a chunk has been rendered (and anti-aliased), it can then be compressed with a block transform based compression algorithm. Therefore, in addition to the compression achieved from rendering chunks separately, chunking supports more sophisticated and adaptable compression schemes.

Multi-Pass Rendering

Another advantage of the architecture of our system is the opportunity for 3-D interactive applications to break out of the late 1970's look of CAD graphics systems: boring lambertian Gouraud-shaded polygons with Phong highlights. Texture mapping of color improves this look but imposes another characteristic appearance on applications. In the 1980's, the idea of programmable shaders and procedural texture maps opened a new versatility to the rendering process. These ideas swept the off-line rendering world to create the high-quality images that we see today in film special effects.

The rigid rendering pipelines and fixed rendering modes of today's typical high-end 3-D graphics workstations make it impossible to implement such effects without drastic reductions in real-time performance. As a result, users who require real-time display must put up with the limited rendering flexibility.

By reducing the bandwidth requirements using the techniques outlined above, the system of the present invention can use a single shared memory system for all memory requirements including compressed texture storage and compressed gsprite storage. This architecture allows data created by the rendering process to be fed back through the texture processor to use as data in the rendering of a new gsprite. Because of this support for feedback, the system can perform efficient multi-pass rendering.

By coupling efficient multi-pass rendering with a variety of compositing modes and a flexible shading language, the system can provide a variety of rendering effects in real-time that have previously been the domain of off-line software renderers. This includes support of functions such as shadows (including shadows from multiple light sources), environment mapped reflective objects, spot lights, ground fog, realistic underwater simulation, etc.

In one embodiment, the image processing system (100) includes a combination of software and hardware. In the following section, we describe the system environment below with reference to a hardware and software architecture. Where possible, we describe alternative architectures. However, the software and hardware architectures can vary, and therefore are not limited to the specific examples provided below.

The image processing system, or portions of it, can be implemented in a number of different platforms including desktop computers, set-top boxes, and game systems.

Figure 2:
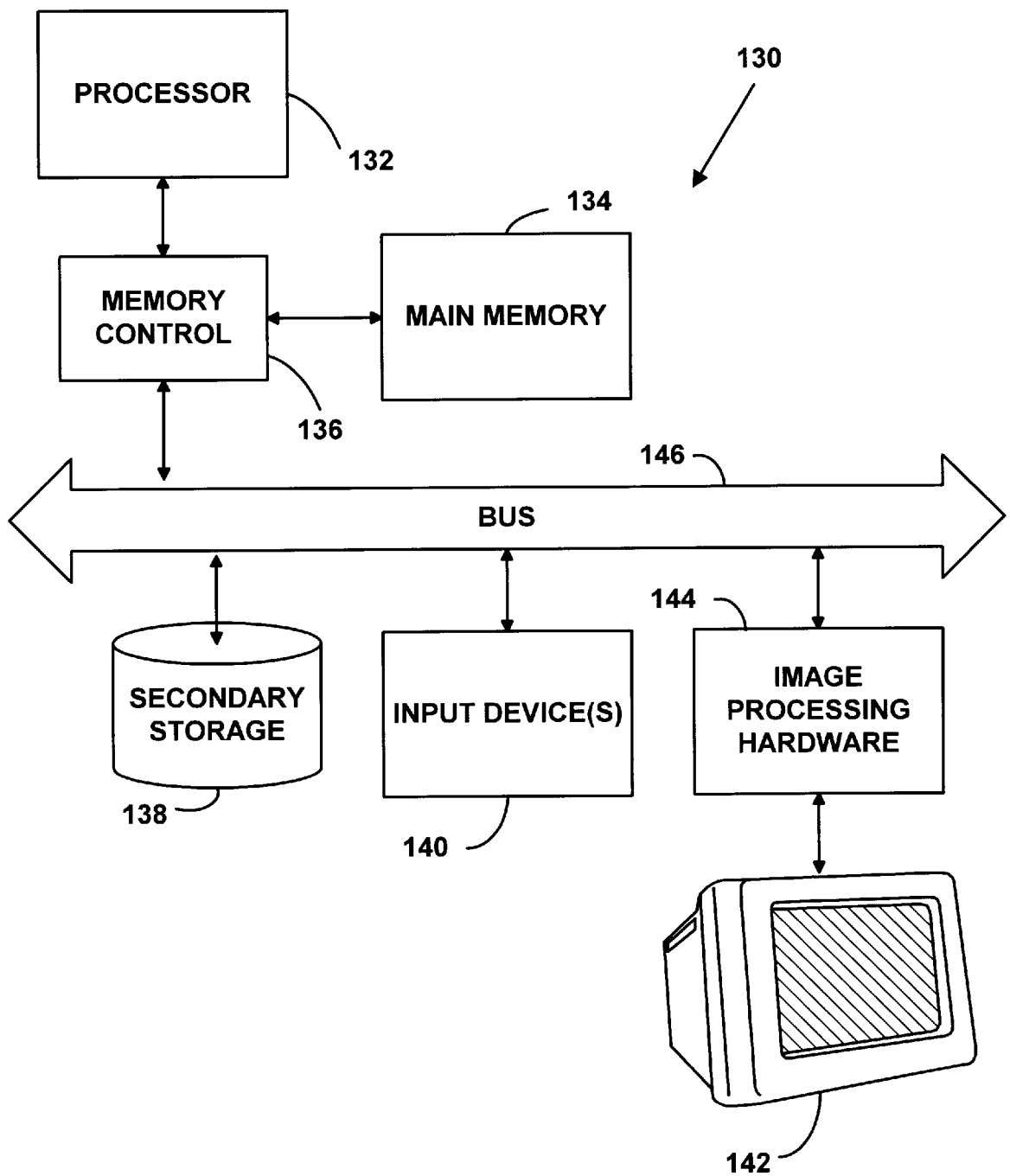
FIG. 2 is a block diagram of the system environment for an embodiment of the invention.

FIG. 2 is a block diagram of a computer system 130 in which the image processing system can be implemented. The computer system 130 includes a processor 132, main memory 134, memory control 136, secondary storage 138, input device(s) 140, display device 142, and image processing hardware 144. Memory control 136 serves as an interface between the processor 132 and main memory 134; it also acts as an interface for the processor 132 and main memory 134 to the bus 146.

A variety of computer systems have the same or similar architecture as illustrated in FIG. 2. The processor within such systems can vary. In addition, some computer systems include more than one processing unit. To name a few, the processor can be a Pentium or Pentium Pro processor from Intel Corporation, a microprocessor from the MIPS family from Silicon Graphics, Inc., or the PowerPC from Motorola.

Main memory 134 is high speed memory, and in most conventional computer systems is implemented with random access memory (RAM). Main memory can interface with the processor and bus in any of variety of known techniques. Main memory stores 134 programs such as a computer's operating system and currently running application programs. Below we describe aspects of an embodiment with reference to symbolic representations of instructions that are performed by the computer system. These instructions are sometimes referred to as being computer-executed. These aspects of the embodiment can be implemented in a program or programs, comprising a series of instructions stored on a computer-readable medium. The computer-readable medium can be any of the devices, or a combination of the devices described herein, in connection with main memory or secondary storage.

The bus 146 interconnects the memory control 136, secondary storage 138, and the image processing hardware 144. In one implementation for example, the bus is a PCI bus. The PCI standard is well-known, and several computer system boards are designed to support this standard. Computer systems having other bus architectures can also support the image processing system. Examples include an ISA bus, EISA bus, VESA local bus, and the NuBus.

The display device 142 is a color display, with continuous refresh to display an image. The display device in one embodiment is a cathode ray tube (CRT) device, but it can also be a liquid crystal display (LCD) device, or some other form of display device.

The secondary storage device 138 can include a variety of storage media. For example, the secondary storage device can include floppy disks, hard disks, tape, CD-ROM, etc. and other devices that use electrical, magnetic, optical or other recording material.

The input device(s) 140 can include a keyboard, cursor positioning device such as a mouse, joysticks, as well as a variety of other commercially available input devices.

In one implementation detailed below, the image processing hardware 144 is implemented on board that couples with the computer system through a PCI bus. In an alternative implementation, the image processing hardware can be located on a system board along with a processor or other image processing hardware and memory. For example, in a game system, image processing hardware is typically located on the mother board. Similarly, image processing hardware in a set-top box can also be located on the mother board.

While we have outlined the architecture of a computer system, we do not intend to limit our invention to the system architecture illustrated in FIG. 2. Our image processing system can be implemented in game systems, set-top boxes, video editing devices, etc. Below we describe an embodiment of an image processing system in the environment of the system architecture shown in FIG. 2. We describe alternative implementations throughout the following description, but we do not intend our description of alternatives to be a complete listing of other possible implementations. Based on our detailed description below, those having ordinary skill in the art can implement our the image processing system, or aspects of it, on alternative platforms.

Figure 3:
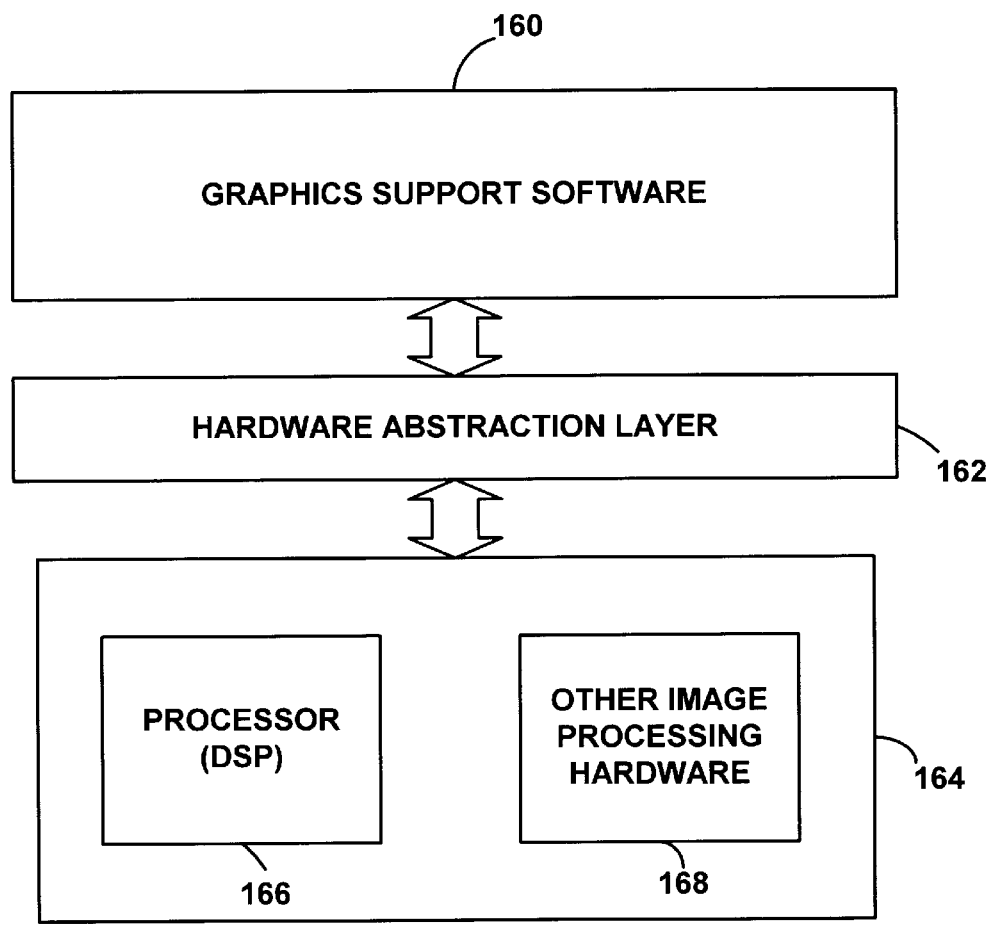
FIG. 3 is a block diagram of system architecture for an embodiment.

FIG. 3 is a block diagram illustrating the relationship between the software and hardware in one embodiment. In this embodiment, the image processing system is implemented using processing resources of the processor of the host computer and the image processing hardware 144. The image processing hardware 144 is implemented on an expansion board 164 which includes a processor (e.g. a Digital Signal Processor) 166 and image processing circuitry 168. The processors of the host computer 130 and the image processing board 164 share image processing tasks. Below we outline generally the functions performed by the host computer 130 and the image processing board 174.

Graphics support software 160 executes on the host computer system 130 and communicates with the image processing board 164 through the hardware abstraction layer (HAL) 162. The image processing board 164 includes a programmable digital signal processor called the DSP 166 and additional image processing hardware 168 detailed below.

The graphics support software 160 can include functions to support memory management, view volume culling, depth sorting, chunking, as well as gsprite allocation, transformation, and level of detail. The graphics support software can include a library of graphics functions, accessible by graphics applications, to perform the functions enumerated here.

The graphics support software 160 includes fuinctions that support the gsprite paradigm introduced above. As indicated above, gsprites are rendered independently, and do not need to be rendered on every frame. Instead, changes in position of a gsprite can be approximated with affine or other transformations. The graphics support software 160 provides functions to help assign an object or objects to a gsprite and to track motion data describing the position and motion of the gsprite. The graphics support software also provides functions to determine when a rendered gsprite needs to be updated. The need to update a gsprite can vary depending on object movement, viewpoint movement, lighting changes, and object collisions.

We provide further detail with respect to the functions of the graphic support software below. The image processing board 164 performs low level geometry processing, including transforms, lighting and shading, texturing, anti-aliasing, translucency, etc. In one embodiment, the DSP 166 is responsible for front end geometry processing and lighting computations, but a number of these functions can be performed by the processor 132 of the host.

Overview of the Image Processing Board

Figure 4A:
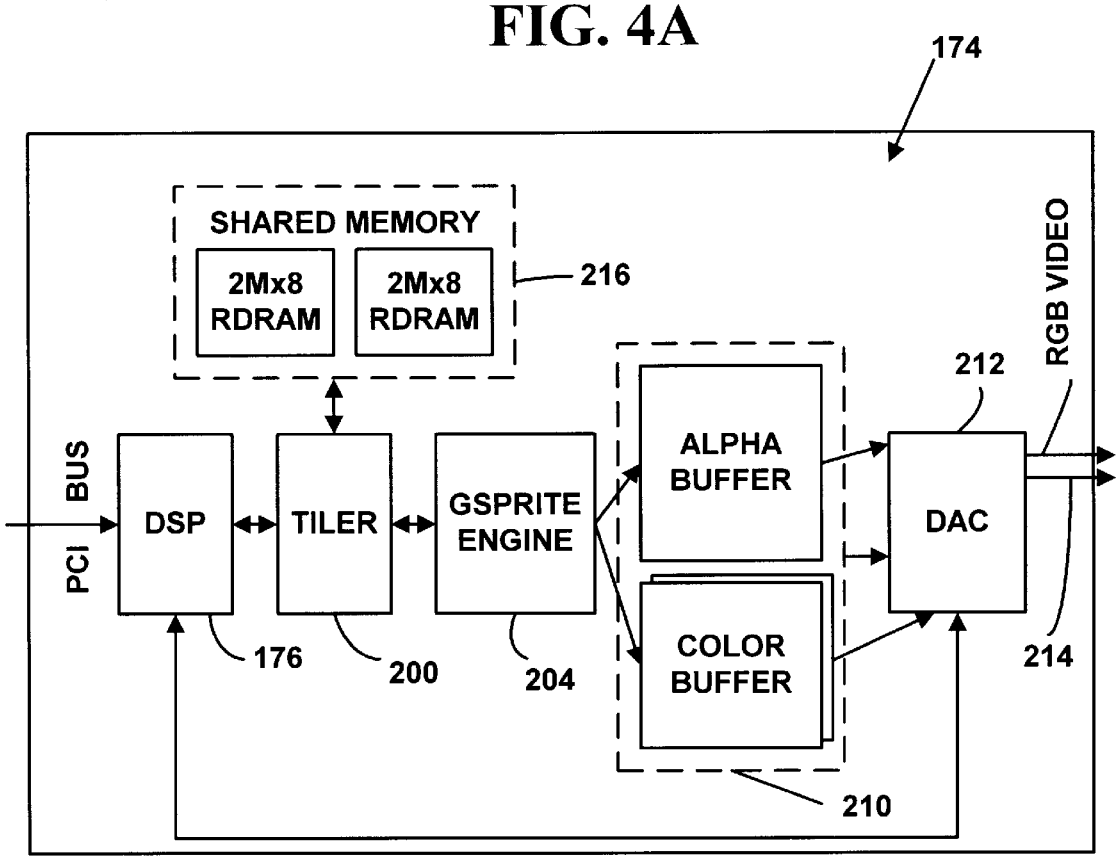
FIG. 4A is a block diagram of image processing hardware for an embodiment.

FIG. 4A is a block diagram illustrating the image processing board 174. The image processing board 174 communicates with the host computer through the bus 146. It includes a DSP 176, tiler 200, shared memory 216, the gsprite engine 204, compositing buffer 210, and a digital-to-analog converter (DAC) 212. The bus 146 (FIG. 2) transfers commands and data between the host and the DSP 176. In response to commands from the host, the image processing board 174 renders images and transfers display images to a display device 142 (FIG. 2) through the DAC 212.

In the embodiment illustrated in FIGS. 2–4A, the host processor and the DSP share the functions of the image preprocessor of FIG. 1. The image processor comprises the tiler 200, gsprite engine 204, compositing buffer 210, and DAC 212. Below, we provide more detail regarding these elements. It should be kept in mind, however, that the implementation of the image processing system can vary.

The shared memory 202 stores image data and image processing commands on the image processing board 174. In one embodiment, the shared memory is used to store gsprite and texture data in compressed form, DSP code and data, and various buffers used to transfer data between processing subsystems.

The DSP 176 is responsible for video compression/decompression and front-end graphics processing (transformations, lighting, etc.). Preferably, the DSP should support floating point and integer computations greater than 1000 MFLOPS/MOPS.

The tiler 200 is a VLSI chip which performs scan-conversion, shading, texturing, hidden-surface removal, anti-aliasing, translucency, shadowing, and blending for multi-pass rendering. The resulting rendered gsprite chunks are then compressed and stored in compressed form in the shared memory. The tiler additionally performs decompression and recompression of gsprite data in support of video and windowing operations.

The gsprite engine 204 operates at video rates to address and decompress the gsprite chunk data and perform the necessary image processing for general affine transformations (which include scaling, translation with subpixel accuracy, rotation, reflection and shearing). After filtering, the resulting pixels (with alpha) are sent to the compositing buffers where display pixel data is calculated.

Gsprite chunk data is processed a number of scan lines at a time for display. In one implementation, chunk data is processed 32 scan lines at a time. The compositing buffer (210) includes two 32 scan line color buffers which are toggled between display and compositing activities. The compositing buffer also includes a 32 scan line alpha buffer which is used to accumulate alpha for each pixel.

The DAC 212 includes a R G B video DAC and corresponding video port 214, to video editing devices. Individual components can be used to implement the functionality of the DAC.

System Operation

Figure 5A:
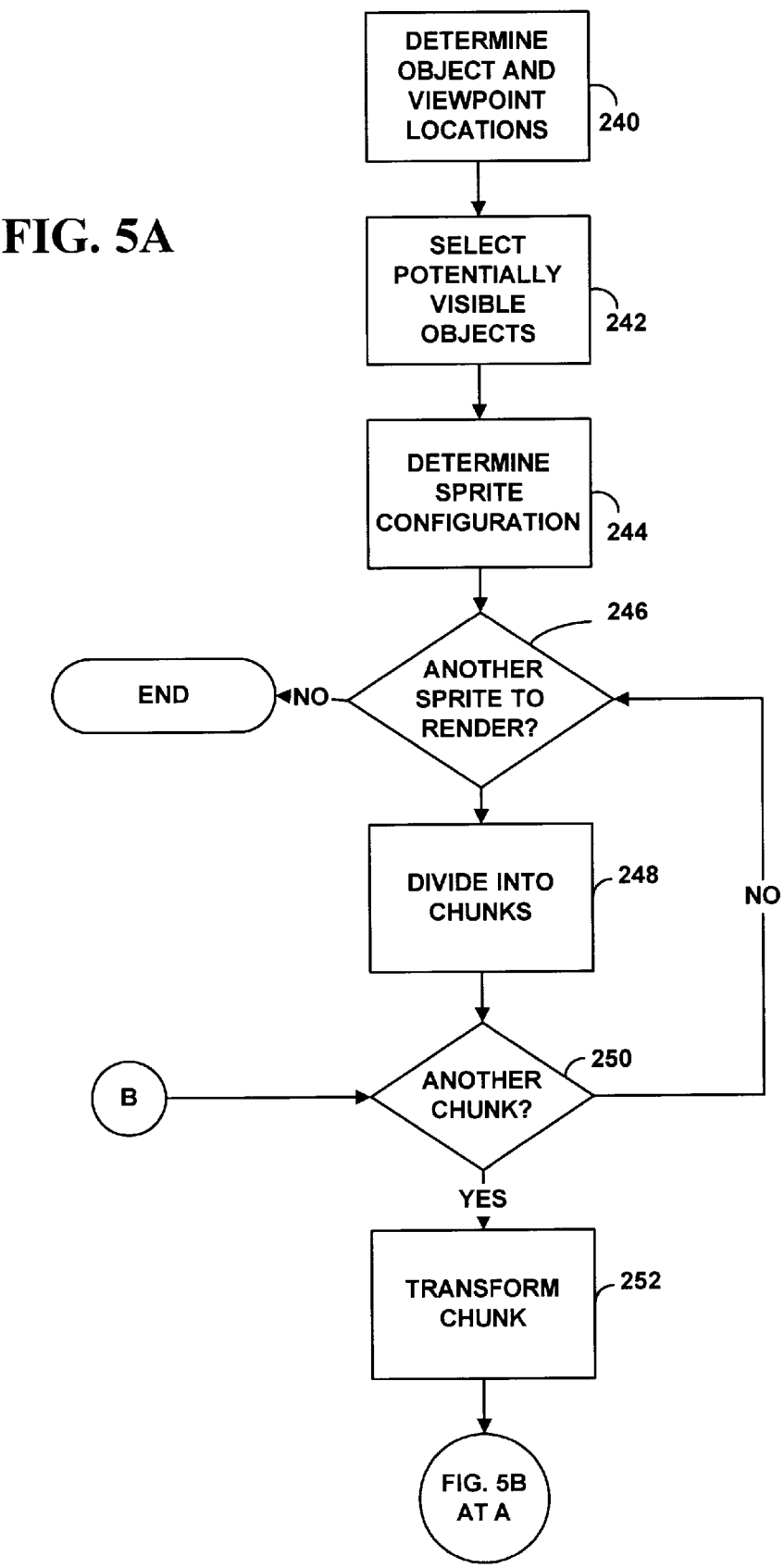
FIGS. 5A and 5B are flow diagrams illustrating an overview of the rendering process in an embodiment.

FIGS. 5A and SB are flow diagrams illustrating steps in rendering an image in the image processing system. Before the image processor 106 begins rendering an image for the view space, the image preprocessor 104 determines object and viewpoint locations (240). In the embodiment illustrated in FIGS. 2 and 3, the graphics support software 160, running in the host computer system 132, determines the object and viewpoint locations from data provided by a graphics application. The graphics application, running on the host processor, defines models representing the relevant objects, and supplies a modeling transform, which is used to place the object with other objects in "world" coordinates.

Next, the image preprocessor 104 selects potentially visible objects (242). It determines potentially visible objects based on the view volume. The view volume is a three-dimensional space in world coordinates that provides the boundaries for a scene. The preprocessor selects potentially visible objects by traversing objects and determining whether their boundaries intersect the view volume. Objects that intersect the view volume are potentially visible in the geometric or spatial sense.

In some cases, it is useful to determine "temporally" potentially visible objects outside the current view volume, to account for future changes in the scene. This enables the system to adjust for rapid changes in the view volume. In typical 3-D graphics systems, the only way to respond to this rapid change is to completely generate a new scene based on the changed input, interposing significant transport delay. Such a long delay has negative effects on the user, creating problems such as over-control and nausea. To reduce this delay, the image preprocessor of the present invention can calculate the location of objects positioned in an extended range outside the visible range, and the image processor can render and store images within this extended range. Using the affine transform capability of the system, viewpoint input for a subsequent frame can be used to reposition the gsprites from this extended range reducing system transport delay to less than 2 computational frames. Such a short transport delay is unachievable with current 3-D graphics hardware systems known to the inventors, and will enable much higher quality simulations with much better user immersion.

The image preprocessor determines the configuration of gsprites for the image (244). This step involves finding how to map potentially visible objects to gsprites. As part of this process, the image preprocessor 104 allocates gsprites, which includes creating a gsprite data structure to store image data corresponding to one or more potentially visible objects. If processing resources allow, each non-interpenetrating object in the scene is assigned to an independent gsprite. Interpenetrating or self-occluding objects may be processed as a single gsprite.

The image preprocessor 104 can aggregate gsprites when the image processor does not have the capacity to composite the gsprites at the desired computational frame rate or there is insufficient system memory to store the gsprites. Rendering to separate gsprites will always be more computationally efficient, so if the system has the memory and compositing capacity, non-intersecting objects should be rendered into separate gsprites. If the system is incapable of storing or generating a display image based on a current assignment of gsprites, some gsprites can be aggregated to alleviate this problem.

After an object or objects are assigned to gsprites, the image processor divides the gsprites into image regions called "chunks" (248). The image preprocessor loops on gsprites and divides the gsprites into chunks (246, 248). In one embodiment, this process includes transforming bounding volumes of objects to the view space and finding rectangular image regions that enclose the transformed bounding volumes. These image regions define the dimensions of the gsprite in terms of the two-dimensional space to which the gsprite's object or objects are rendered. The gsprite is divided into chunks by dividing the rectangular image region into chunks and associating these chunks with the gsprite data structure.

As an optimization, the transformed bounding volume can be scaled and/or rotated so that the number of chunks required to render the gsprite is minimized. Because of this added transformation (scaling or rotating), the space to which the objects assigned to the gsprite are rendered is not necessarily screen space. This space is referred to as gsprite space. In the process of generating a display image, the gsprite should be transformed back to screen space.

The next step is determine how to divide the object geometry among the chunks (250). The image preprocessor determines how the geometric primitives (e.g. polygons) should be divided among the chunks by transforms the polygons to 2-D space (252) and determining which chunk or chunks the polygons project into. Due to the expense of clipping polygons, the preferred approach is to not clip the polygons lying at the edge of a chunk. Instead, a chunk includes polygons that overlap its edge. If a polygon extends over the border of two chunks, for example, in this approach the vertices of the polygon are included in each chunk.

The image preprocessor then queues the chunk data for tiling. Tiling refers to the process of determining pixel values such as color and alpha for pixel locations covered or partially covered by one or more polygons.

Figure 5B:
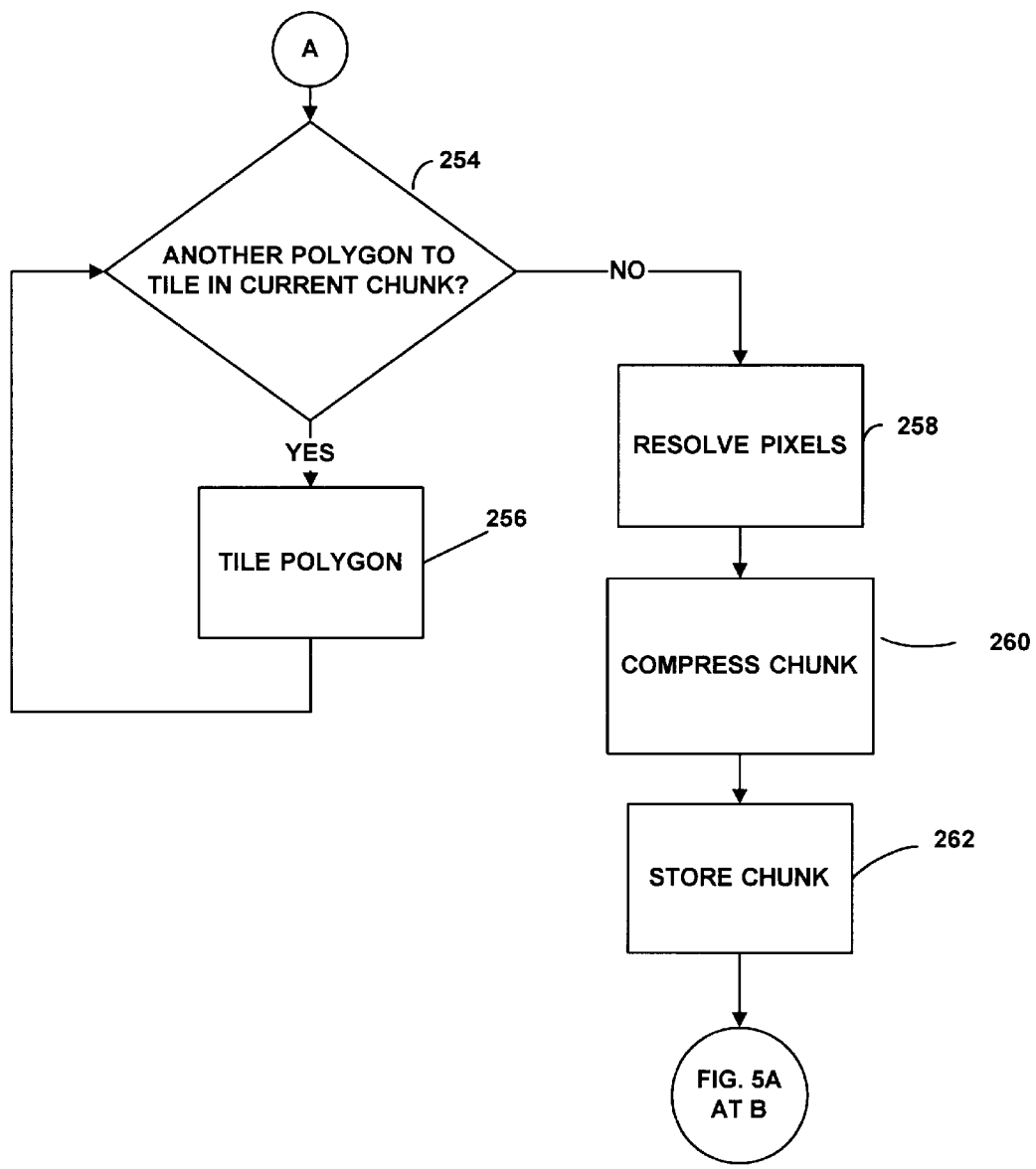

Decision step (254) (FIG. 5B) and the step (256) following it represents the process of tiling the polygons within the chunk. While the image processor has included polygons that overlap the boundaries of the current chunk, it only produces pixels that lie within the chunk. The produced pixels include information for antialiasing (fragment records), which are stored until all pixels have been generated.

After completing the tiling of polygons in a chunk, the image processor resolves the anti-aliasing data (such as fragment records) for the pixels (258). In one embodiment, the tiler 200 uses double buffering to resolve a previous chunk while the next is tiled. Alternatively, the tiler can use a common buffer with a free list. The free list represents free memory in the common buffer that is allocated as new fragment records are generated and added to when fragment records are resolved. A combination of double buffering and common memory can be used as well.

The image processor compresses the resolved chunk using a compression scheme described further below (260). As the image processor resolves a block of pixels, it can compress another block. The image processor stores the compressed chunk in shared memory (262).

Figure 6:
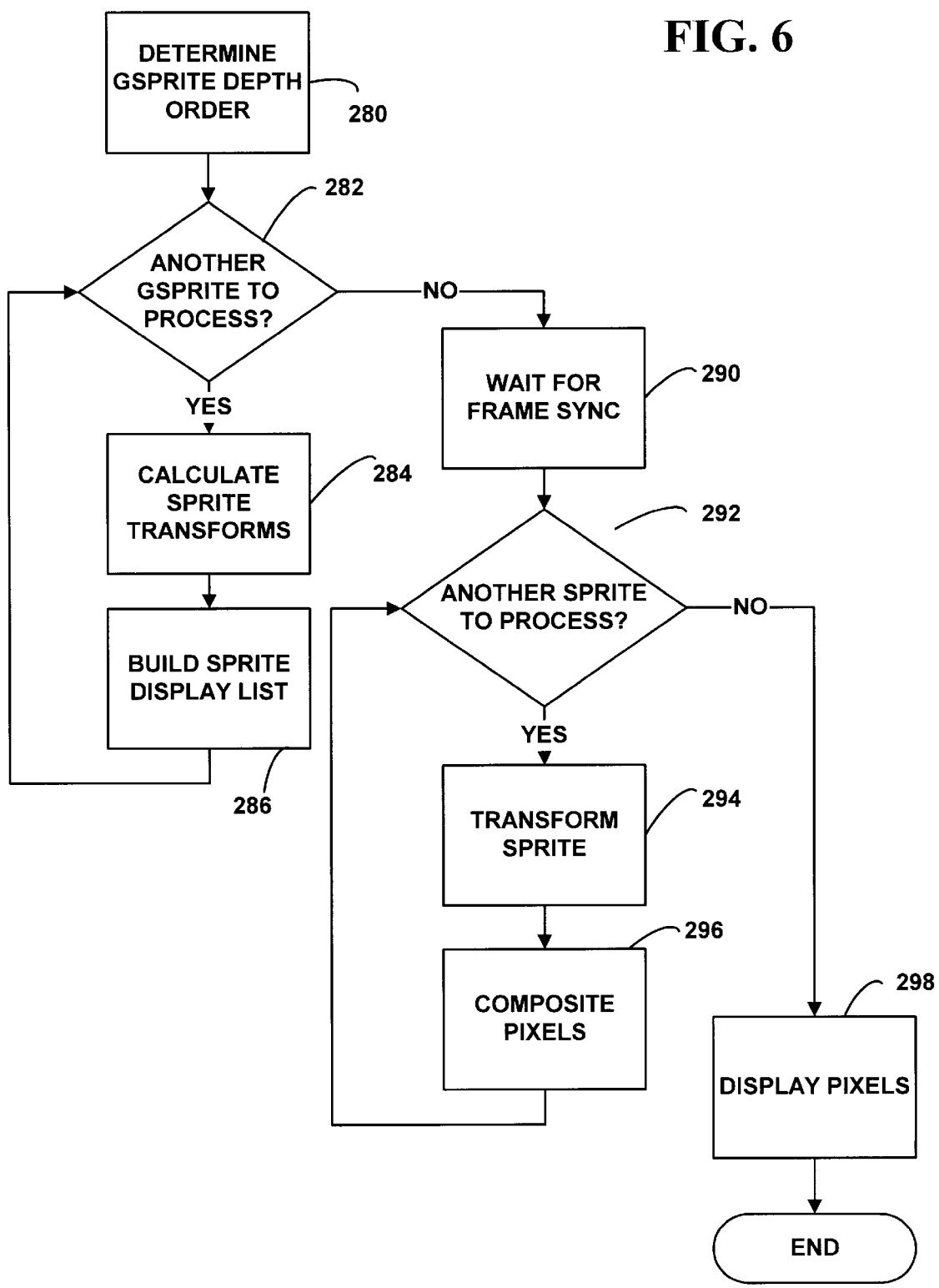
FIG. 6 is a flow diagram illustrating an overview of the display generation process of an embodiment.

FIG. 6 is a flow diagram illustrating the steps executed to display an image. On the image processing board 174 described above, images are read from shared memory 216, transformed to physical output device coordinates by the gsprite engine 204, composited in the compositing buffer 210, transferred to the DAC 212, and then transferred to an output device.

During the display process, the image processor accesses a list of gsprites to be displayed for the current frame. In the process of determining the gsprite configuration, the image preprocessor determines the depth order of gsprites (280). As noted above, one object is preferably assigned to a gsprite. However, the image preprocessor can assign more than one object to a gsprite, for example, to accommodate processing constraints of a particular image processor being used in the system. The image preprocessor sorts objects in Z-order, i.e. in distance from the viewpoint. In addition to sorting objects, it sorts gsprites in depth order as well and stores this depth data in the gsprite data structures.

The decision step (282) in FIG. 6 represents a loop on gsprites in the display process. The steps within this loop can include 1) calculating a transform for a rendered gsprite; and 2) building a gsprite display list to control how gsprites are displayed. These steps are described below.

For gsprites in the potentially visible range, the image processor calculates gsprite transforms. A gsprite transform refers to a transformation on a rendered 2-D gsprite. In one embodiment, the image processor can perform a transformation on a gsprite to reduce rendering overhead. Rather than rendering each object for every frame, the image processor reduces rendering overhead by re-using a rendered gsprite.

It is not necessary to compute a gsprite transform for every frame of image data. For instance, if a gsprite is rendered for the current frame of image data, it may not need to be transformed, unless e.g. the gsprite has been transformed to better match the bounding box for the object. In addition, some gsprites may not need to be re-rendered or transformed because the object or objects assigned to them have not changed and are not moving. As such, the step of transforming a gsprite is optional.

The gsprite may be multiplied by the unity matrix in cases where the position of the gsprite has not changed. This may apply, for example, in cases where the image processor has rendered the gsprite for the current frame, or where the gsprite position has not changed since it was originally rendered.

To specify how gsprites are to be displayed, the image processor creates a gsprite display list. The display list refers to a list or lists that define which gsprites are to be displayed on the display screen. This concept of display list can also apply to other output devices for presenting a frame of image data. The image processor uses the display list in mapping and compositing rendered gsprites to the physical device coordinates. While the step of building the display list is illustrated as part of a loop on gsprites, it is not necessary that the list or lists be generated specifically within this loop.

The display list can refer to a list of gsprites or a list of gsprites per band. A "band" is a horizontal scanline region of a display screen. For instance, in one embodiment a band is 32 scanlines high by 1344 pixels wide. The display list can include a separate list of gsprites for each band, in which case the band lists describe the gsprites impinging on the respective bands. Alternatively, the display list can be comprised of a single list implemented by tagging gsprites to identify which bands the gsprites impinge upon.

The display list in the illustrated embodiment is double-buffered. Double buffering enables the system to generate one display list while it reads another. As the system calculates the gsprite transforms and build the display list for one frame, it reads the display list for another frame and displays the image data in this list.

Because of the double buffering, the steps shown in FIG. 6 are over-lapped: the image preprocessor performs steps (280–286) for one frame while the image processor performs steps (290–298) for another frame.

Figure 7:
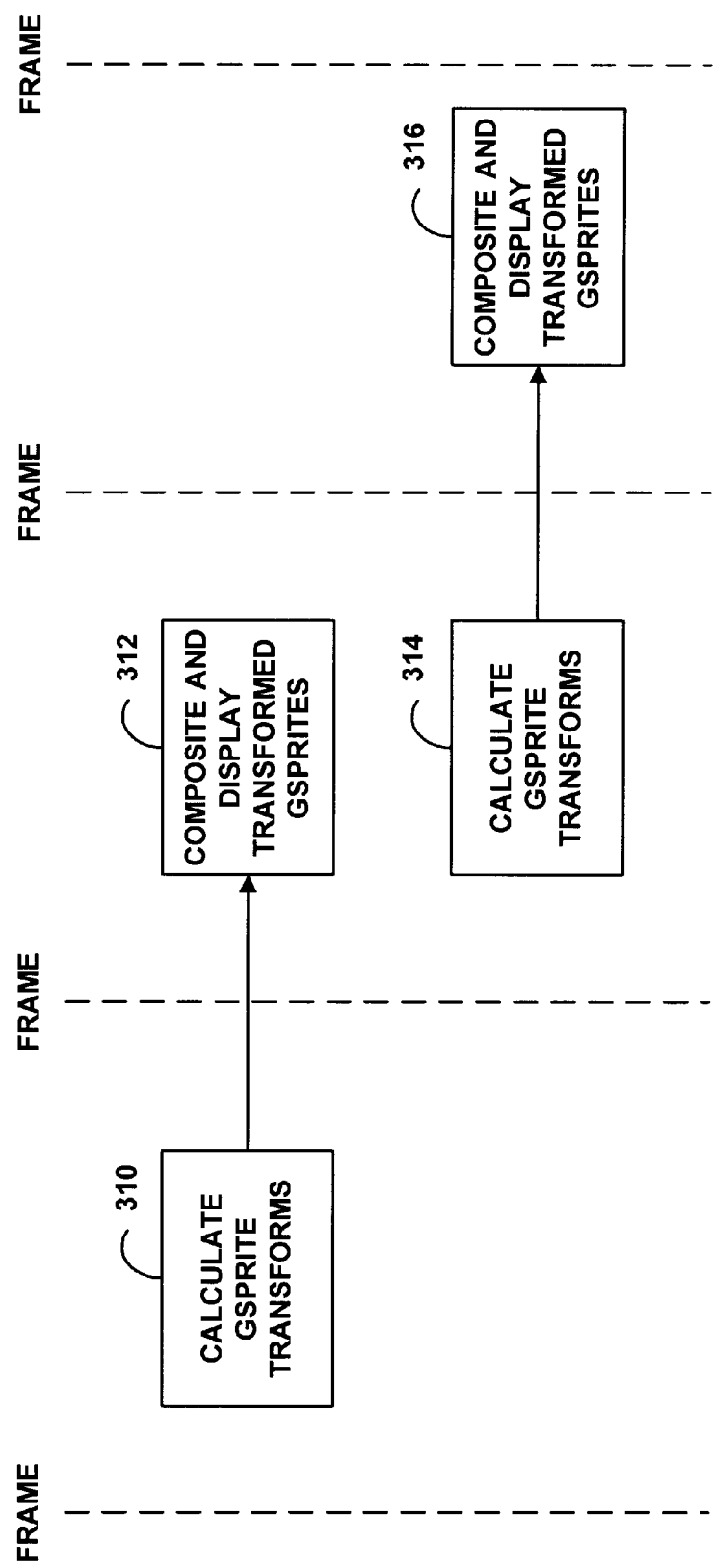
FIG. 7 is a diagram illustrating one aspect of display generation in terms of frame periods in an embodiment.

FIG. 7 is a block diagram illustrating the timing of these steps. After the system completes steps (280–286) (FIG. 6) for a frame 310, it waits for a frame sync signal (vertical retrace) and then performs the buffer swap. The display list it has just created is then used to determine the gsprites to be displayed in the current frame 312. While that display list is processed 312, gsprite transforms are computed and a display list is constructed for a next frame 314. In the next frame, the gsprite transforms and display list that were generated in the previous frame 314 are then used to generate the display image 316.

The image processor converts gsprites to output device coordinates based on the list of gsprites in the display list. The image processor reads gsprite data from shared memory, including color, alpha, and data identifying the gsprite's position. Based on this data, the image processor determines the color and alpha for pixels covered by the gsprite.

In one embodiment, the image processor loops on each band, transforming gsprites that impinge upon that band according to the gsprite display list. We will describe this display process in more detail below.

After transforming gsprite data, the image processor composites the resulting pixel data. This includes computing the color and alpha for pixels in output device coordinates based on the gsprite transforms. The image processor transforms the pixel data for gsprites in the display list and then composites the transformed pixel data. The process involves determining the color and alpha at a pixel location based on the contribution of one or more pixel values from gsprites that cover that pixel location.

In one embodiment, the image processor loops on bands and composites pixel data for each band. The image processor double buffers pixel data: it transforms and composites gsprite data for a band in one buffer while it displays composited pixel data for another band.

After compositing pixel data, the image processor then transfers composited pixel data to an output device. The most typical output device used in connection with this system is, of course, a display. To display the pixel data, it is converted to a format compatible with the display.

Having described system operation of an embodiment, we now provide more detail regarding the image processing board.

The Image Processing Board

In the one embodiment, the shared memory 216 comprises 4 Mbytes of RAM. It is implemented using two 8-bit Ram bus channels. The amount and type of memory can vary, however.

Figure 8:
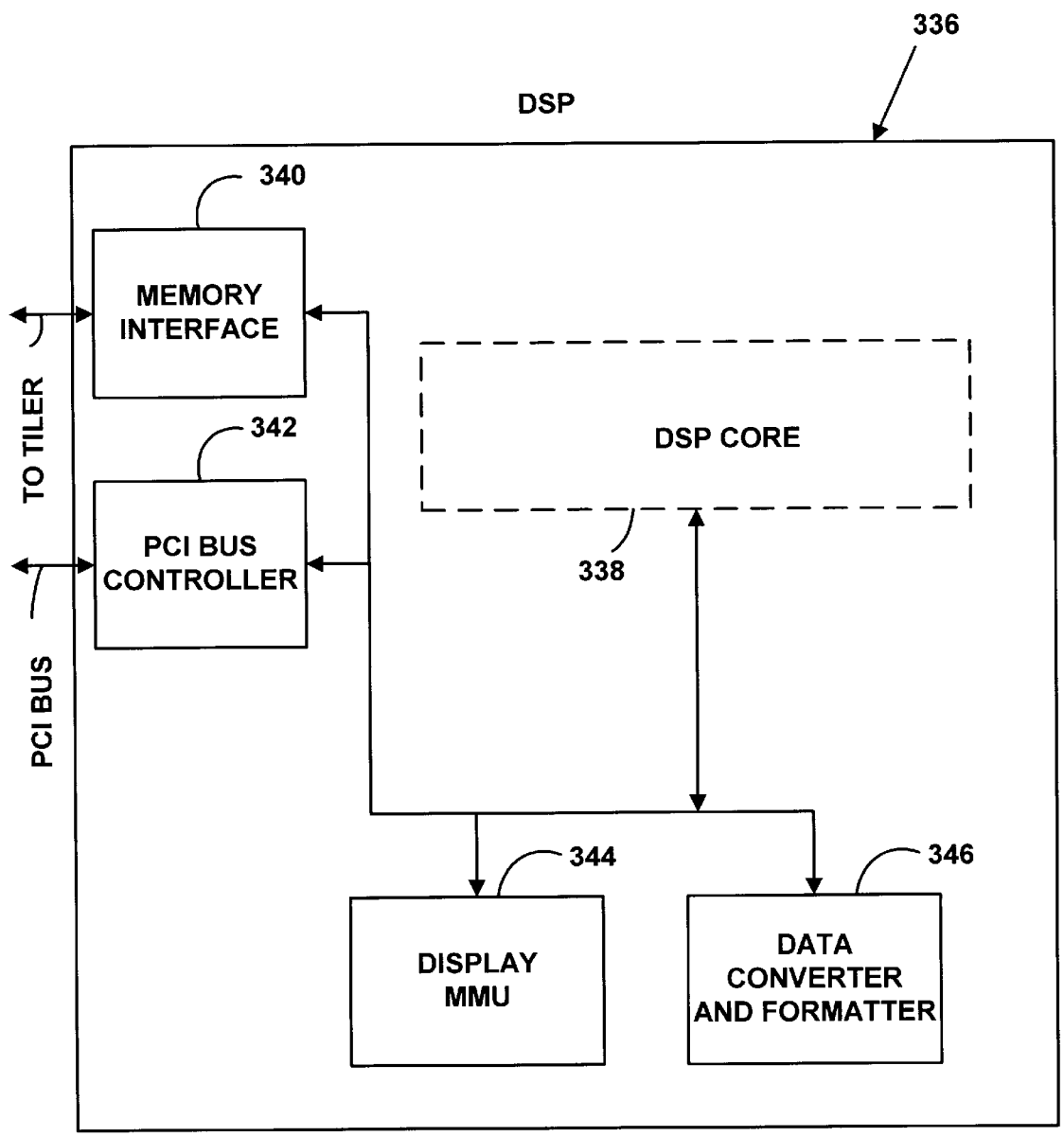
FIG. 8 is a block diagram of a digital signal processor (DSP) in an embodiment.

FIG. 8 is a block diagram illustrating the DSP 336 on the image processing board 174. The DSP 336 is responsible for parsing the command stream from the host processor and performing some video processing, and front end geometry processing. The DSP performs front end geometry and lighting calculations used for 3-D graphics. This includes model and viewing transformations, clipping, and lighting. Portions of the gsprite animation management are also handled in the DSP such as gsprite motion extrapolation.

Rendering commands are stored in main memory buffers and DMAed to the image processing board 174 over the PCI bus and through the PCI bus controller 342. These commands are then buffered in the shared memory 216 on the board until needed by the DSP 336 (FIG. 8).

The DSP core 338 includes a processor for performing the image processing computations described above. In addition the DSP core performs scheduling, and resource management.

The Memory interface 340 supports high speed data transfers, e.g. 64 bits at 80 MHz It is designed to interface with conventional DRAM and SDRAM devices. The tiler 200 is designed to directly connect to this bus, simulating the memory timing required by the DSP.

The data formatter and converter 346 in the DSP formats rendering instructions for the tiler. This block converts floating point color components into integer and packs them into the tiler specific data structures. It also buffers up a complete command and DMAs it directly to a memory buffer in shared memory. These rendering instructions are later read by the tiler when it is ready to perform the operations. Among its formatting tasks, the data formatter and converter 346 formats triangle command data for the tiler. R G B (alpha) data which is calculated by the DSP (336) in floating point is converted to 8 bit integer. Coordinate information is converted from floating point to 12.4 fixed point. The data is packed into 64 bit words and transferred in a contiguous block to the shared memory to optimize bandwidth.

The display memory management unit (MMU) 344 is used for desktop display memory. It traps PCI accesses within a linear address range that is allocated as the desktop display memory. It then maps these accesses to image blocks stored in shared memory.

The architecture of the image processing board (FIG. 4A, 174) is relatively independent of the specific DSP. However, the DSP should preferably have significant floating point performance. Suitable DSPs include the MSP-1 from Samsung Semiconductor and TriMedia from Phillips Semiconductor. These specific DSPs are two examples of DSPs that provide sufficient floating point performance.

Figure 9A:
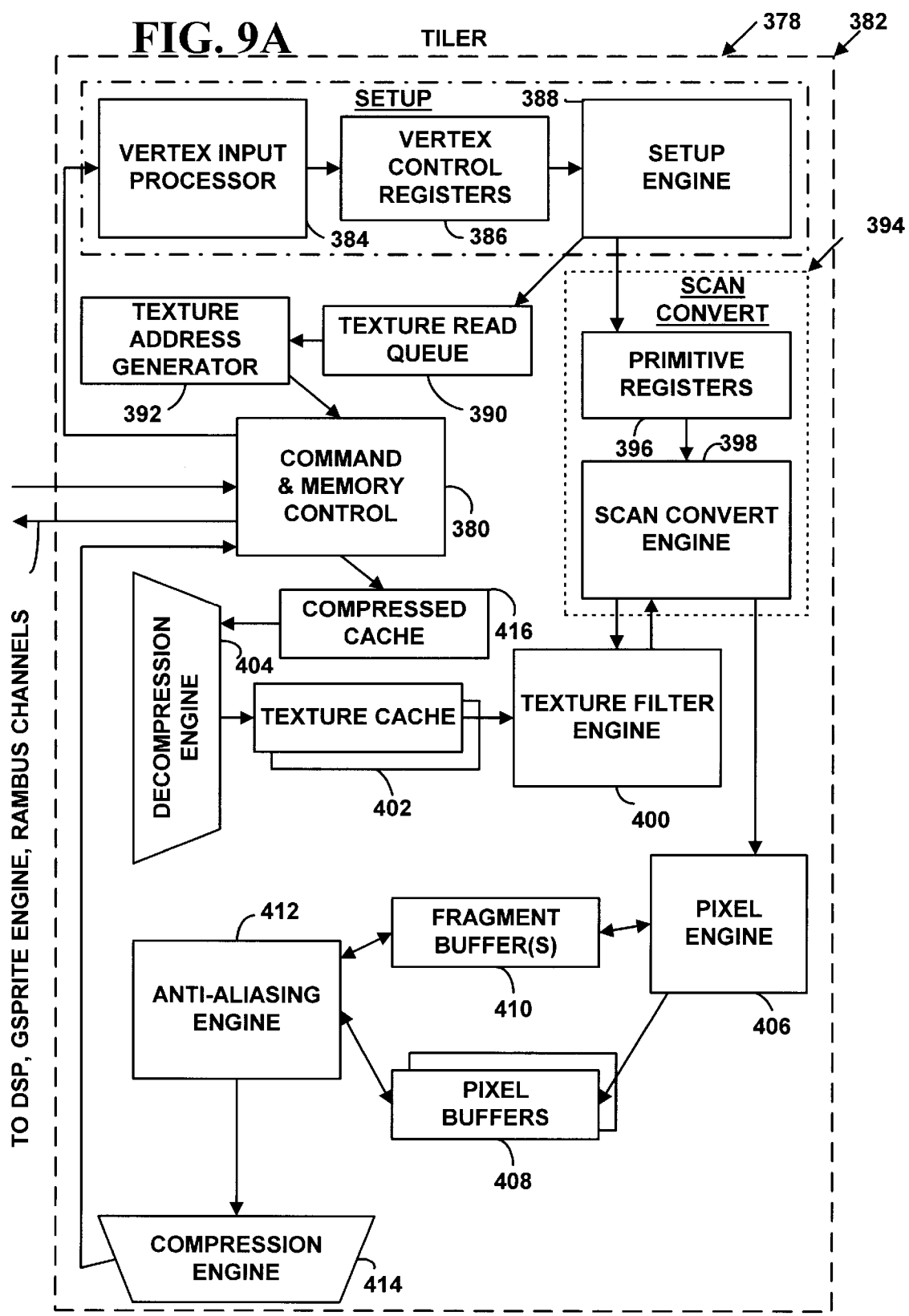
FIGS. 9A–C are block diagrams illustrating alternative embodiments of a tiler.

FIG. 9A is a block diagram of the tiler 200 on the image processing board 174. The tiler is responsible for 2-D and 3-D graphics acceleration, and for shared memory control. As shown in the block diagram of the image procession board, the tiler connects directly to the DSP (176, FIG. 4), the gsprite engine 204, and the shared memory system 216.

The functional blocks shown in the block diagram above are described in this section.

The tiler 378 includes a number of components for primitive rendering. The command and memory control 380 includes an interface to shared memory 216, the gsprite engine 204, and the DSP 176. Accesses to memory from the tiler, DSP, and gsprite engine are arbitrated by this block. A queue is provided to buffer read accesses.

The setup block 382 calculates the linear equations which determine the edge, color, and texture coordinate interpolation across the surface of the triangle. These equations are also used to determine which texture blocks will be required to render the triangle. The edge equations are also passed to the scan conversion block 394 and are stored in the primitive registers 396 until required by the scan convert engine 398.

The setup block 382 includes three components: the vertex input processor 384, vertex and control registers 386, and the setup engine 388. The vertex input processor 384 parses the command stream from the DSP. The vertex and control registers 386 store the information necessary for processing polygons or other geometric primitives. Triangle processing is used in this specific embodiment, and the tiler 200 includes registers for six vertices (three for each triangle) to allow double buffering of triangle processing. The setup engine 388 calculates the differentials for color, depth, edges, and texture coordinate interpolation across the surface of the triangle. These equations are also used to determine which texture blocks are used to render the triangle. The setup engine also pre-fetches texture chunks so that they are available when needed by the scan convert engine 398.

The setup engine 388 also communicates with the texture read queue 390, and a texture address generator 392. The texture read queue 390 buffers read requests for texture blocks from shared memory. While we use the term "texture" in referring to the portions of the tiler used to retrieve image data blocks from memory, it should be understood that this term can refer to texture maps, shadow maps, and other image data used in multi-pass rendering operations. The texture address generator 392 determines the address in memory of the requested chunks and sends texture read requests to the command and memory control 380. The texture address generator 392 includes a memory management unit that controls the writing of image data to the texture cache.

The scan convert block 394 receives differentials and other vertex data from the setup block and generates pixel data. The scan convert block 394 includes primitive registers 396, and the scan convert engine 398. The primitive registers 396 store the equation parameters for each triangle parameter. The primitive registers include registers to store multiple sets of equations so that the scan convert engine does not stall waiting for texture data.

The scan convert engine 398 scan converts polygons, which in this case are triangles. The scan convert block 394 includes the interpolators for walking edges and evaluating colors, depths, etc. The pixel address along with color and depth, and anti-aliasing coverage information is passed to the pixel engine for processing.

The scan convert engine 398 passes texture addresses to the texture filter engine 400, which calculates the texture data. The texture filter engine 400 calculates pixel color and alpha data for polygons that are being rendered. The illustrated texture filter engine computes a filter kernel based on the Z-slope and orientation of the triangle being rendered, and on the center of the texture request (the S and T coordinates of a point mapped into the texture). Filtering is performed in two passes in a pipelined fashion so that a new pixel is generated every cycle. The filter kernel can be an anisotropic filter or an isotropic filter. Where anisotropy is not required, the filter kernel can use negative lobes allowing much sharper textures than is possible with tri-linear interpolation. The texture filter engine 400 also handles Z-comparison operations for computing effects on shadows.

The texture cache 402 stores blocks of decompressed image data. In one implementation, the texture cache 402 stores texture data for sixteen 8×8 pixel blocks. The data is organized so that 16 texture elements can be accessed every clock cycle.

The decompression engine 404 decompresses texture data and transfers it to the texture cache 402. In this embodiment, the decompression engine includes two decompressors, one which implements a discrete cosine transformation (DCT) based algorithm for continuous tone images such as textures, and the other which implements a lossless algorithm for desktop pixel data. The DCT based algorithm is implemented by two parallel decompression blocks, each of which can generate eight pixel elements (i.e. two pixels) per clock cycle.

The compressed cache 416 can be used to buffer compressed data before the decompression engine 404 decompresses and transfers it to the texture cache 402.

The scan convert engine 398 transfers pixel data to the pixel engine 406. The pixel engine 406 performs pixel level calculations including blending, and depth buffering. The pixel engine also handles Z-comparison operations required for shadows. To achieve optimal performance, the pixel engine should preferably operate at one pixel per clock cycle.

The pixel engine 406 controls transfers of pixel data to a rasterization buffer. The rasterization buffer includes pixel buffers 408, and fragment buffers 410 in the illustrated embodiment. The pixel buffers 408 include two buffers to support double buffering. In this implementation of the pixel buffers, each pixel entry stores eight bits per color component (R G B), eight bits for the alpha component, 24 bits for the Z-buffer, 8 bits for the stencil buffer, and a nine bit pointer into the fragment buffer. This is a total of 73 bits per pixel. One pixel buffer is used by the pixel engine 406 while the other is used by the anti-aliasing engine 412. The buffers are then swapped.

The fragment buffers 410 store fragments for partially covered pixels called pixel fragments, which result from pixels of polygons whose edges cross a given pixel, or are translucent. The fragment buffer is single buffered in the implementation shown in FIG. 9A. A free list of fragments is maintained, such that as fragments are resolved, they are added to the free list, and as fragments are generated, they use entries from the free list. Alternatively, the fragment buffer could be double buffered, so that one fragment buffer could be resolved by the anti-aliasing engine while the other was filled by the pixel engine in parallel.

In one embodiment, a fragment record includes the same data as in the pixel buffer entries plus a 4×4 mask. The nine bit pointer is used to form a linked list of entries, with a reserved value indicating the end of the list. In this embodiment, the fragment buffers 410 includes a total of 512 entries, but the size can vary.

The anti-aliasing engine 412 calculates the color and alpha component for pixels which are affected by more than one polygon, which occurs when polygons only partially cover the pixel area (i.e. the polygon edges cross the pixel) or when polygons have translucency. The anti-aliasing engine 412 transfers resolved pixel data to the compression engine 414. In this embodiment, the compression engine 414 includes two compressors, one DCT based for continuous tone images, and one lossless for desktop pixel data. The DCT based algorithm is implemented using a compressor capable of compressing eight pixel elements per clock cycle. The compression engine 414 compresses the resulting rendered gsprites and sends the compressed data to the command memory and control 380 for storage in shared memory 216 (FIG. 4). The tiler also has a compressed cache 416 for caching compressed data.

Figure 10:
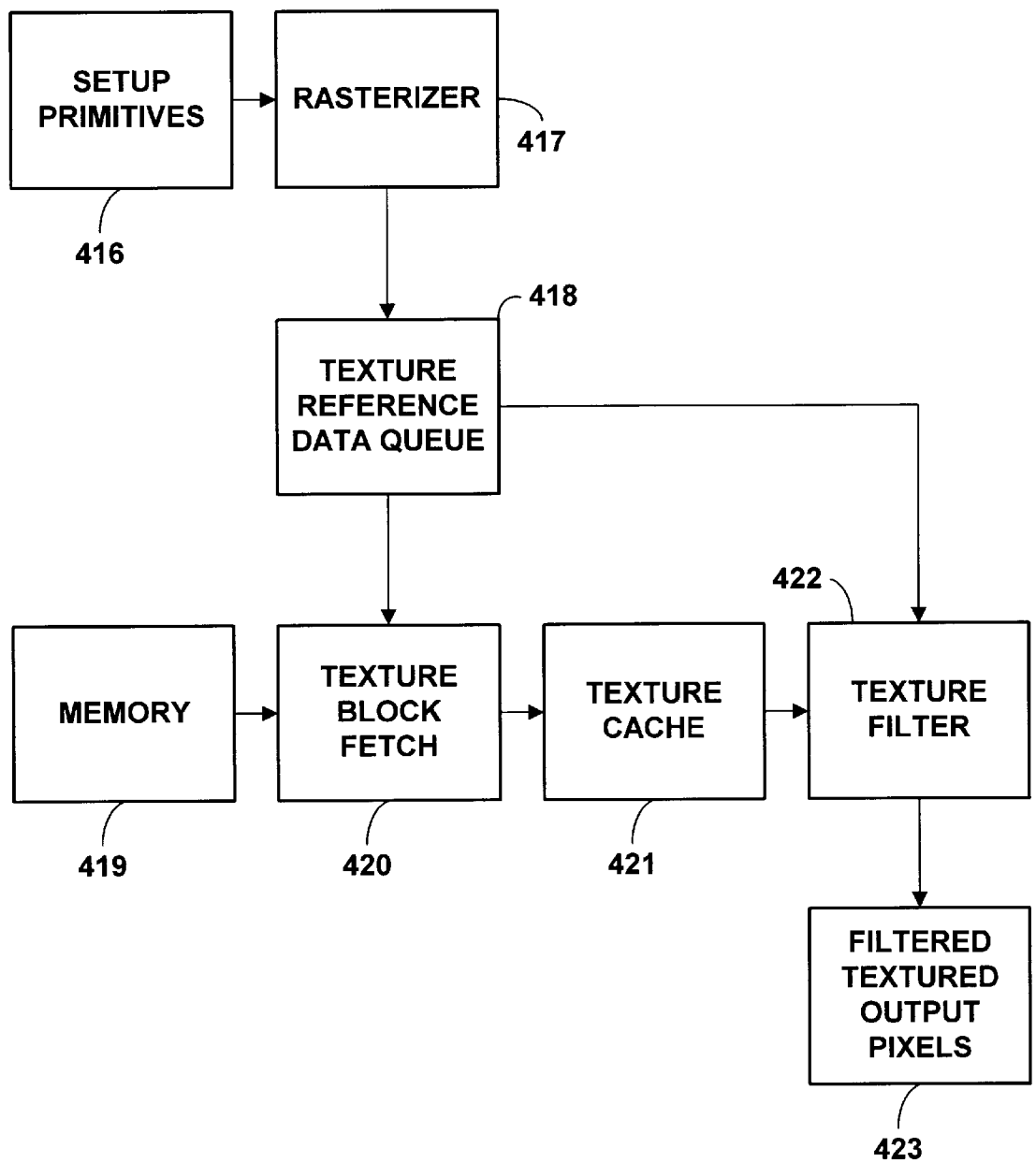
FIG. 10 is a block diagram illustrating a system for accessing texture data from memory.

FIGS. 10 and 111 illustrate two alternative implementations for accessing image data from memory during the pixel generation process. There are a number of instances when image data has to be accessed from memory during pixel generation. These include for example, accessing a texture map during a texture mapping operation, accessing a shadow map during a shadowing operation, and accessing color and/or alpha data during multi-pass blending operations. For simplicity, we refer to the image data in memory as "textures" or "texture data". However, it should be understood that the methods and systems described here can also be applied to other types of image data accessed from memory during pixel generation.

Figure 11:
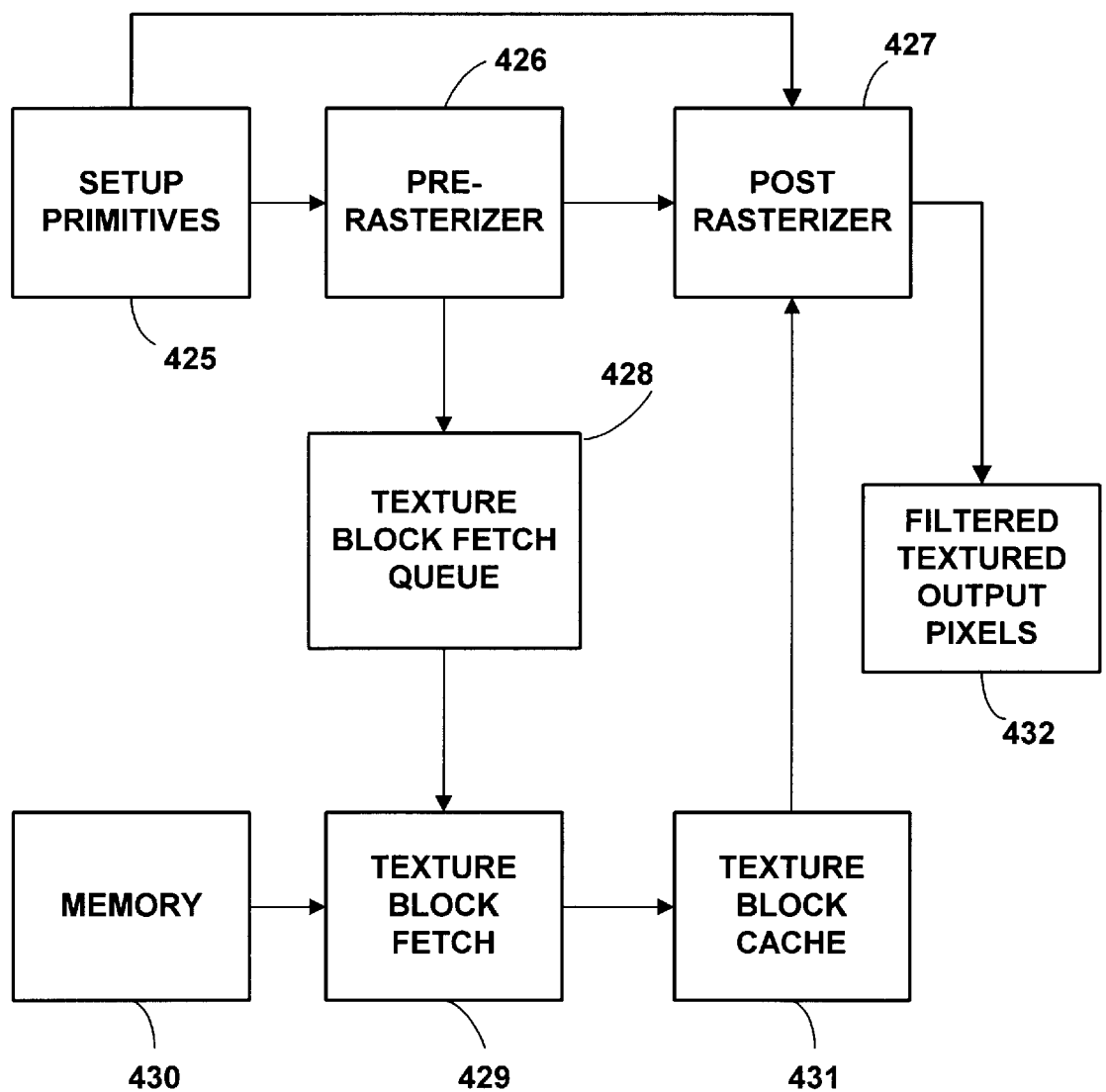
FIG. 11 is a block diagram illustrating a system for accessing texture data from memory.

The implementations illustrated in FIGS. 10 and 11 provide alternative approaches to efficiently load and utilize a texture cache on the tiler. A significant advantage of these approaches is that texture data can be stored in memories with high latency and even in a compressed format without unduly hampering performance. As a result, less specialized and lower cost memory can be used to implement high performance rendering hardware.

Texture data from the memory is accessed and cached in units called "blocks" which are typically a small rectangular region appropriate for efficient fetching and catching. A typical block size is about 8×8 samples in size. For instance, for texture maps, a typical block is 8×8 texels.

FIG. 10 is a functional block diagram illustrating one embodiment for accessing these blocks of texture data. This embodiment solves the latency problem by buffering pixel data from the rasterizer 417, including texture data requests, in a texture reference data queue 418. The queue includes enough entries to absorb the latency which would otherwise be incurred in accessing (and possibly decompressing) a texture block so that the rendering process can run at full speed. For example, if it takes 100 cycles to fetch a texture block, and the tiler is capable of producing one pixel per clock cycle, then the texture reference data queue includes at least 100 entries.

Data flow in the system illustrated in FIG. 10 proceeds as follows. First, geometric primitives are set-up for rasterization as shown in block 416. Set-up processing includes, for example, reading vertices for a geometric primitive such as a triangle, and calculating the differentials for color, depth, and edges across the surface of the triangle. The parameters resulting from these computations are then fed to the rasterizer 417.

The rasterizer 417 reads the equation parameter data for each primitive and generates pixel data. The rasterizer generates pixel data, including texture coordinates and filter data, and buffers this data in the texture reference data queue 418. The texture fetch block 420 reads texture reference data stored in the queue 418 and fetches the appropriate texture blocks from memory 419.

The pixel data stored in the texture reference data queue 418 in this implementation includes: an address of destination for the pixel (X, Y) being computed; depth data (Z); a coverage mask; color and translucency data; the coordinates of the center for the texture request (S, T); and texture filter data. The depth and coverage data is only needed in the texture reference data queue if high-quality anti-aliasing of pixels is desired. Alternatively, hidden surface removal and antialiasing can be performed in the rasterizer 417. If hidden surface removal and anti-aliasing are performed in the rasterizer, depth data and coverage data does not need to be stored in the data queue 418. The texture filter data may include a level of detail parameter for MIP-mapping, for example, or may include anisotropic filter data for higher quality texture filtering.

The texture block fetch 420 reads the texture reference data buffered in the data queue and retrieves the corresponding texture data from memory 419. In the case of texture map accesses, the texture block fetch unit converts the (S, T) center of the texture request and the texture filter data into the addresses of the blocks required to satisfy the texture filtering operation. The blocks identified in this process are then fetched into the cache, replacing other blocks as needed. Image data blocks can be fetched using a least recently used (LRU) or other suitable cache replacement algorithm. To reduce memory accesses, the texture block fetch unit keeps track of the texture blocks already stored in the texture cache 421 and avoids requesting the same block more than once. This capability significantly reduces the memory bandwidth required to perform high quality texture filtering because the latency in retrieving a texture block is incurred only once in computing an image.

The texture block fetch unit includes a hold-off mechanism to prevent from overwriting texture blocks still needed in the texture filter unit in the tiler. One way to implement such a hold-off mechanism is to associate a reference count with each texture block to keep track of whether the texture filter has used a particular texture block. This reference count is incremented on receipt of a texture request to a block by the texture fetch unit, and decremented in response to its use by the texture filter unit. The texture block fetch unit then only replaces blocks that have a corresponding reference count of zero.

An alternative way to implement the hold-off mechanism is to allocate a buffer for temporary storage of texture blocks output by the texture fetch unit. In this approach, the image block is first written to temporary storage buffer. After the texture fetch unit has completed writing the image block to the temporary storage buffer, it can then be transferred to the texture cache. Image blocks are swapped to the texture cache when first needed by the texture filter unit 422.

In the case of texture mapping operations, the texture filter block 422 reads texture samples from the texture cache 421 and the pixel data stored in the texture reference data queue 418, and computes pixel color and possibly alpha values from the texture sample data.

In addition to texture mapping operations, this approach can also be applied to shadowing and multi-pass blending operations as well. For instance, texture reference data queue can be used to retrieve a shadow depth map residing in memory. Alternatively, the texture reference data queue can be used to retrieve color and/or alpha data used in multi-pass lighting and shading operations. More detail regarding texture mapping, shadowing, and multi-pass operations is provided below.

There are a number of advantages to buffering pixel data in the manner described above. One significant advantage is that the image data can be stored in less specialized memory (with higher access time), which reduces the cost of the overall system. In addition, image data including textures can be stored in compressed format and can still be accessed at fast enough rates to perform sophisticated pixel operation such as texture filtering. As a result, the system is able to achieve improved performance at a lower cost relative to known methods for accessing texture data.

Another advantage to this approach is that the texture reference data queue is able to predict accurately which image blocks need to be accessed from memory. As a result, the system incurs latency for memory accesses no more than necessary. Once the image data blocks are in the texture cache, the texture filter unit can run at the full speed of the rasterizer, as long as there is sufficient memory bandwidth and texture fetch throughput to write the requested image blocks to the texture cache.

Queuing texture references with the texture request center and filtering the data allows the queue to be much smaller than if texels with their corresponding texture filter weights were queued.

FIG. 11 is a functional block diagram illustrating an alternative embodiment for accessing image data from memory. In this approach, geometric primitives are queued and then processed in a pre-rasterizer to hide the latency of the texture block fetch during the pixel generation process. An example will help illustrate the concept. If an average primitive takes 25 cycles to rasterize, and it requires 100 clock cycles to fetch a texture block from memory, the primitive queue should be at least four primitives long. A simplified version of the post-rasterizer, the pre-rasterizer includes circuitry to determine the image data blocks that need to be accessed from memory. Once the texture data is fetched, the post-rasterizer can generate pixel data using texture data without being exposed to the delay involved in fetching blocks from memory.

The data flow through this implementation occurs as follows. As in the implementation described above, geometric primitives are processed in a set-up block 425 for rasterization. In this particular implementation, however, the set-up block 425 includes a larger primitive queue to buffer more primitives. The pre-rasterizer 426 quickly converts the primitives into a list of texture blocks needed to satisfy the texture filtering needs for all of the pixels covered by the primitive in the order that the blocks will be needed by the post-rasterizer 427. The pre-rasterizer is a simplified version of the post-rasterizer 427, or the rasterizer 417 in the alternative implementation. In this approach, the pre-rasterizer only needs to compute texture data addresses and determine texture requests.

The pre-rasterizer also keeps a model of the texture block cache and performs the cache replacement algorithm, such as least recently used (LRU) to keep from exceeding the size of the texture block cache. As part of the cache replacement algorithm, the pre-rasterizer compresses repetitive requests to a single texture block to only one request to the texture block fetch unit 429.

The texture block fetch queue 428 includes entries for storing texture block requests. The texture block fetch unit 429 reads texture requests from the texture block fetch queue and retrieves the appropriate blocks from memory 430.

The post-rasterizer rasterizes primitives queued in the set-up block 425 to generate pixel data for a pixel location. If image data needs to be accessed from memory during the pixel generation process, the post-rasterizer rasterizes the primitives as quickly as the necessary texture blocks can be transferred to the texture block cache 431. When the post-rasterizer completes rasterizing a primitive queued in the set-up block, the primitive is removed and replaced with another primitive from the input data stream. The set-up block is responsible for keeping the queue filled with primitives so that the pre-rasterizer and post-rasterizer are not stalled in the pixel generation process.

Like the alternative embodiment described above, the texture block fetch should preferably include a hold-off mechanism to prevent it from overriding the texture blocks that are still needed by the post-rasterizer. The two hold-off mechanisms described above can also be used in this implementation. Specifically, a reference count can be used to keep track of when an image block has been requested and then used. In this case, the reference account would be incremented on receipt of a texture request for a block by the pre-rasterizer, and decremented upon use by the post-rasterizer. The texture block fetch unit then only replaces blocks in the texture cache when their corresponding reference count is zero.

Alternatively, a buffer can be allocated for temporary storage of texture blocks output by the texture fetch block. When the texture fetch block has completed writing a block to this temporary buffer, it can then be transferred to the texture block cache 431 when requested by the post-rasterizer 427. When the post-rasterizer 427 first request data in a texture block in the temporary buffer, the block is then transferred to the texture block cache 431.

There are a number of advantages to this approach. First, texture data can be stored in less specialized memory and can still be accessed at rates required to support sophisticated texture filtering. An important related advantage is that texture data can be stored in a compressed format and then decompressed for use in the pixel generation process.

Another advantage of this approach is that requests to memory can be predicted so that the latency for memory access is incurred only once for each texture block to render a scene. Once the initial texture blocks are in the texture cache, the post-rasterizer can run at full speed, as long as there is memory bandwidth and texture fetch throughput to keep the cache current.

Figure 9B:
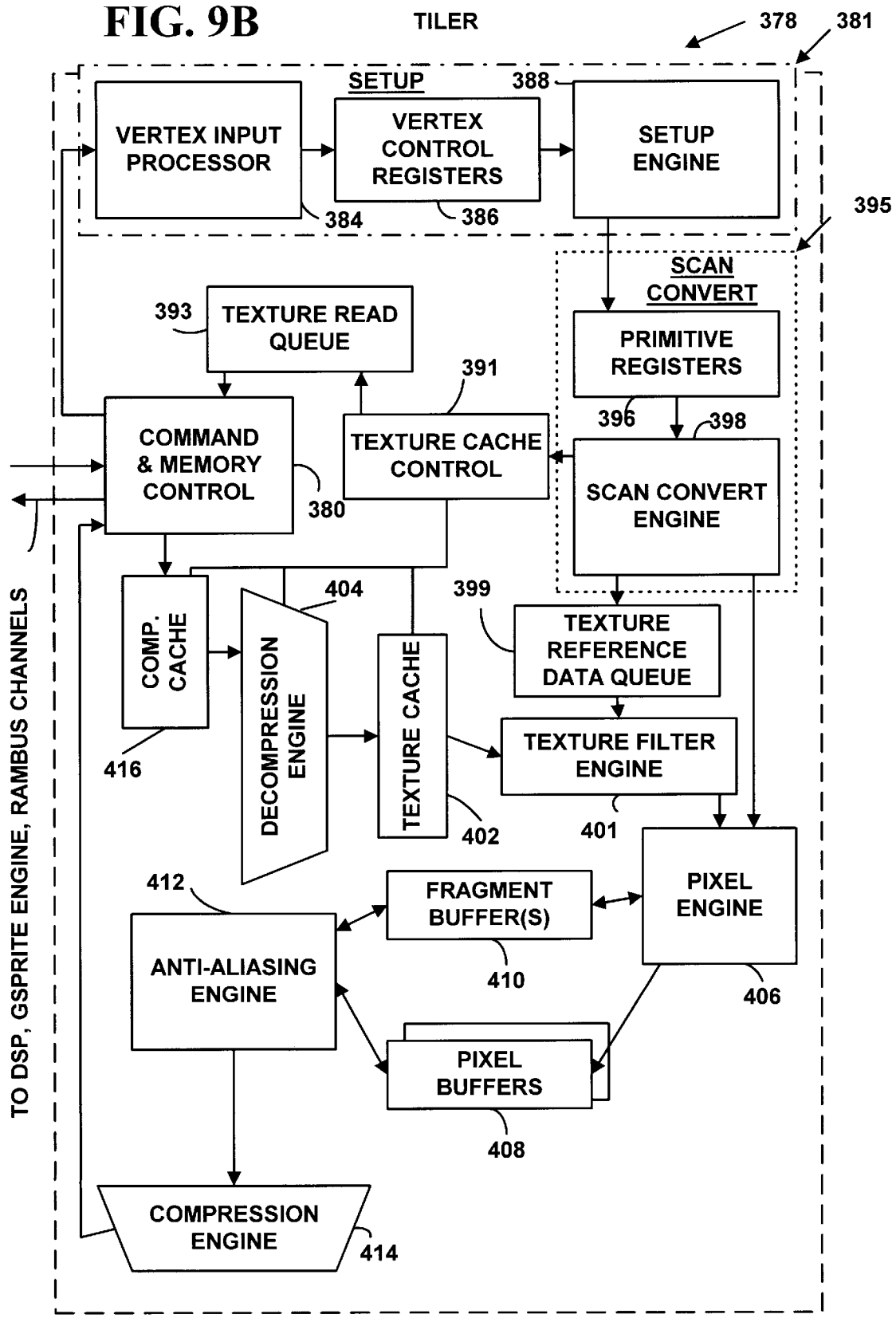

FIG. 9B illustrates a more detailed implementation of the system illustrated in FIG. 10. The set-up block 381 in FIG. 9B corresponds to the set-up block 416 in FIG. 10. Unlike the set-up block 382 of FIG. 9A, the set-up block 381 in this alternative implementation does not generate texture read requests. Instead, the scan convert block 395 generates pixel data, including texture reference data, which is buffered in the texture reference data queue 399.

The scan convert block 395 of FIG. 9B is a specific implementation of the rasterizer 417 in FIG. 10. It computes a Z-value, a coverage mask, color and translucency data, and the center of the texture request in texture coordinates. For some texture mapping operations, it also computes level detail data or anisotropic filter data. The texture filter engine 401 reads the texture request and possibly texture filter data buffered in the texture reference data queue 399 and accesses the appropriate texture samples in the texture cache. From this texture data, the texture filter engine computes the contribution of the texture to the pixel color and alpha values. The texture filter engine combines the color and alpha in the texture reference data queue 399 with the contribution from the texture to generate pixel values sent to the pixel engine 406.

The texture cache control 391, texture read queue 393, command and memory control 380 are specific implementations of the texture block fetch 420 in FIG. 10. In addition, for compressed texture blocks, the compressed cache 416 and the decompression engine 404 are also part of the texture block fetch 420.

Figure 9C:
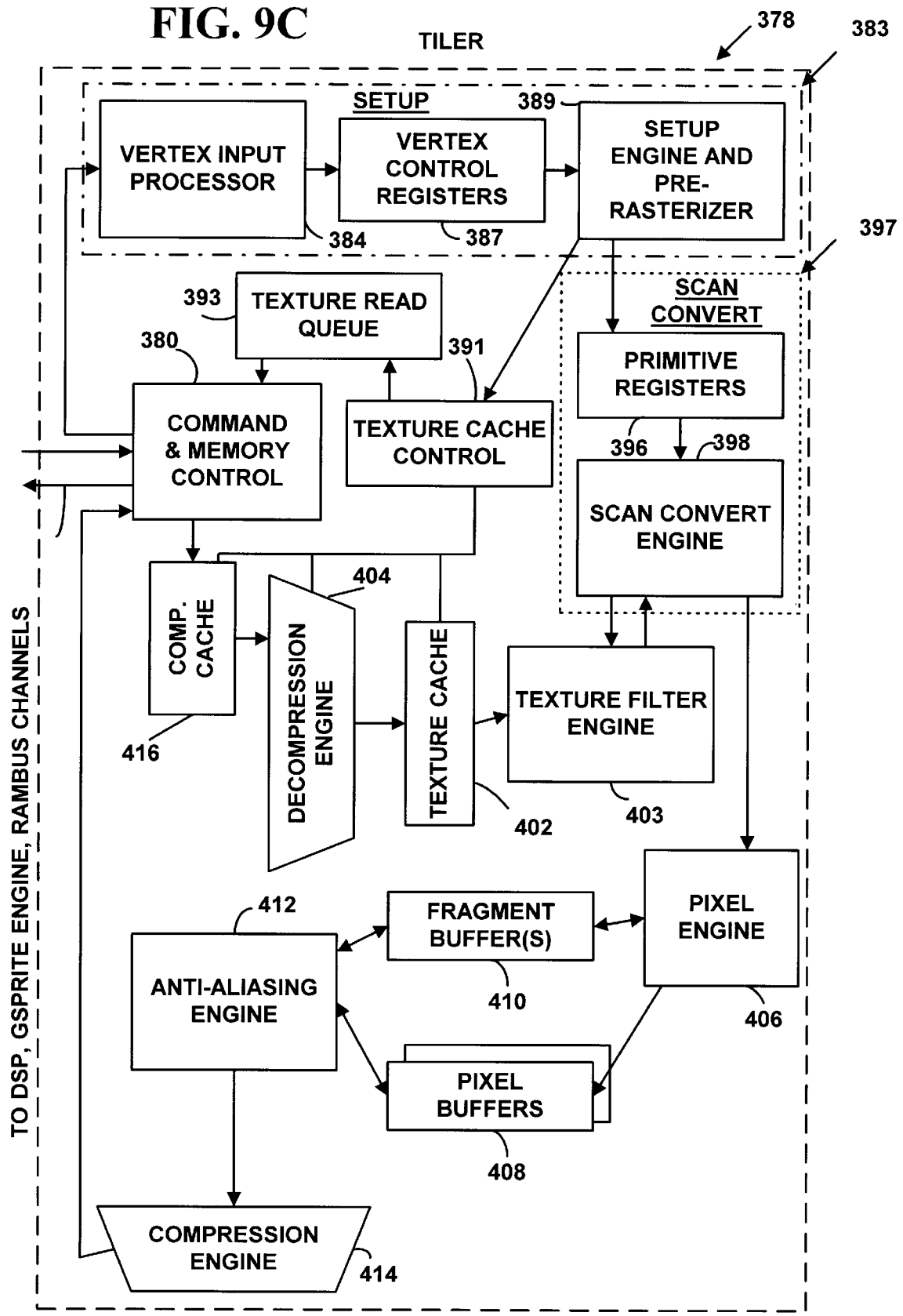

FIG. 9C illustrates a more detailed implementation of the system illustrated in FIG. 11. In this implementation, the functionality described in connection with blocks 425 and 426 of FIG. 11 is implemented within the set-up block 383. Specifically, the set-up block 383 includes the pre-rasterizer 426. The set-up block 383 also includes additional vertex control registers 387 to buffer additional primitives so that the pre-rasterizer can quickly convert the primitives to initiate texture data requests. The set-up engine and pre-rasterizer 383 sends requests for texture blocks to the texture cache control 391 shown in FIG. 9C.

The texture cache control 391 ensures that the required texture blocks will be in the texture cache 402 when needed. The texture read queue buffers read requests for texture data blocks to the shared memory system. The command and memory control 380 arbitrates access to the shared memory system, and it includes a buffer for buffering data from memory.

The texture cache control 391, texture read queue 393, and the command and memory control 380 are specific implementations of the texture block fetch 429 in FIG. 11. For compressed texture blocks, the compressed cache 416 and the decompression engine 404 are also part of the texture block fetch 429. The texture cache control 391 manages the flow of texture blocks from the compressed cache 416, through the decompression engine 404, into the texture cache 402.

The scan convert block 397 and the texture filter engine 403 are a specific implementation of the post-rasterizer 427 in FIG. 11. The scan-convert block 397 and the texture filter engine 403 operate similarly to their counterparts illustrated in FIG. 9A and described above.

Texture Cache Control

Above, we described two approaches for rasterizing in environments with high latency for texture fetch operations. We now describe aspects of the texture cache control in more detail.

The texture cache control scheme allows a rasterizer to function at full speed during texture mapping in spite of a high latency for texture map fetch operations. In the tiler, this latency is the result of the time required to read uncompressed texture data from shared memory (e.g., RAMBUS) plus the time required to decompress blocks of the texture map. The scheme also applies to the gsprite engine, which fetches gsprite blocks from shared memory, possibly decompresses them, and converts pixel data in gsprite space to view space (or more specifically, to screen coordinates).

The basic premise of the texture cache control scheme is to produce two identical streams of texel (or gsprite pixel) requests which are offset in time. The first (earlier) stream is a pre-fetch request for which no texture data is returned, while the second (later) stream is an actual request which does return texel data. The time difference between these two streams is used to hide the latency of reading and decompressing texture data.

Two approaches for generating these time-separated requests described above are: (1) duplicate rasterizers which both read from a single primitive FIFO (FIG. 11 and 9C); and (2) a single rasterizer followed by a pixel FIFO (FIG. 10 and 9B).

In approach (1), the first rasterizer peeks at primitives from positions at or near the input side of the primitive FIFO and rasterizes the primitives, making texture requests but not receiving any texels back and not producing any pixels. The second rasterizer removes primitives from the FIFO output and makes the identical requests at a later time, receives the texels from the texture cache controller, and produces the pixels. The depth of the primitive queue combined with the number of pixels per primitive determines the potential time difference between the two request streams.

In approach (2), the single rasterizer processes primitives and makes texture requests and outputs partially complete pixel data into a pixel FIFO. This partial pixel data includes all data that is necessary to finish computing the pixel once the texture requests are honored. At the output side of the pixel FIFO, the partial pixel is completed, which produces the identical stream of texture requests, receives the texels, and produces completed pixels. The depth of the pixel queue determines the potential time difference between the two request streams.

The Texture Cache Control

The texture cache control has two conceptual caches: the virtual cache, and the physical cache. The virtual cache is associated with the first (pre-fetch) request stream, and has no data directly accompanying the cache entries (requests to this cache do not return any data). The physical cache is associated with the second (actual) request stream, and has real texture data accompanying each cache entry (and thus returns data to the requester). These caches have the same number of entries.

The virtual cache controls and tracks the future contents of the physical cache, thus at any position in its request stream it has a set of cache key and entry associations which the physical cache will have at the same relative position in its request stream (at a future time).

Upon receiving a request (a new 'key'), the virtual cache performs the comparison against its current set of keys. If the requested key is not in the virtual cache, then a cache replacement operation is performed. The virtual cache replacement includes 1) selecting an entry for replacement (via LRU or some other algorithm), 2) replacing the key for that entry, and 3) invoking the (memory and) decompression subsystem to begin the process of fetching and decompressing the data associated with that key. The particular implementations shown in FIGS. 9B and 9C, the decompression subsystem includes the command and memory control 380, compressed cache 416, and decompression engine 404.

The output of the decompression subsystem is a block of texture data which is then placed into an entry in the physical cache (the texture cache 402, for example). In the tiler shown in FIGS. 9B and C, processing performed by the decompression subsystem is performed in a multi-entry pipeline in which serial order is maintained.

Note that if the requested key was already in the virtual cache, then no action is required because the associated data will be in the physical cache at the time it is requested from the second request stream.

Requests to the physical cache result in a similar key comparison to see if the requested data is already in the cache. If a matching key is found, then the associated data is returned. If a match is not found, then the next data output by the decompression subsystem is guaranteed to be the desired data. Note that the physical cache does not perform any replacement entry selection processing—the entry in the physical cache replaced by this new data is dictated by the virtual cache via a cache entry 'target' index computed by the virtual cache controller and passed through the decompression subsystem with the requested data.

Correct functioning of the scheme requires that flow control be applied to the interface between the decompression subsystem and the physical cache. If decompressed data is allowed to overwrite its targeted entry in the physical cache immediately upon being available, it is possible that all of the references to the previous contents of that cache entry may not have been completed. (Note that the physical cache controller also may have to wait for data to be output by the decompression subsystem.)

This flow control is accomplished by waiting until the new entry is requested before overwriting the previous entry's contents. Placing new data into the texture cache is thus always deferred until the last moment until it is needed.

Since this replacement is deferred until it is needed, any time required to place the data into the physical cache can introduce latency into the process driving the second request stream. Two schemes for alleviating this latency are as follows.

The first scheme is to double buffer data in the physical cache. This allows the decompression subsystem to immediately write each entry's data into its side of the double buffer, and the physical cache controller can do a (presumably fast) buffer swap to map the data into its side of the cache. The decompression subsystem only has to wait if the entry to be filled is already full and has not been swapped yet. Note that the cache replacement algorithm used by the virtual cache controller will tend to not repeatedly overwrite the same entry, thus 'spreading out' the writes to the cache entries.

The second scheme is for the physical cache to have one or more 'extra' entries in addition to the number of 'keyed' entries. The number of keyed entries is the number for which cache keys exist, and matches the number of entries in the virtual cache. The number of extra entries represents the number of entries which are unmapped (i.e. not currently keyed). The sum of these is the total number of data entries in the physical cache.

In the second scheme, all cache entries can transition between unmapped to mapped (associated with a key). The set of unmapped entries forms a FIFO of entries into which the decompression subsystem writes completed blocks of data. A separate FIFO structure is maintained for the target indices associated with these unmapped entries. When a request to the physical cache is made for which a matching key is not present, the first entry in the queue of unmapped entries is mapped in to the targeted index and associated with that key. The replaced entry is unmapped and placed (empty) at the end of the unmapped queue.

Cache Key Generation

The basic premise of the scheme is that two identical streams of requests are generated. It is not a requirement, however, that the specific keys which are associated with these requests be identical.

The cache keys which form the first (early) stream of requests are used to control the reading and subsequent decompression of texture data. These keys must have some direct relevance to the requested data (such as a memory address).

The cache keys which form the second (later) stream of requests do not need to precisely match the content of the first stream—it is only a requirement that there be a unique one-to-one mapping between the two. This is due to the fact that the keys for the second stream are used only for matching existing cache entries, not for any data fetching operation. The critical fact here is that the association between the physical cache's key and a cache entry is made when the new data is mapped in to the physical cache, and the index of the associated entry is computed by the virtual cache and passed through the decompression subsystem.

This fact can be exploited to simplify the controls for the process which is generating the keys for the second request stream, since the keys for the stream need only be unique and not precisely 'correct'.

Figure 12A:
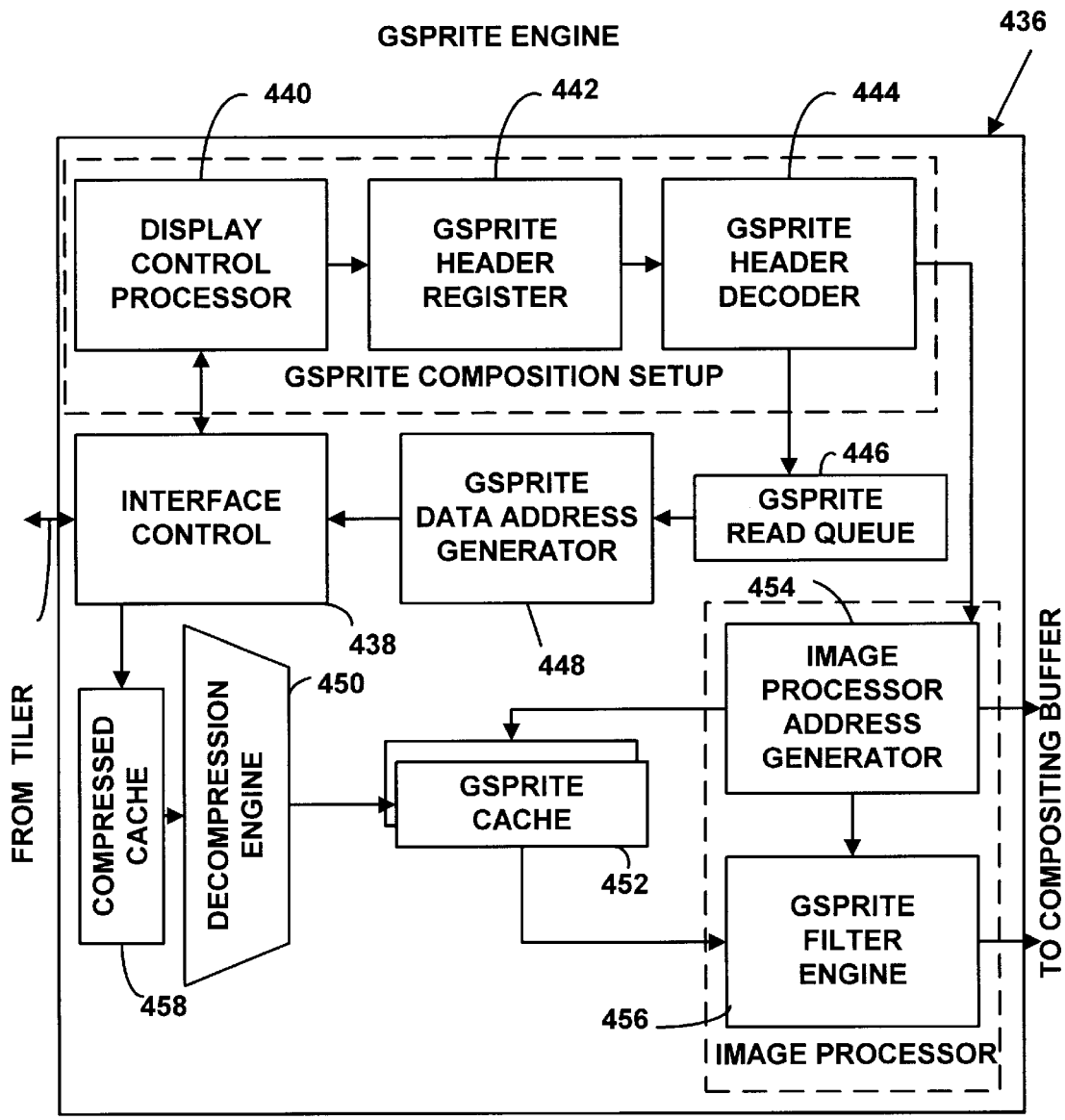
FIGS. 12A and B are block diagrams of alternative implementations of a gsprite engine in an embodiment of the invention.

FIG. 12A is a block diagram illustrating the gsprite engine 436 on the image processing board 174. The gsprite engine 436 is responsible for generating the graphics output from a collection of gsprites. It interfaces with the tiler memory interface unit to access the gsprite data structures in shared memory. Gsprites are transformed (rotated, scaled, etc.) by the gsprite engine and passed to the compositing buffer where they are composited with pixels covered by other gsprites.

Interface control 438 is used to interface the gsprite engine with the shared memory system via the tiler. This block includes a FIFO to buffer accesses from the memory before they are distributed through the gsprite engine.

The display control 440 processor is used to control the video display updates. It includes a video timing generator which controls video display refresh, and generates the timing signals necessary to control gsprite accesses. This block also traverses the gsprite display data structures to determine which gsprites need to be read for any given 32-scanline band.

The gsprite header 442 registers store gsprite header data which is used by the image processor address generator 454 and gsprite filter engine 456 to determine the transformations on each gsprite. It is also used by the gsprite header decoder 444 to determine the blocks (in this case, the 8×8 compression blocks) required to render the gsprite in each band.

The gsprite header decoder 444 determines which blocks from each gsprite are visible in the 32-scanline band and generates block read requests which are transferred to the gsprite read queue 446. This block also clips the gsprite to the current band using the gsprite edge equation parameters. This process is described in more detail below.

The gsprite read queue 446 buffers read requests for gsprite blocks. This queue stores requests for sixteen blocks, in this embodiment.

The gsprite data address generator determines the address in memory of the requested gsprite blocks and sends gsprite read requests to the interface control block. The gsprite data address generator 448 includes a memory management unit.

Compressed data retrieved from shared memory 216 (FIG. 4A) can be temporarily stored in the compressed cache 458.

The decompression engine 450 includes two decompressors, one which implements a DCT based algorithm for continuous tone images such as 3-D gsprites and images, and the other which implements a lossless algorithm for desktop pixel data. The DCT based algorithm is implemented by two parallel decompression blocks, each of which can generate eight pixel elements (i.e. 2 pixels) per clock cycle.

The gsprite cache 452 stores decompressed, gsprite data (R G B) for sixteen 8×8 blocks. The data is organized so that 16 gsprite pixels can be accessed every clock cycle.

The image processor address generator 454 is used to scan across each gsprite based on the specified affine transformation and calculate the filter parameters for each pixel. Gsprite cache addresses are generated to access gsprite data in the gsprite cache 452 and feed it to the gsprite filter engine 456. The image processor address generator 454 also controls the compositing buffer.

The gsprite filter engine 456 calculates the pixel color and alpha for pixel locations based on the filter parameters. This data is transferred to the compositing buffers for compositing. This block 456 computes a 4 or 16 pixel filter kernel based on the gsprite s and t coordinates at a pixel location. The filter may, for example, either be bilinear or a more sophisticated sum-of-cosines function. The 16 pixel filter kernel can have negative lobes allowing much sharper filtering than is possible with bi-linear interpolation. The gsprite filter engine 456 generates four new pixels to be composited every clock cycle. These pixels are aligned in a two by two pattern.

The gsprite engine 436 interfaces to the tiler 200 and the compositing buffer 210. Control signals control video timing and data transfer to the DAC 212.

Figure 12B:
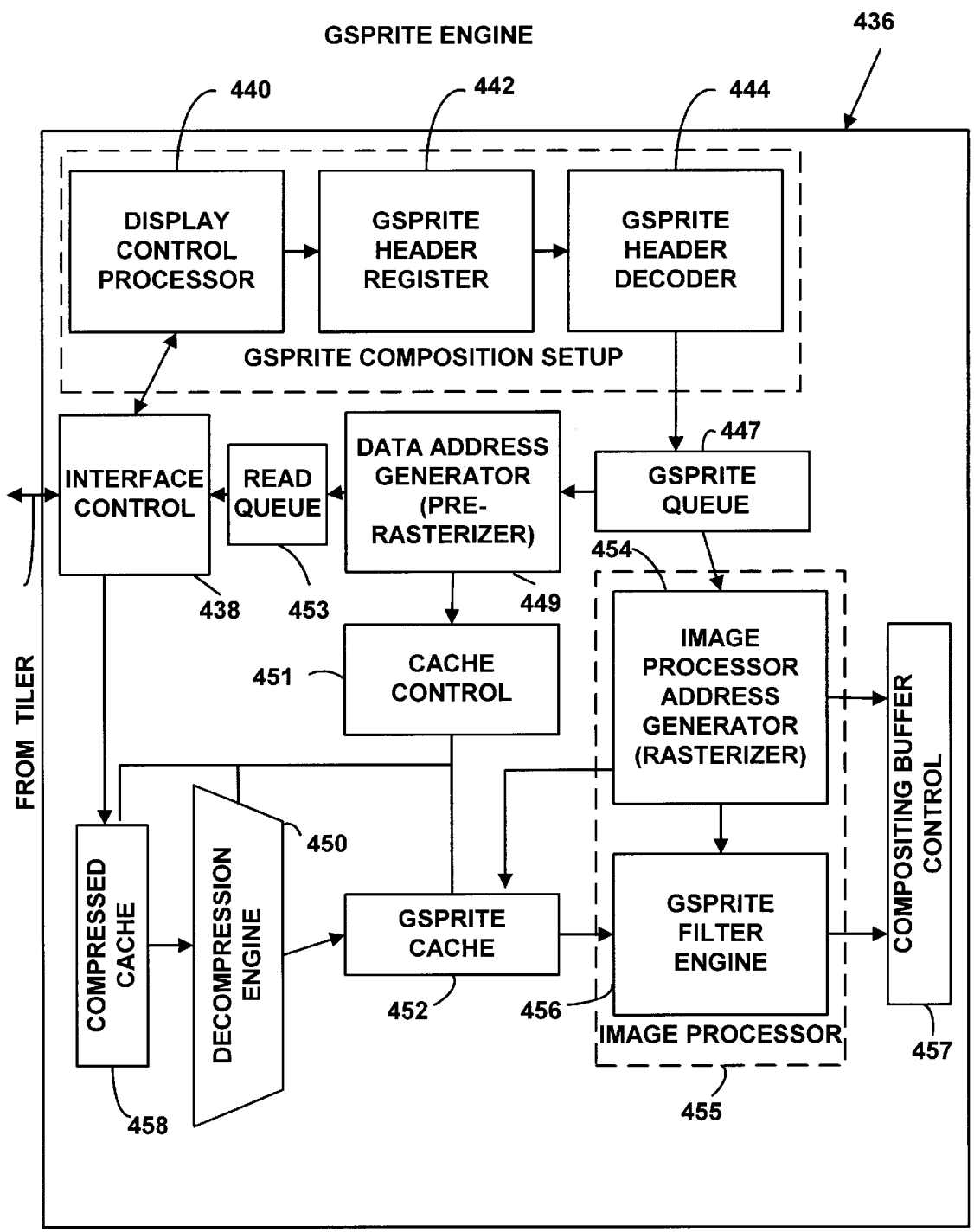

FIG. 12B is a block diagram of an alternative implementation of the gsprite engine 437. This particular implementation includes both a pre-rasterizer 449 and rasterizer 454 so that the gsprite engine can convert gsprite pixel data from gsprite space to screen space without incurring the latency in retrieving and decompressing blocks of gsprite pixel data. The dual rasterizer approach used in this implementation is described above in connection with FIG. 11 and 9C.

The operation of the blocks in the gsprite engine 437 is generally the same as described above for FIG. 12A except that this implementation uses the dual rasterizer method for fetching blocks of texture data. In this implementation (FIG. 12B), the gsprite header decoder 444 reads the gsprite header register 442, clips the gsprite to the current display band, and places the gsprite in the gsprite queue 447 for rasterization. The data address generator or "pre-rasterizer" 449 scans each gsprite based on the specified affine transform in the gsprite header and generates read requests to the gsprite cache control 451. Using a method described above in connection with the texture cache control, the sprite cache control 451 ensures that the required gsprite data blocks are in the gsprite engine 437 and specifically in the gsprite cache 452 when the image processor block 455 needs them. It manages the flow of gsprite data blocks from the compressed cache 458, through the decompression engine 450, and into the gsprite cache 452. The read queue 453 buffers requests for gsprite data blocks to the shared memory system, and the interface control 438 reads the requests in the read queue 453, controls accesses to shared memory, and places blocks of gsprite data in the compressed cache 458.

The decompression subsystem in the gsprite engine includes the compressed cache 458 and decompression engine 450. The cache control 451 controls the flow of gsprite blocks through this decompression subsystem as described above in connection with the texture cache control.

The image processor address generator (rasterizer) 454 scans each gsprite based on the specified affine transform in the gsprite header and calculates the filter parameters for each pixel. It also generates gsprite cache addresses of gsprite data, which it sends to a cache address map in the gsprite cache for use by the gsprite filter engine 456. In one specific implementation of the cache, the cache address map selects which 14 pixel blocks are active and which two blocks are filled from the decompression engine.

The gsprite filter engine 456 maps color and alpha data at pixel locations in gsprite space to screen space. In this implementation, it applies either a 2×2 or 4 by 4 filter kernel to compute pixel values (color or both color and alpha) at pixel locations in screen space. The compositing buffer control 457 passes pixel values, in this case four pixels per clock cycle, to the compositing buffer. The compositing buffer control 457 monitors the ready line from the compositing buffer to ensure that the gsprite engine 437 does not overrun the compositing buffer. The rasterizer 454 controls the compositing buffer control 457.

Figure 13:
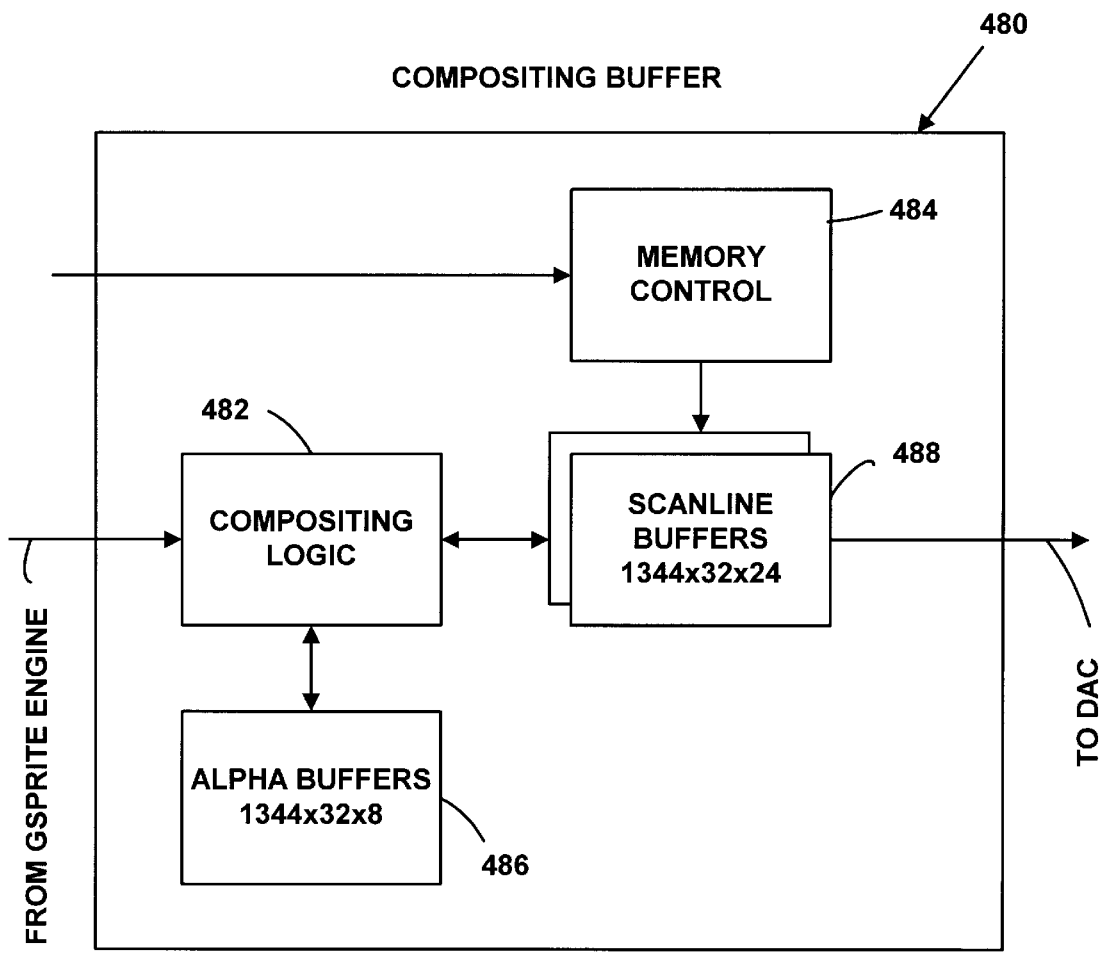
FIG. 13 is a block diagram of a compositing buffer in an embodiment of the invention.

FIG. 13 is a block diagram illustrating the compositing buffer 480 on the image processing board 174. The compositing buffer 480 is a specialized memory device that is used to composite gsprite data from the gsprite engine and generate digital video data to transfer to the DAC 212. The compositing buffer operates on 32 scanlines at a time—compositing gsprites for one 32 scanline band while the previous 32 scanlines are displayed.

The compositing logic 482 is responsible for calculating the pixel values as they are written into the scanline buffer. This is accomplished by performing a blending operation between the pixel value that is currently stored in the scanline buffer and the one that is being written to the compositing buffer. This operation is described in more detail below. In one implementation, the compositing logic performs four parallel pixel operations per clock cycle.

The memory control 484 is used to control the address and cycling of the memory banks. Address information is passed in a row column format as with normal DRAMs.

The alpha buffers 486 include an eight bit value for each of 1344=32 pixels. The memory is organized such that four contiguous pixels can be read and written each clock cycle. The alpha buffer also has a fast clear mechanism to quickly clear the buffer between 32-scanline band switching.

Two independent scanline buffers 488 are provided. The scanline buffers include three eight bit color values for each of 1344×32 pixels. The memory is organized such that four contiguous pixels can be read and written each clock cycle. One buffer is used to transfer the pixel data for a band to the DAC while the other is used to composite the pixels for the next band. Once the band has been completed, their functions swap.

A multiplexer is used to select data from one of the two scanline buffers 488 and sends the pixel display data to the DAC. The multiplexer switches between buffers every 32 scanlines.

The compositing buffer 480 interfaces to the gsprite engine 204, and transfers image data to the DAC 212.

Figure 14:
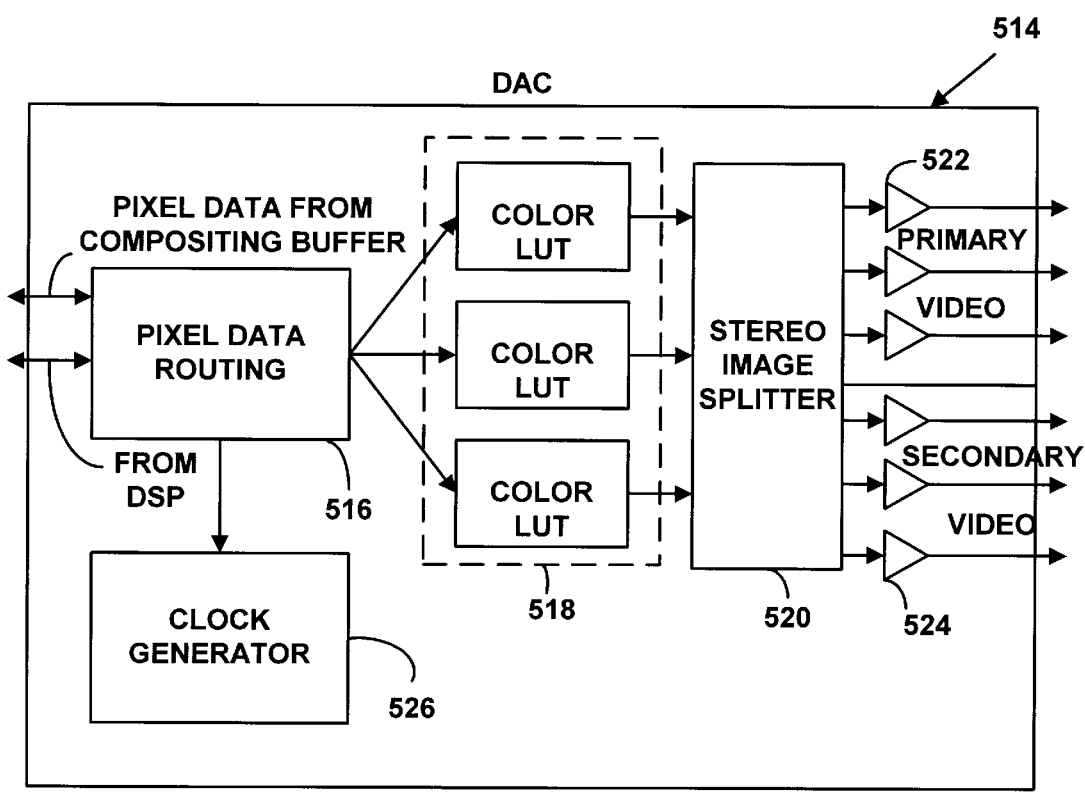
FIG. 14 is a block diagram of a digital-to-analog converter (DAC) in an embodiment.

FIG. 14 is a block diagram illustrating the DAC 514 on the image processing board 174. The DAC 514 implements the basic functions that are common to most RAMDACs on the market today. The DAC includes logic for reading and writing internal control registers, and for pipelining the video control signals. Additional functional blocks are described below.

The pixel data routing block 516 is used to control the routing of pixel data from the compositing buffers. In the normal operating mode, this data is passed at pixel rates to the Color LUTs 518 for each of the three channels. This block also allows the data to be read back to the DSP for diagnostic purposes.

The stereo image splitter 520 supports two separate video signals for stereoscopic display using a head mounted display system. In this mode, the two video channels (522, 524) are interleaved from the compositing buffer, and must be split out by the DAC 514. The stereo image splitter 520 performs this function on the DAC 514. In the normal single channel mode, the LUT data is passed directly to the Primary DACs.

Alternatively, the DAC 514 can be designed to generate a single video output. With a single video output, the DAC can generate a stereoscopic display using a line interleaved format, where one scanline for one eye is followed by the scanline for the other eye. The resulting video stream has a format such as 640×960, for example, which represents two 640×480 images.

The clock generator 526 is used to generate the video and audio clocks. These clocks are generated by two phase locked clock generators to eliminate synchronization drift. The clock generator can also be slaved to a control signal from the Media Channel, allowing the image processing board to sync to an external sync source.

Tiling

As outlined above, the image processor (FIG. 1) performs scan-conversion, hidden surface removal, antialiasing, translucency computation, texturing, and shading. In this section we describe scan conversion, hidden surface removal, antialiasing and translucency computation in detail.

Figure 4B:
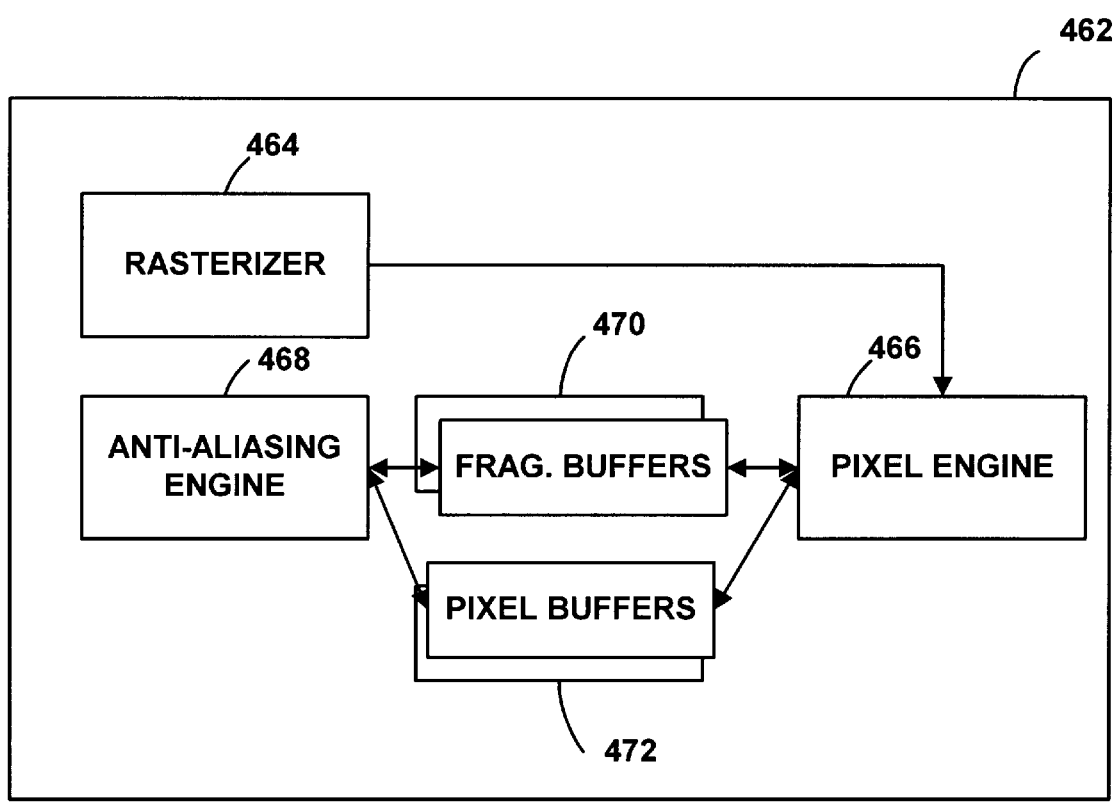
FIG. 4B is a block diagram illustrating portions of an image processor for rendering geometric primitives in an embodiment.

FIG. 4B is a block diagram illustrating portions of the image processor 462 for producing rendered image data from geometric primitives. The image processor includes a rasterizer 464, a pixel engine 466, an anti-aliasing engine 468, and a rasterization buffer, which includes pixel buffers 470, and a fragment buffer 472 in this embodiment. The "rasterizer" refers to the part of the image processor that determines pixel values from the geometric primitives, i.e. polygons. The rasterizer 464 reads primitive data and produces pixel data associated with a pixel location. This pixel data includes color, alpha, and depth (distance from the viewpoint). When a pixel is not entirely covered by a polygon, the rasterizer generates pixel fragment data.

As it scan converts a polygon, the rasterizer passes pixel data to the pixel engine for processing. The pixel engine 468 reads the pixel data from the rasterizer and determines which pixel data to store in the pixel and fragment buffers. The pixel buffers 472 are two-dimensional arrays, where the elements in the arrays correspond to pixel locations and include memory for storing color, alpha and depth data. The fragment buffer 470 stores fragment data to represent partial coverage of a pixel.

The pixel engine 466 performs hidden surface removal using depth values generated by the rasterizer and also maintains pixel fragments and translucent pixels for antialiasing and translucency processing. For a given pixel location, the pixel engine retains the nearest fully covered opaque pixel, if any. In this context, "fully covered" means that the pixel is entirely covered by a polygon that is being scan converted in the rasterizer. The pixel engine also retains pixels with translucency (alpha less than 1) and pixel fragments in front of the nearest opaque pixel. The pixel engine stores the nearest opaque pixel for a pixel location in the pixel buffer, and stores in the fragment buffer any fragments or translucent pixels at this pixel location that are in front of the nearest opaque pixel.

After the pixel engine generates pixel data, the anti-aliasing engine 468 resolves the pixel data in the pixel and fragment buffers. The design of the image processor illustrated in FIG. 4B supports double buffering of pixel data and single buffering of fragment data. The pixel engine generates pixel data in one of the pixel buffers, and adds fragment information into the fragment buffer while the anti-aliasing engine resolves the pixel data from the other pixel buffer and fragment data from the fragment buffer. As each fragment is resolved, the fragment entry is added to the fragment free list for use by new pixel data.

Having provided an overview of the process of generating and resolving pixel data, we now describe an embodiment in more detail. Below we describe an embodiment with reference to the tiler, shown generally in FIG. 4 and illustrated in more detail in FIGS. 9A–9C. We provide more detail regarding the tiler, including the components pertaining to scan conversion and antialiasing, as well as the components referring to textures. We will describe components used in multi-pass rendering, shading, and textures now, and will elaborate on these concepts later in our description.

The components of FIG. 4B can implemented on the tiler. The tiler reads primitive data and rendering instructions from the shared memory system 216 (FIG. 4A), produces rendered image data, and stores compressed image data in shared memory. As described above, the basic 3-D graphics primitives in the system are triangles. Triangle rendering provides numerous simplifications in hardware used for graphics generation since the triangle is always planar and convex. However, alternatively n-sided polygons can also be used.

Above we explained the components of the tiler 200. Here we describe the data flow through the tiler in more detail.

Since the tiler receives inputs from the DSP, we begin with a recap of functions of the DSP 176 (FIG. 4). As described above, the DSP 176 can perform front end geometry and lighting calculations required for 3-D graphics. The DSP 176 calculates model and viewing transformations, clipping, lighting, etc. Rendering commands are stored in main memory buffers and DMAed (Direct Memory Accessed) to the image processing board over a PCI bus. The rendering commands are then buffered in the shared memory 216 (FIG. 4A) until needed by the DSP. The rendering commands are read by the tiler 200 (FIG. 4A) when it is ready to perform image processing operations.

Figure 15A:
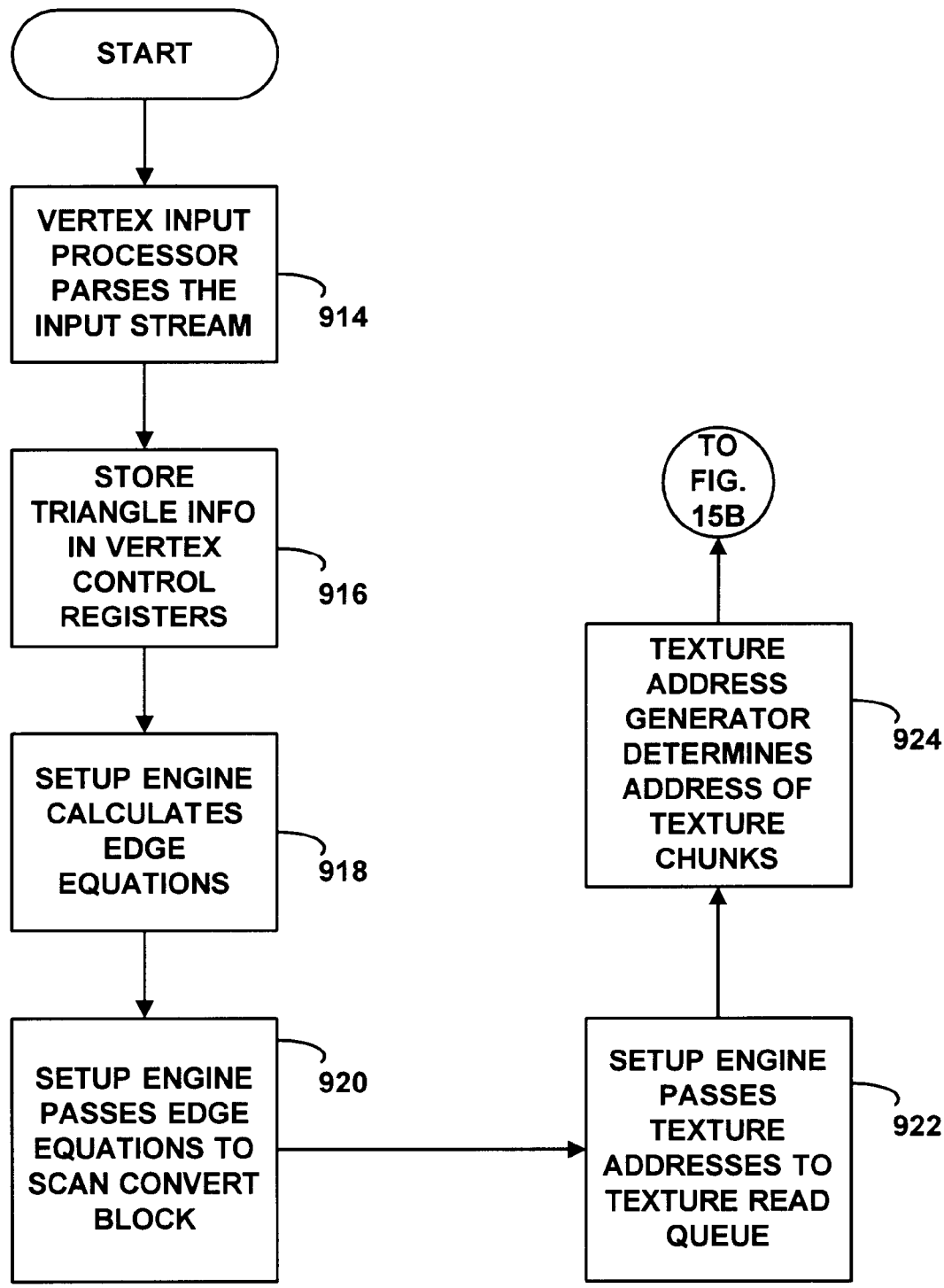
FIGS. 15A–F are a flow diagrams illustrating aspects of pixel and fragment generation in three alternative embodiments.
Figure 15B:
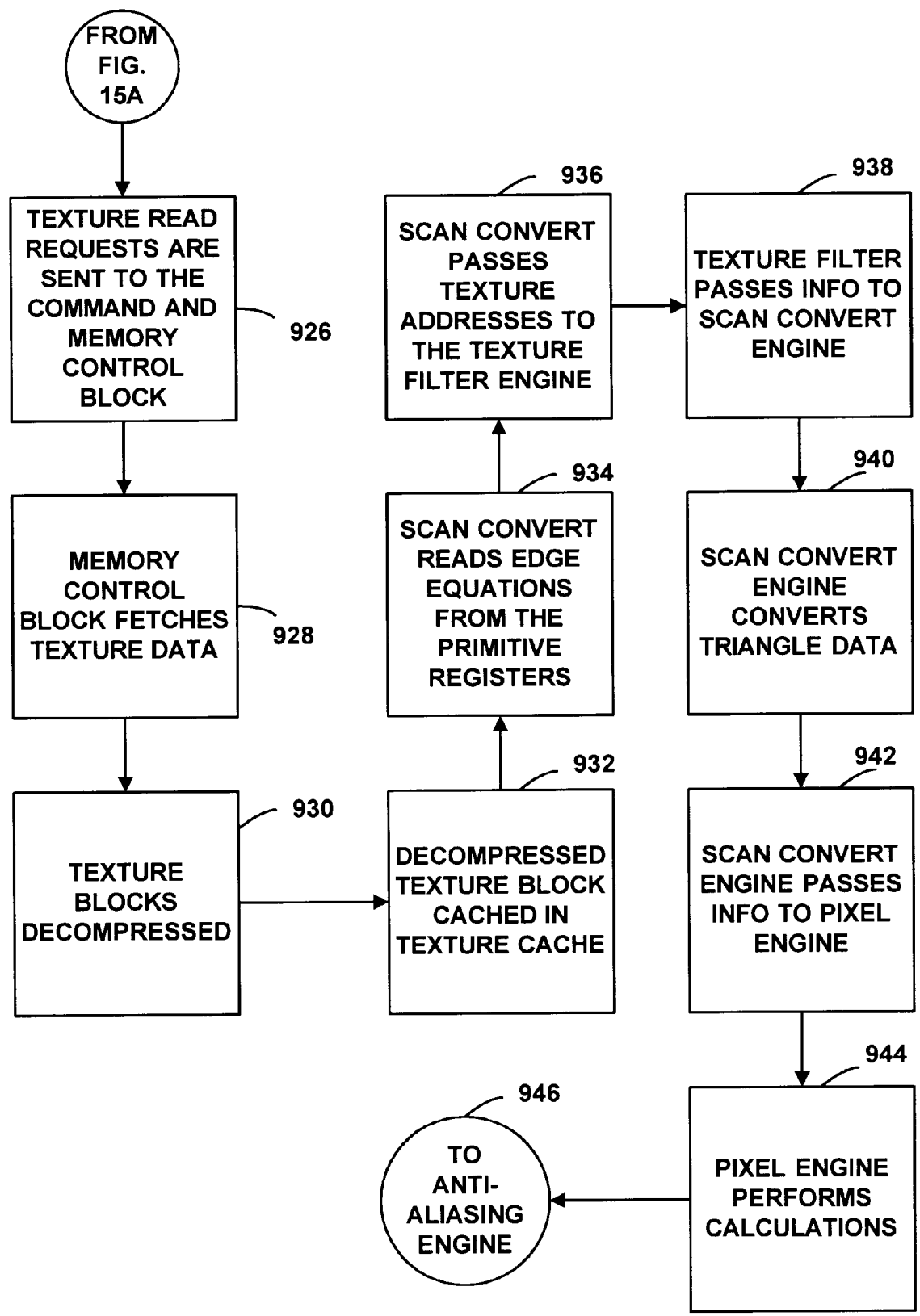

As is shown in the flowchart in FIGS. 15A and 15B, the setup block processes primitive rendering instructions read from the shared memory. The vertex input processor parses the input stream (914) (FIG. 15A), and stores the information necessary for primitive triangle processing in the vertex control registers (916).

The two vertex control registers store six vertices, three for each triangle in each register. The two vertex control registers allow for double buffering of triangle information to assure that the setup engine always has triangle information to process.

The setup engine then calculates the linear equations (918) which determine the edge, color, and texture coordinate interpolation across the surface of the triangle. These linear equations are used to determine which texture blocks will be required to render the triangle. The edge equations are also passed to the scan convert block (920) and are stored in the primitive registers within the scan convert block until required by the scan convert engine. The primitive registers are capable of storing multiple sets of edge equations.

The setup engine also passes texture addresses to the texture read queue (922), which buffers requests for texture chunks. The texture address generator then determines the address in memory of the requested texture chunks (924) and sends the texture read requests to the command and memory control block (926) (FIG. 15B), which will fetch the texture data (928) used by the scan convert block.

Texture data is stored in the shared memory (216) (FIG. 4A) in a compressed image format which may be the same format as the image data. The compression format is performed on individual 8×8 pixel blocks. The 8×8 blocks are grouped together in 32×32 blocks for memory management purposes to reduce memory management overhead.

As texture blocks are needed, they are fetched into the tiler, decompressed by the decompression engine (930), and cached in an on-chip texture cache (932). A total of 32 8×8 pixel blocks can be cached, although each block stores only one color component. The texture data is cached in an R G B and Alpha format.

The scan convert engine then reads the edge equations from the primitive registers (934) to scan convert the triangle edge information. The scan convert engine includes interpolators for walking the edges of the triangles, interpolating colors, depths, translucency, etc.

The scan convert engine passes texture addresses to the texture filter engine (936). The texture filter engine calculates texture data for the polygons that are being rendered. The texture filter engine computes a filter kernel based on the Z-slope and orientation of the triangle, and on the s and t coordinates. The texture cache attached to the texture filter engine store texture data for sixteen 8×8 pixel blocks. The texture cache is also in communication with the decompression engine which will decompress texture data (which is stored in a compressed format) for use by the texture filter engine.

When the texture filtering is completed, the texture filter engine passes the information back to the scan convert engine (938), so it can be used by the scan convert engine for further processing. Along with texture processing, the scan convert engine scan converts the triangle edge data (940) and the individual pixel addresses along with color and depth information are passed to the pixel engine for processing (942).

Figure 15C:
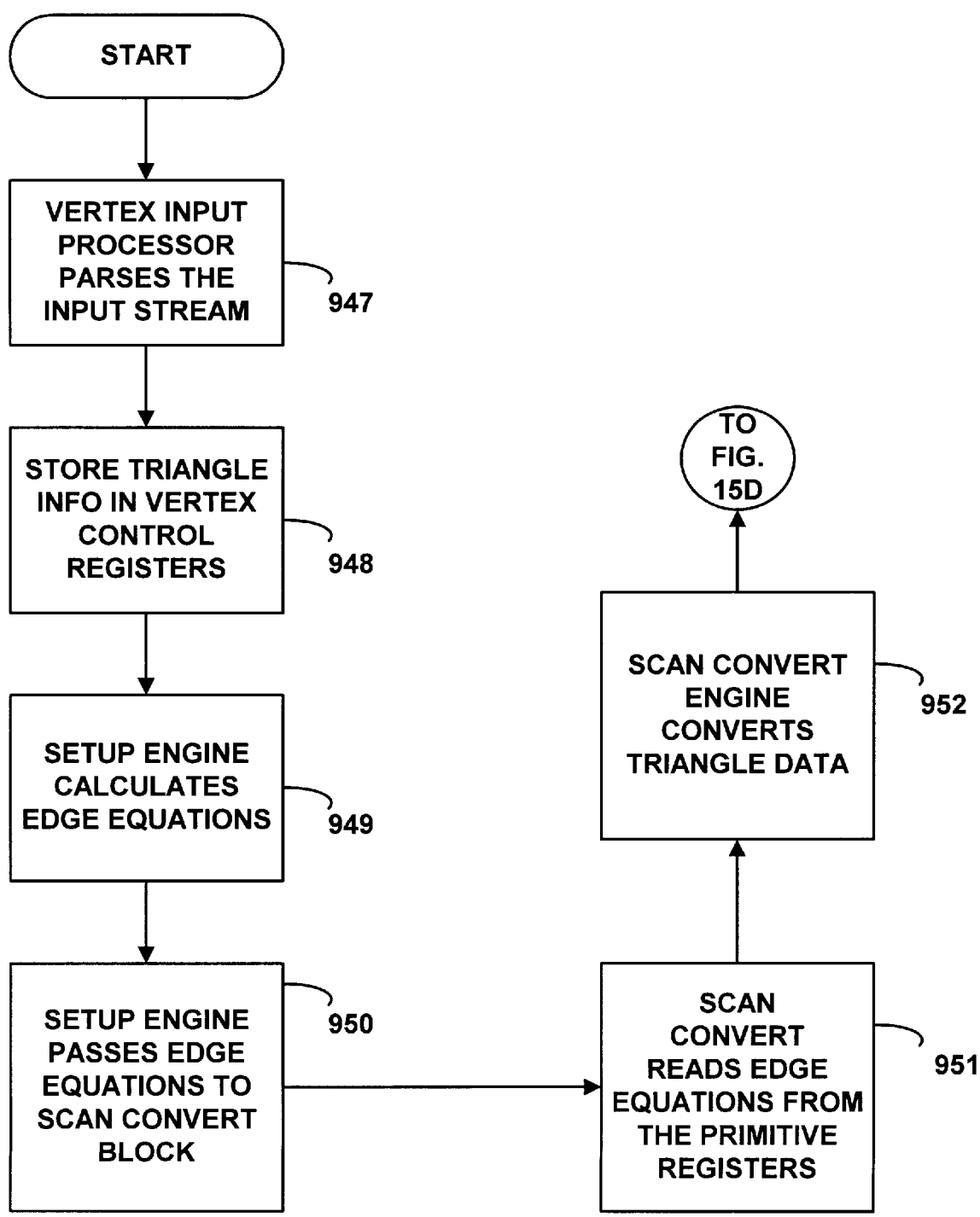
Figure 15D:
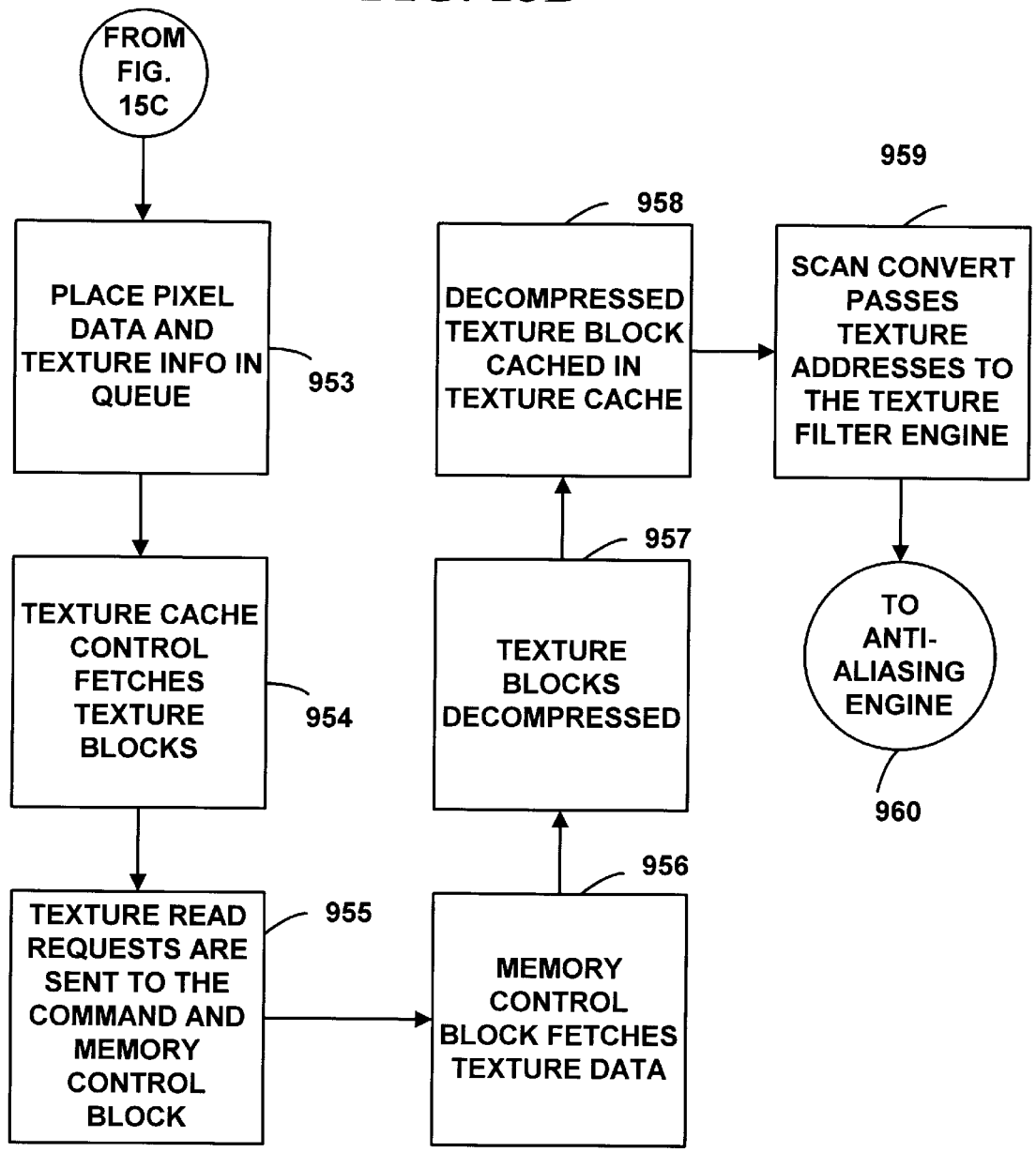
Figure 15E:
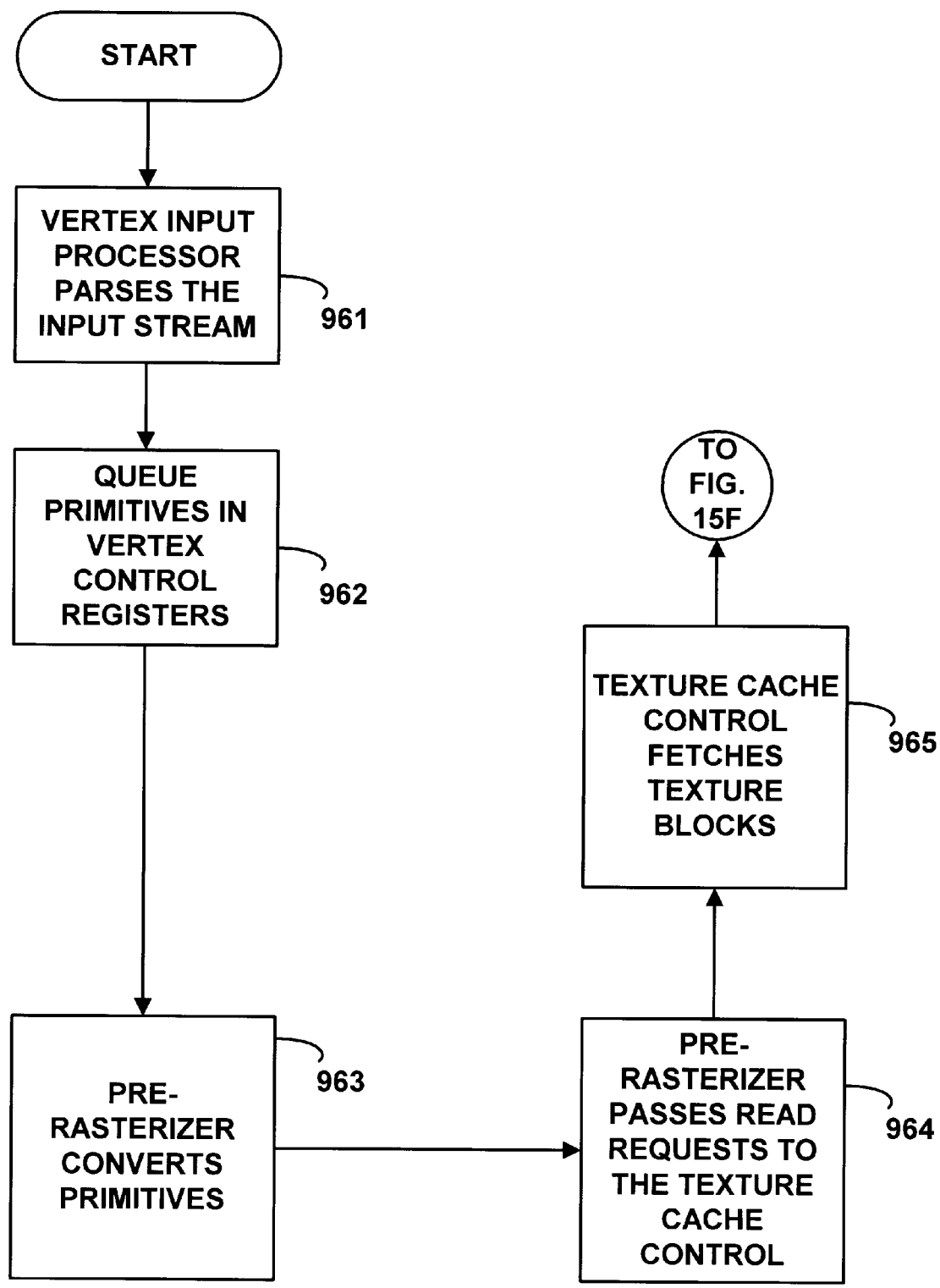
Figure 15F:
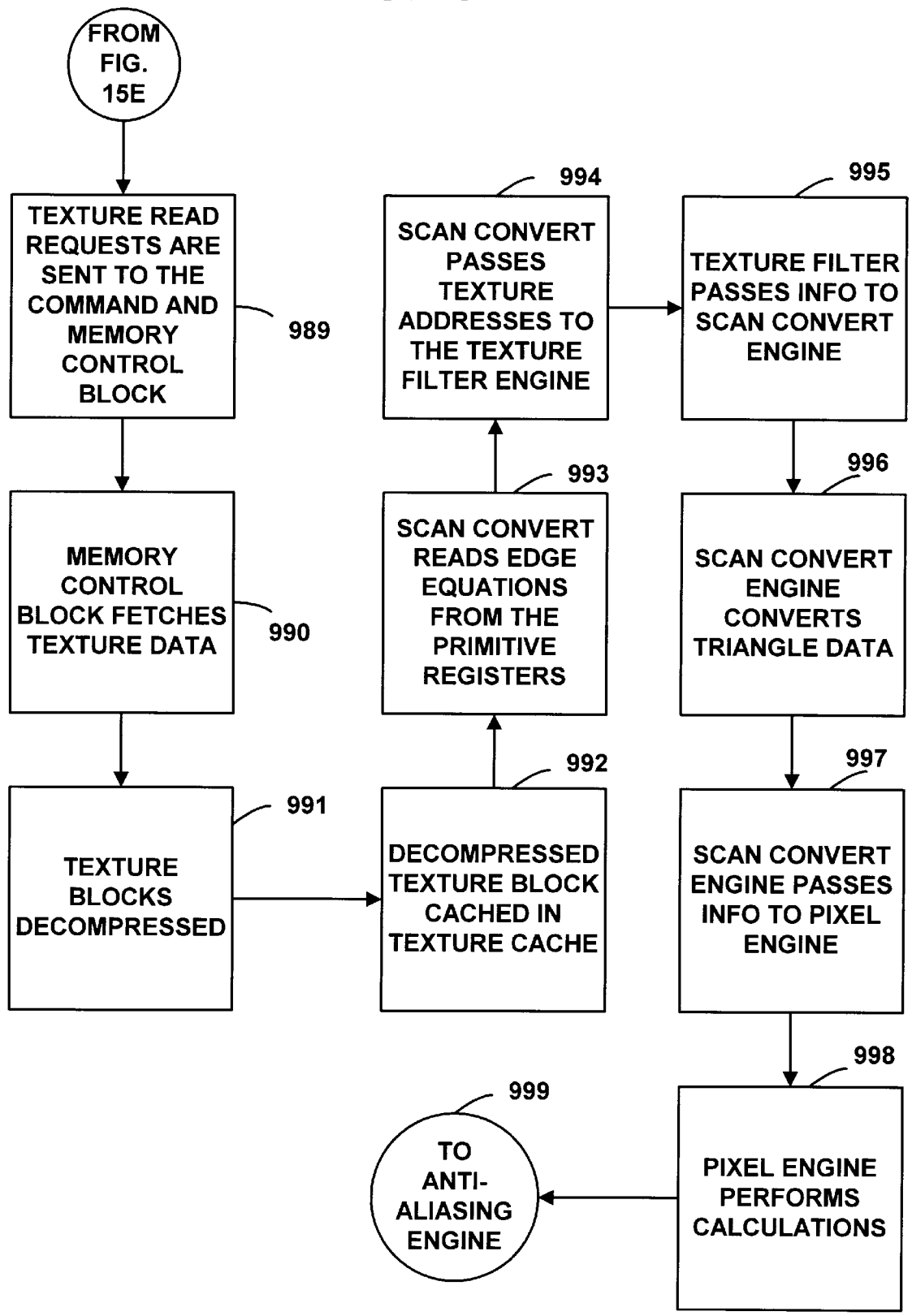

The method illustrated in FIGS. 15A and 15B varies for the alternative methods described in connection with FIGS. 10 and 11. FIGS. 15C and 15D illustrate a method for accessing image data corresponding to FIG. 10 and 9B. Similarly, FIGS. 15E and 15F illustrate a method for accessing image data corresponding to FIG. 11 and 9C.

Referring first to FIGS. 15C and 15D, this implementation of the method begins in the set-up block 381 in FIG. 9B. The vertex input processor 384 processes the input data stream (947). Next, the vertex control registers 386 buffer triangle data from the input data stream (948). The set-up engine 388 then calculates the edge equations (949) and passes them to the scan convert block 395 (950).

The scan convert block 395 reads edge equations stored in the primitive registers (951) and scan converts triangle data (952). The scan convert engine 398 then writes pixel data including the pixel address, color and alpha data, and coverage data to an entry in the texture reference data queue 399 (953) (FIG. 15D). In the case of texture mapping operations, this entry also includes texture reference data, namely, the coordinates of the texture centerpoint. The entry may also include texture filter data such as level detail or anisotropic filter control data.

From the texture reference data, the texture cache control 391 determines which texture blocks to fetch and causes the appropriate texture block or blocks to be fetched from memory (954).

The texture address cache control 391 sends texture read requests to the command and memory control block 380 (955). The texture read queue 393 buffers read requests for texture blocks to the shared memory system. The memory control 380 fetches the texture data from shared memory, and if it is compressed, places the compressed block or blocks in the compressed cache 416 (956). The decompression engine 404 decompresses compressed mage data and places it in the texture cache 402 (957, 958). As described above in connection with FIG. 10, the replacement of blocks in the texture cache proceeds according to cache replacement algorithm.

To carry out texture mapping or other pixel operations requiring image data in the texture cache, the texture filter engine 401 reads texture addresses from the texture reference data queue 399 (959). The texture filter engine 401 accesses the image data in the texture cache 402, computes the contribution from texture, and combines this contribution with the color and possibly alpha data from the texture reference data queue 399.

The texture filter engine 401 passes pixel data to the pixel engine 406, which then performs hidden surface removal and controls storage of the pixel data to a rasterization buffer.

FIGS. 15E and 15F illustrate a method for accessing image data blocks from memory corresponding to the approach in FIG. 11. In this alternative implementation, the method begins by queuing primitives in the set-up block 383. The vertex input processor 384 parses the input data stream and queues triangle data in the vertex control registers 387 (961, 962). When image data blocks need to be accessed from memory, as in the case of a texture mapping operation, the pre-rasterizer 389 scan converts primitives queued in the vertex control registers 386 to generate read requests for texture data blocks in shared memory (963).

As the pre-rasterizer scans a primitive queued in the set-up block, it passes texture read requests to the texture cache control 391 (964). The texture cache control 391 determines the appropriate texture blocks (965) and transfers read requests to the command and memory control block 380 (989) (FIG. 15F) via the texture read queue 393. The memory control block fetches the requested texture data, and if it is compressed, stores it in the compressed cache 416 (990). The decompression engine decompresses texture blocks in the compressed cache 416 and writes the decompressed image data to the texture cache 402 (991, 992). The texture cache control manages the flow of texture blocks from the compressed cache 416, through the decompression engine 404, and into the texture cache 402

The scan convert block 397 reads the geometric primitives queued in the set-up block. The scan convert block 397 performs pixel generation operations as soon as requested texture data is available in the texture cache 402. In the process of performing these pixel operations, the scan convert engine 398 reads edge equations from the primitive registers (993) and passes texture addresses to the texture filter engine 403 (994). The texture filter engine accesses the appropriate image data stored in the texture cache 402 and then returns filtered data to the scan convert block 397 (995). The scan convert block 397 converts the triangle data and computes output pixel data from converted triangle data and the filtered data (996). It then passes this output pixel data to the pixel engine 406.

The pixel engine 406 performs pixel level calculations including hidden surface removal and blending operations. To perform hidden surface removal, the pixel engine 406 compares depth values for incoming pixels (fully covered pixels or pixel fragments) with pixels at corresponding locations in the pixel or fragment buffers. For shadowing operations, the pixel engine provides a Z-value to the texture filter engine 400 where it is compared with Z-values in a shadow Z map (stored in the texture cache). After performing the pixel level calculations, the pixel engine stores the appropriate data in the pixel or fragment buffers.

The tiler implements a high quality anti-aliasing algorithm for dealing with non-opaque pixels. The pixel buffer stores the pixel data for the front-most non-transparent pixel for pixel locations in a chunk. The fragment buffer stores pixel fragments for translucent pixels and for partially covered pixels closer to the viewpoint than the pixels in the pixel buffer for corresponding pixel locations. More than one fragment for a pixel location can be stored using a fragment list structure. In a process referred to as resolving, the anti-aliasing engine processes the fragment lists to compute color and alpha values for pixel locations. To reduce the number of fragments that are generated, the pixel engine implements a method for merging pixel fragments which compares the fragment that is being generated with fragment(s) currently stored in the fragment buffer. If the new and previous fragment's attributes (color and depth) are similar to within a preset tolerance, the fragments are combined on the fly and no additional fragment is generated.

If a combined fragment is found to be fully covered (with a full coverage mask and opaque alpha), then the fragment is written into the color buffer and that fragment location is freed up to use for subsequent polygons within the current chunk.

Once all the polygons for the chunk are rendered, the pixel buffers are swapped. While the anti-aliasing engine resolves the pixel data in the fragment buffer and one of the pixel buffers, the pixel engine writes pixel data for the next chunk in the other pixel buffer and the remaining free locations in the fragment buffer. In general, pixel resolution comprises computing a single color (and possibly alpha) value for a pixel location based on the pixel data in the pixel and fragment buffers corresponding to the location. We provide additional detail addressing these issues below.

In the implementations of the tiler shown in FIGS. 9A–9C the pixel engine and antialiasing engine have access to a single fragment buffer and a pair of pixel buffers. The two 32×32 pixel buffers are provided for double buffering between the pixel engine and the anti-aliasing engine. The pixel buffer entry includes the following data:

| R | G | B | $\alpha$ | Z | P |
|---|---|---|---|---|---| where R, G, B are the red, green, and blue color components respectively, $\alpha$ is the alpha component which represents the translucency of the pixel, and Z is the Z component which represents the depth of the pixel from the eye point. The x,y address is fixed and implicit in the pixel buffer addressing. Eight bits are used per color component (i.e. Red, Green, and Blue), eight bits are used for the $\alpha$ component, and twenty-six bits are used to store the Z-value, stencil value, and a priority value. Out of this 26 bits, up to 24 can be used as Z values, up to 3 can be used as stencil planes and up to three can be used as priority values. As described above with reference to FIG. 9, the buffer also includes a 9 bit fragment buffer pointer.

The priority value is fixed per primitive and is used to help resolve objects which are coplanar, such as roads on top of terrain, by using priority relationships which are used by the tiling engine to margin the incoming pixel Z-value, as compared to the stored Z-value, during the Z compare operation.

The fragment buffer is used to store information about pixel fragments for polygons whose edges cross a given pixel or for polygons with translucency. Each entry in the fragment buffer provides color, $\alpha$, Z and coverage data associated with the surface.

Multiple fragment buffer entries can be associated with a single pixel (via a linked list mechanism) for cases in which multiple polygons have partial coverage for the same pixel location. The fragment buffer is dual ported so that it can be operated on by the anti-aliasing engine and the pixel engine in parallel. In one possible implementation the fragment buffer is a one-dimensional array of fragment records and includes a total of 512 fragment record entries. The memory management of the fragment buffer is performed using a linked list structure. Each fragment buffer entry includes the following data:

| R | G | B | $\alpha$ | Z | M | P | S |
|---|---|---|---|---|---|---|---| where R, G, B are the red, green, and blue color components respectively, $\alpha$ is the alpha value which represents the translucency of the pixel, and Z is the Z-value which represents the depth of the pixel from the eye point, M is a 4×4 pixel coverage bitmask for each pixel which is partially covered, P is a pointer to the next fragment buffer entry, and S is used to represent a fragment stencil. Eight bits are used per color component (i.e. Red, Green, and Blue), eight bits are used for the $\alpha$ component, twenty-six bits are used to store the Z-value plus stencil and priority, and nine bits are used for the fragment pointer P.

The pixel coverage mask is computed by determining a coverage mask value for each edge and bitwise ANDing them together. The computation of the coverage mask is a two step process. The first step is to determine how many of the subpixel bits in the coverage mask are to be turned on, and the second step is to determine which specific bits are to be enabled.

The first step uses the area of the pixel which is covered by the edge to determine how many of the coverage mask bits are to be switched on. This area is computed by a table lookup indexed by the edge slope and distance from the pixel center. The second step uses the edge slope to determine the order in which the sample bits are to be switched on. The set of bit orders is stored in a pre-computed tabled called the 'Coverage Order' table. Each coverage order table entry consists of a specific ordering of the sample bits which is correct for a range of slope values. The edge slope is tested against the set of slope ranges, and the index associated with the range containing this slope value is used as the index into the coverage order table.

A method for computing the coverage mask is described in Schilling, A. "A New Simple and Efficient Anti-Aliasing with Subpixel Masks", *Computer Graphics*, Vol. 25, No. 4, July 1991, pp. 133–141.

Hidden Surface Removal and Fragment Merging

Above, we indicated that the pixel engine performs hidden surface removal by performing depth compare operations on incoming pixel data. We also noted that pixel fragments can be merged to free up fragment memory. Fragment merging reduces the storage requirements to anti-alias a given scene, and speeds fragment resolution to produce a final image. We now describe an implementation for hidden surface removal which includes merging an incoming pixel fragment with a stored pixel fragment when the incoming fragment is within pre-determined color and depth tolerances of the stored fragment.

FIG. 4B is a block diagram illustrating components in the tiler 462, including a rasterizer 464, pixel engine 466, pixel and fragment buffers 470 and 472. The pixel and fragment buffers serve as rasterization buffers for storing selected pixel data. As the rasterizer scans across a geometric primitive, it generates instances of pixel data. The pixel engine controls Z buffering and also determines whether an incoming pixel fragment can be merged with a pixel fragment stored in the fragment buffer at a corresponding pixel location. The illustrations of tilers shown in FIGS. 9A–9C and accompanying text above provide further detail regarding specific implementations of the tiler. The method and hardware for merging pixel fragments described below can be implemented in these tiler designs and alternative designs as well.

As described above, the scan convert block (rasterizer) in the tiler generates instances of pixel data representing: 1) fully covered, opaque pixels; 2) fully covered translucent pixels; 3) partially covered, opaque pixels; or 4) partially covered, translucent pixels.

The pixel buffer stores color, and depth (Z) of the front-most, fully covered opaque pixel. The pixel buffer also stores a pointer to a fragment list, including fragments that have a coverage mask that is not fully covered, or have an alpha that is not fully opaque. The head, or first fragment in the fragment list, is the most recent pixel fragment processed. In this particular implementation, the pixel engine attempts to merge incoming pixel fragments with the most recent pixel fragment. Since there is a certain amount of spatial coherence when rendering polygons, attempting to merge with the most recent fragment generated for a given pixel location increases the probability that the merge will be successful.

The fragment lists for each pixel location are kept in an unsorted form, with the head fragment being the most recent fragment generated for a particular pixel location. The pixel fragments behind the head fragment are left unsorted, but can also be sorted if additional computational time is available to help optimize the fragment resolve phase.

In one alternative implementation, the pixel engine includes additional logic to search fragment lists for a pixel fragment that meets fragment merge criteria. This approach is not preferred because the overhead of the search logic does not justify the incremental improvement in identifying more merge candidates. This is especially true in a real time system where additional clock cycles consumed in the merge process increase the time required to render a frame of animation.

In another implementation, the pixel engine maintains a depth sorted list of pixel fragments and attempts to merge with the fragment closest to the viewpoint for a given pixel location. This last approach is not preferred, however, since it is less likely to find successful merge candidates, i.e. fragments with Z and color values within pre-determined tolerance to the incoming fragment. It does have the potential benefit of simplifying the freeing of additional fragment memory. If a merged pixel is completely covered and opaque, all pixel fragments at that pixel location can be freed since the merged pixel is the closer to the viewpoint than the other pixel fragments stored for the pixel location.

Figure 16:
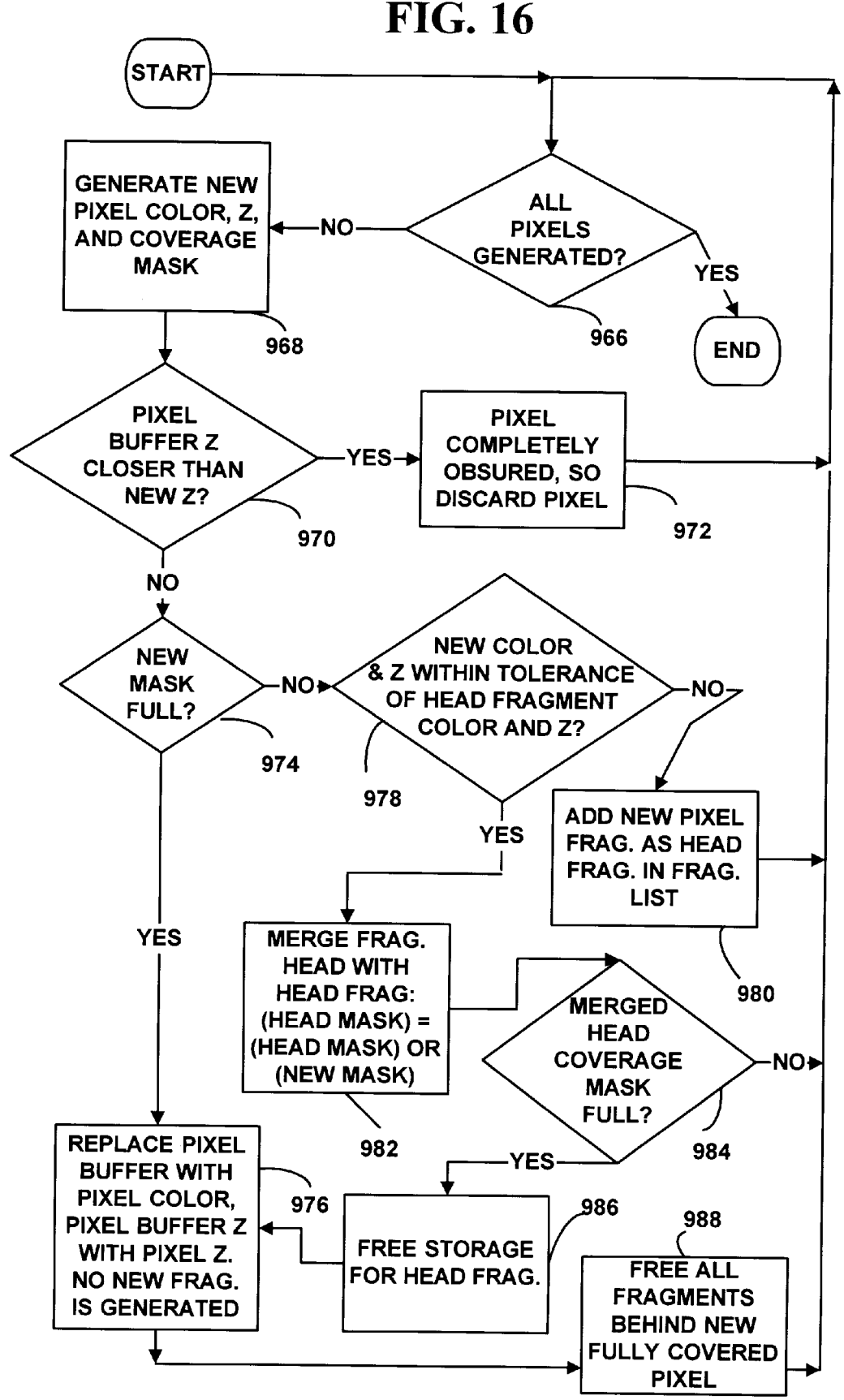
FIG. 16 is a flow diagram of a method for merging pixel fragments in an embodiment of the invention.

FIG. 16 is a flow diagram illustrating one implementation of hidden surface removal and fragment merging in the tiler. Processing begins with the generation of a new instance of pixel data having color, Z, and coverage mask (968) for a pixel location. If the pixel buffer Z for this pixel location is closer than the Z of a new instance of pixel data (a fully or partially covered pixel)(970), then the new instance of pixel data is completely obscured and is discarded (972). Processing then continues with the next instance of pixel data, as long as the rasterizer has not generated all pixels for the current set of primitives being rendered.

If the pixel buffer Z is not closer than the Z of the new instance of pixel data (i.e. the Z of the new instance of pixel data is closer to the viewpoint), then the pixel engine checks the coverage mask of the incoming pixel (974). In cases where the coverage mask for the incoming pixel is full, the pixel engine replaces the pixel buffer color and Z with the new color, and Z (976). No new pixel data is added to the fragment list in this case, and memory is conserved.

If the coverage mask of the new instance of pixel data is not full, then the pixel engine performs a merge test to determine whether the new color and Z are within pre-determined tolerances of the head fragment color and Z (978). This merge test can also include determining whether the alpha (translucency) of the incoming pixel is within a pre-determined tolerance of the alpha in the head fragment. If the new fragment color and Z are not within the pre-determined tolerances, then a new pixel fragment is added to the fragment buffer at the head of the fragment list (980).

If the new fragment color and Z are within the pre-determined tolerances and the new coverage mask is not full, then the incoming pixel fragment is merged into the head fragment in the fragment list (982). The pixel engine merges the pixel fragments by performing an OR operation on the head coverage mask and the new coverage mask, leaving the result in the head coverage mask.

After combining the coverage masks, the merged head coverage mask is checked to determine whether it represents a fully covered pixel (984). If the merged head coverage mask is not full, then processing continues with the next instance of pixel data (966). If the merged head coverage mask is full, the merged head coverage mask has resulted in full pixel coverage. Therefore, the storage used for the head fragment is freed (986), and the head fragment color, Z, and coverage mask are replaced with the new fragment color, Z, and coverage mask (976).

In cases where the pixel engine replaces an entry in the pixel buffer with a new, fully covered pixel, the pixel engine also frees all pixel fragments in the corresponding fragment list with depth values greater than this fully covered pixel (988). This occurs when an incoming fully covered, opaque pixel has a lower Z value than the pixel buffer entry at the same pixel location. It also occurs when a merged fragment is fully covered, opaque, and has a lower Z value lower than the pixel buffer entry at the same pixel location. In these circumstances, the pixel engine traverses the fragment list, compares the Z of the new fully covered pixel with the Z of the fragments in the list, and frees each fragment with a Z greater than the Z of the new fully covered pixel. Alternatively, the Z buffer could be saved for the packing process, eliminating the need to scan the fragment list and improving real-time performance.

The approach shown in FIG. 16 reduces the memory storage requirements to anti-alias a given scene, and speeds fragment resolution to produce a final graphics image by discarding pixel fragments which are not used. Adjusting the color and Z tolerance allows the number of generated fragments discarded to be balanced against anti-aliasing accuracy depending on the needs of the user. If color and Z are evaluated at the edge of the polygon nearest the pixel center, tighter color tolerances and Z tolerances can be used and still conserve memory.

Figure 17:
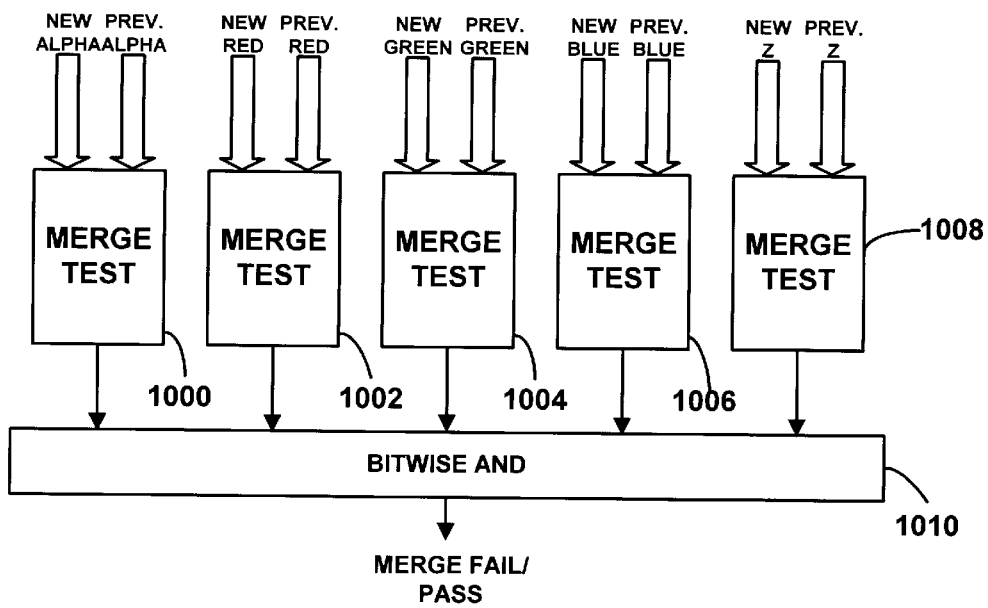
FIG. 17 is a block diagram illustrating an implementation of fragment merge circuitry in an embodiment of the invention.

FIG. 17 is a block diagram illustrating one implementation of fragment merge circuitry used to perform a merge test on incoming pixel fragments. In this implementation, the pixel engine compares the incoming color (RGB), alpha, and depth values with the color, alpha and depth values of the most recent pixel fragment for the pixel location of the incoming pixel. The color, depth and alpha components represented as "new" refer to an incoming or "newly" generated instance of pixel data, while the components represented as "prev." refer to the most recent pixel fragment for a pixel location.

In an alternative embodiment where the pixel engine traverses the fragment list to find a pixel fragment within color and depth tolerances, the components represented as "prev." refer to each of the pixel fragments in the fragment list for the pixel location that are analyzed using the merge test.

The merge test blocks 1000–1008 compare the depth, color and alpha components for new and previous pixel fragments, and if the new and previous values are within a predetermined tolerance, they output a bit indicating that the new pixel fragment is a merge candidate. The pixel engine then performs a bitwise AND (1010) to determine whether each of the merge tests has passed. If so, the pixel engine merges the new and previous pixel fragments. The pixel engine computes a new coverage mask for the previous fragment by OR-ing the new and previous coverage masks. If any of the merge tests fail, the pixel engine adds the new pixel fragment to the head of the fragment list. This new pixel fragment becomes part of the linked list and points to the previous head of the fragment list.

Figure 18:
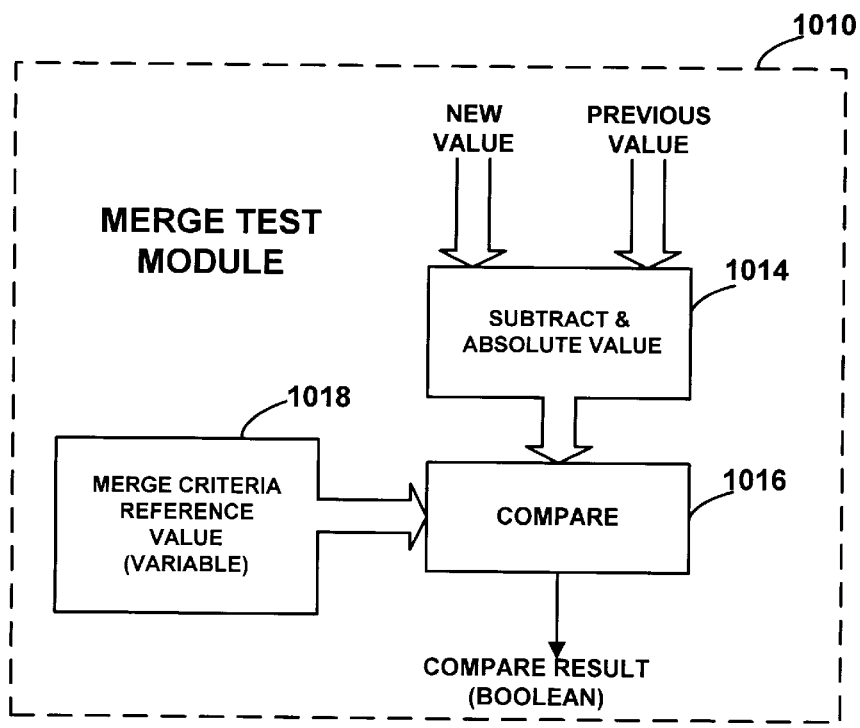
FIG. 18 is a block diagram illustrating an implementation of a merge test module in the fragment merge circuitry shown in FIG. 17.

FIG. 18 is a block diagram illustrating a merge test module 1012 in more detail. The merge test module computes the absolute value of the difference between a new and previous value 1014. A comparator 1016 in the merge test module compares the difference with a reference value stored in a tiler register 1018 and yields a boolean value indicating whether or not the new and previous values are within the pre-determined tolerance. The boolean values output from the merge test modules are input to the bitwise AND block 1010 as shown in FIG. 17. The output of the bitwise AND indicates whether each of the colors, the alpha, and the depth value are within pre-determined tolerances. If so, the pixel engine merges the incoming and head pixel fragments as described above.

As noted above, there are a number of possible variations to the method for merging pixel fragments. In an alternative implementation, the pixel engine can search a fragment list and perform a merge test on each pixel fragment until it: 1) reaches the end of the list; or 2) finds a stored pixel fragment that satisfies the merge test. In another implementation, the pixel engine can maintain the pixel fragments in a sorted form by, for example, performing an insertion sort with each incoming fragment. The pixel engine can attempt to merge an incoming pixel fragment only with the pixel fragment closest to the viewpoint (with lowest z value) or can attempt to merge with several pixel fragments stored for a pixel location.

Pixel Post Processing

After the tiler generates fragment data for a pixel location, it then sorts and resolves this fragment data to compute color at that location. As described above, the image processor generates and maintain fragments for partially covered pixels. A pixel is partially covered by a polygon if one or more of the polygon's edges cross the pixel, or if the polygon has translucency. Maintaining fragment data to perform both anti-aliasing and translucency computations can require a significant amount of memory. As the number of rendered polygons increases, the amount of memory to store pixel data and fragments also increases.

In addition to the increased memory requirements, the amount of processing required to resolve fragments can be significant as well. In a z-buffer approach, fragment data is depth sorted. In general, the primitive data is not sorted in depth order as it arrives for rendering. Since primitive data arrives in arbitrary depth order, the image processor has to sort the fragment data after generating it. The sorted data is then processed to determine the color and possibly the alpha at a pixel location. At each pixel location, several fragments can contribute to the color. If alpha is also computed the number of fragments and the complexity of processing increases as well.

For the reasons highlighted above, the memory and processing requirements to support advanced anti-aliasing and translucency can be substantial. There is a conflict between supporting sophisticated anti-aliasing and translucency computations, on one hand, and reducing memory requirements on the other. To reduce the cost of the system, the use of memory should be minimized, yet advanced anti-aliasing and translucency features usually require more memory. It is even more difficult to support these advanced features in a real time system while still minimizing memory requirements.

In one embodiment, our system renders primitives one chunk at a time, which reduces memory and allows for fragment resolution in a post processing step. While pixel data is generated for one chunk, pixel data of another chunk can be resolved. A number of benefits impacting fragment sorting and pixel resolution follow from the chunking concept. Memory requirements are significantly reduced because much of the data generated during the rasterizing process does not have to be retained after the image processor has resolved the pixels in a chunk. The image processor needs to retain the resolved color portion after resolving a chunk.

Another advantage to rendering chunks is that the pixel and fragment memory can be implemented to reduce the overhead of memory accesses. Typical graphics systems use external memories to implement color, depth and fragment buffers. It is very difficult to organize this external memory to satisfy the rigorous bandwidth requirements of real time image processing. The pixel and fragment memory needed to support rendering of a chunk, such as a 32×32 pixel region, does not have to be located in external memory. Instead, it can be implemented on the same hardware that performs rasterizing and antialiasing functions. For example, in the implementation described above, the fragment and pixel buffers can be implemented on a single chip.

The use of on-chip memories simplifies the bandwidth problems associated with external memory. On-chip memories enable efficient use of multiple memory banks. For example, one bank can be used for the pixel buffer, and another bank can be used for fragment records.

Another advantage of on-chip memory is that it is less expensive and easier to implement multi-port memories. The performance of the pixel and fragment buffers can be enhanced through the use of multi-port memories, which allow simultaneous reads and/or writes to achieve one clock per pixel processing rate. Since the fragment buffer is much smaller when chunks are rendered separately, it can be implemented on chip. Both the smaller size of the memory and its presence on-chip make it feasible and cost effective to use multi-port memory. External multi-port memories on the other hand, are expensive due to the higher per bit cost and connections between chips.

Another important advantage related to chunking is that pixels for one portion of a frame can be generated while pixels for another portion are resolved. Thus, instead of generating pixels for an entire frame and then resolving those pixels, our approach can overlap the processes of generating and resolving pixels, reducing system transport delay.

In one embodiment of our system, the image processor resolves fragments in a post processing step. While the pixel engine generates pixel data for part of an image, the anti-aliasing engine resolves fragments for another part of an image. As noted above, the pixel and fragment data is double buffered: the pixel engine can access one buffer while the anti-aliasing engine accesses the other. After the pixel engine has generated pixels for a chunk, the Tiler performs a buffer swap. The pixel engine then generates pixels for the next chunk, and the anti-aliasing engine resolves the pixels for the previous chunk.

As an alternative to double buffering, the fragment buffer can be dual ported so that the pixel engine and anti-aliasing engine can access it simultaneously. The pixel engine can then write fragment data to the fragment buffer through one port while the anti-aliasing engine accesses fragment data through another port.

In this embodiment, the double buffered memory enables the image processor to overlap pixel data generation and pixel resolution. There are a number of alternative ways to implement a double buffering scheme as well.

The image processor sorts the fragment data in depth order before completing the resolve process. In general, the image processor can sort pixel data as it generates pixels, and after it has generated pixels for a portion of an image to be rendered. For instance, the pixel engine can perform an insertion sort as it writes fragment data to the fragment buffer. In addition, the pixel engine can sort fragment data after it has completed generating pixel data for all or part of an image. The pixel engine can also sort fragments in cases where it rejects incoming pixel data. Since the pixel engine does not have to write to the fragment buffer when the incoming pixel data is rejected, it can then perform a sort of fragments before the next incoming pixel arrives. We refer to this latter approach as "background sorting" of fragments.

An insertion sort refers to depth sorting an incoming fragment with other fragments in the fragment buffer. In a real time system, an insertion sort may not be preferred because it can potentially slow down the process of generating pixel data. Searching the fragment buffer to find the proper insertion point for an incoming fragment can cause undesirable overhead. Additionally, in hardware implementations, it requires additional hardware and complicates the design of the pixel engine.

As an alternative to an insertion sort, fragments can be sorted after the image processor has completed pixel generation for a portion of an image. Some systems render an entire frame of image data at once. In such systems, sorting fragments for every pixel location in the view space can require substantial processing time and add undesirable delay, especially for a real time system. The amount of time required to perform the sorting can vary depending on the number of fragments per pixel, and depending on the degree to which insertion sorting is already performed. The sorting operation, therefore, can hold up other pixel operations from occurring, thereby decreasing performance.

By rendering a portion of the view space at a time, the fragment sorting for one part of an image can occur while a next portion is being rasterized. In essence, the anti-aliasing engine can perform fragment sorting in a post-processing step. In one embodiment, the anti-aliasing engine sorts fragments for one chunk as fragments for the next chunk are being generated.

Even in cases where pixel generation and resolution are overlapped in this manner, it still may be advantageous to perform some sorting of fragments for part of an image as the pixel engine generates pixels for that part of the image. Background sorting of pixel fragments reduces the overhead of sorting fragments after the pixel engine completes generating pixels for a set of primitives.

In one embodiment, background sorting is performed concurrently with pixel operations being performed on the pixels to reduce, and in some cases eliminate the latency required for sorting of fragments. The design takes advantage of the fact that many of the pixels are not partially covered, and therefore do not make use of the fragment buffer. The background sorting uses this spare bandwidth to perform a sort of a set of fragments in the fragment buffer.

Figure 19:
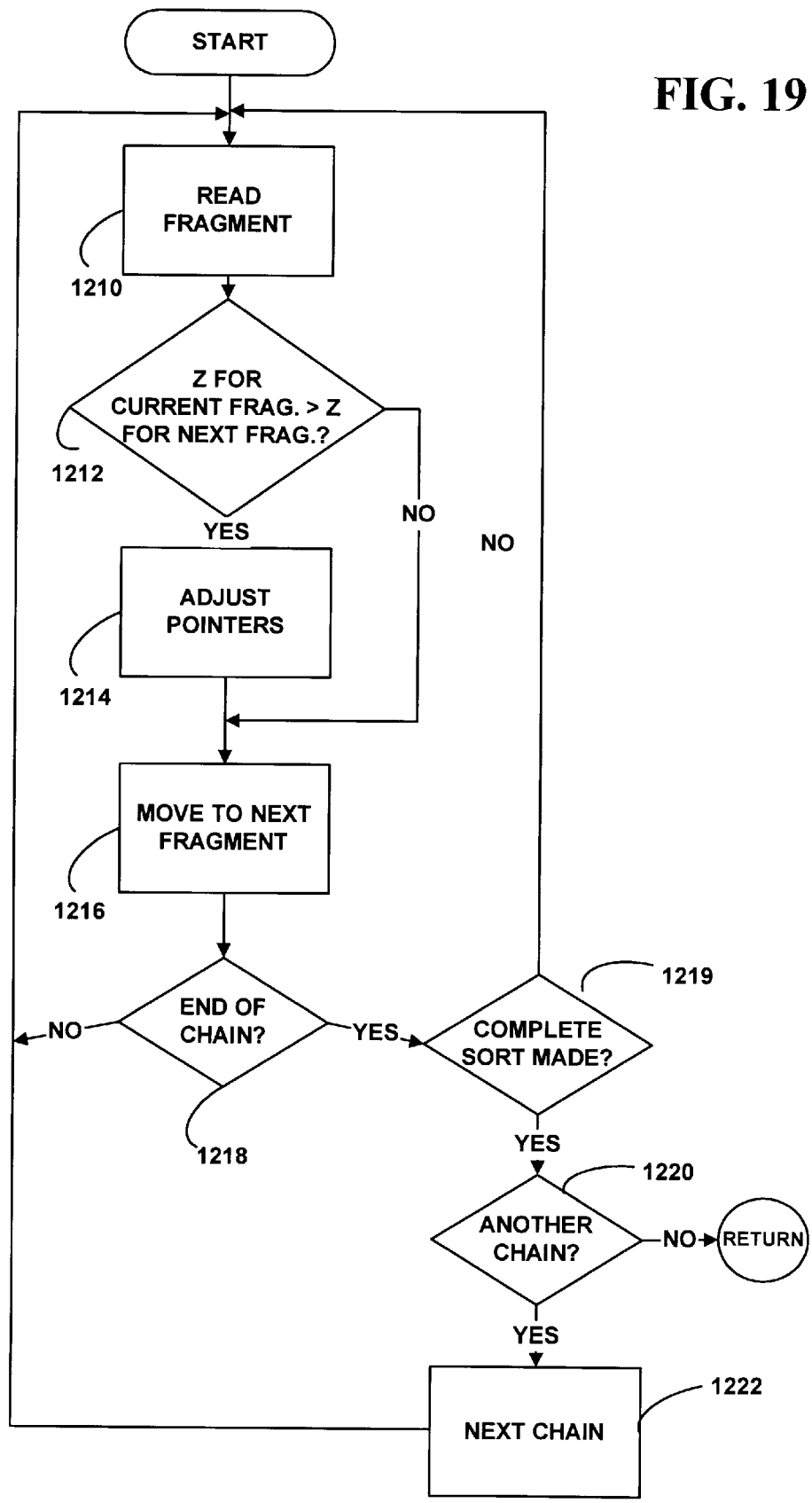
FIG. 19 is a flow diagram illustrating background sorting of fragments in an embodiment.

One way to implement background sorting is to perform a bubble sort. The pixel engine performs a bubble sort of the fragments, by walking each chain of fragments (1210) and comparing the Z values between two adjacent fragments. FIG. 19 is a flow diagram illustrating this approach.

If the current fragment has a larger Z (is further away) than the next fragment it points to in the fragment chain (1212), the two are swapped in order by readjusting their pointers (1214) accordingly. If the Z values are already in sorted order, the algorithm continues marching down the chain comparing the previous next fragment with the new next fragment (1216). The sort logic continues walking the chain (1218) until it reaches the end of the current chain. If the sort logic has completely sorted the chain (1219), then the logic moves to the next chain. If not, the logic makes another pass through the chain. The sort logic continues passing through the chain until all of the fragments are in order for the current chain. The sort logic then moves to a next chain, if another exists and needs sorting (1220, 1222).

If a new fragment should come in that has the same address as one of the ones currently being sorted, the pipeline is stalled until the two fragments have been written. This is a rare case, and therefore is unlikely to hinder performance in a system employing background sorting.

An optimization can be employed whereby an extra n×1 bit RAM is used, where n is the total number of fragments allowed per chunked region. Whenever a new fragment is added to a fragment chain, the extra bit is set for the index to the first (foremost) fragment in the chain. This bit indicates a potentially unsorted fragment. When the fragment sort hardware gets ready to move to a new fragment chain, it clears the bit for that chain and proceeds to sort it. If in the meantime, a new fragment comes in that chain, then there is a chance that the fragment is unsorted again. Since the new fragment resets the new fragment bit, it means the sort operation will have to be performed again on the fragment chain. However, using this bit to tag the fragment chain that has received a new fragment eliminates the problem inherent in sorting a buffer that is being changed without the knowledge of the sort logic. The extra bit also prevents the background sort from spending time attempting to sort buffers that have already been sorted, are not the first in a chain, or which have not been allocated yet.

If there are less total fragments available than pixels, it maybe less costly in gates to use an individual RAM since there are fewer bits, and the sort is done based on the total number of fragments, not the total number of pixels.

A hardware implementation of the sort logic includes comparators for comparing Z information, data routing multiplexers for routing the pointers (used for swapping pointers in the sort process), a 1 bit×n RAM, and the logic for setting/clearing the bit in the RAM based on the offset. It also includes a state machine that controls the compare, routing, and fragment visited, as well as the sort process. This state machine is responsible for shutting down the incoming pipeline if the new fragment needs the same fragment as is currently being sorted. The fragment buffer and fragment index RAM should be multiported so the sort logic can read or write independent of pixel generation operations performed in the pixel engine. Alternatively, the fragment buffer is double buffered.

This implementation can be extended to alternative approaches using fewer ports on the RAM. This approach may require greater control for identifying when an incoming pixel is not a fragment so the same ports can be shared between incoming pixels and the sort logic.

After sorting, the image processor resolves the fragments for a pixel location to determine the color for that pixel location. If alpha is not considered, the image processor computes color accumulation based on the color and coverage data for fragments in a depth sorted list for a pixel location. If alpha is considered in addition to coverage data, the image processor computes color accumulation based on color, coverage, and alpha of the fragments in a depth sorted list for a pixel location.

In general, the image processor can resolve fragments for pixel locations corresponding to the entire view space or for only part of the view space at a time. In the embodiment described above, the image processor resolves pixel locations in a portion of the view space called a chunk. Fragment resolution occurs after fragments have been generated and sorted.

Fragment resolution is the process during which all of the fragments for a pixel are combined to compute a single color and alpha value. This single color and alpha are written into the color buffer (and then compressed and stored to a gsprite).

Computing the resolved color includes accumulating a correctly scaled color contribution from each layer while computing and maintaining coverage information with which to scale subsequent layers. This accumulation can be performed in front-to-back, or in back-to-front depth order. In a front-to-back approach, as opposed to back-to-front, spatial coverage data can be used to determine coverage for succeeding layers. Unlike coverage, alpha data applies equally to the entire pixel area.

For front to back, the equations for computing color and alpha for sorted fragment records are:
Alpha initialized to maximum value (inverse alpha). Color initialized to 0.

$$Anew = Aold - (Aold * Ain);$$

$$Cnew = Cold + (Cin * (Aold * Ain));$$

For back to front, the equations for computing color and alpha for sorted fragment records are:
Alpha and Color initialized to 0.

$$Anew = Ain + ((1-Ain) * Aold);$$

$$Cnew = (Cin * Ain) + ((1-Ain) * Cold);$$

For a hardware implementation, front to back is preferable because the resolve process is less hardware intensive.

A pseudocode example of accumulating fragments with depth, color, and coverage only (no alpha), is set-forth below:

```
NUM_CVG_BITS is the number of bits in the coverage mask
MAX_ALPHA is the maximum alpha value
for (each fragmented pixel location) {
    ColorAccum = 0;
    CoverageAccum = 0;
    while (fragment list is not empty) {
        scan fragment list and extract closest fragment
        (coverage, color);
        ColorScale = CountSetBits(coverage &
~(CoverageAccum))/NUM_CVG_BITS;
        ColorAccum += ColorScale * color;
        CoverageAccum |= coverage
    }
    ColorAccum is pixel color
}
```

Accumulating fragments with depth, color, coverage, and alpha requires that an alpha value be computed and maintained for each subsample. This is due to the combination of coverage masks and alpha values for each fragment. It is generally the case that the accumulated alpha at any layer during accumulation is a function of all of the alpha values of previous layers. With coverage masks, each subsample can potentially have a different set of 'previous' alpha values, since a layer for which the coverage bit is clear does not contribute to that subsample.

One approach to resolving fragments with both alpha and coverage is to compute color for each subpixel in a layer separately, and then add the contribution from each subpixel location to determine the total color contribution. The alpha scale for each subpixel is determined from the alpha at that layer in addition to the alpha accumulated from other layers. This alpha scale is then multiplied by the color for the subpixel to determine the color contribution of the subpixel. The color for a layer is then determined by summing the color contributions from the subpixels.

One example of accumulating color and alpha for subpixels separately is.

```
for (each fragmented pixel location) {
    ColorAccum = 0;
    AlphaAccum[NUM_CVG_BITS] = {MAX_ALPHA,
       MAX_ALPHA, ... ,
MAX_ALPHA };
    while (fragment list is not empty) {
       scan fragment list and extract closest fragment (coverage,
          color, alpha);
       for (i=0; i<NUM_CVG_BITS; i++) {
          // if this bit is set in coverage mask
          if (coverage >> I) & 0x1 {
             // compute alpha scale value - contribution
             for this color
             AlphaScale = (alpha * AlphaAccum[i]);
             // add color scaled by alpha
             ColorAccum += (color*AlphaScale)*
             (1/NUM_CVG_BITS));
             // compute accumulated alpha for the subsample
             // AlphAccum = AlphaAccum*
                (MAX_ALPHA-alpha) =
             // AlphaAccum - AlphaAccum*alpha
             AlphaAccum[i] -= AlphaScale;
          }
       }
    }
    ColorAccum is pixel color
}
```

An example using 4 sub-pixel locations will help illustrate fragment resolution. In this example, we consider three fragments, each having a coverage mask, alpha and color value. The initial state is illustrated in table below. In this example, we accumulate color and alpha using a front to back approach. The initial alpha is set to 1, meaning full transparency. The data for each layer is as follows: fragment 0, alpha=0.5, coverage mask (cm)=0011, and color =$C_0$; fragment 1, alpha=0.3, cm=1000, color=$C_1$; fragment 2, alpha=0.8, cm=0101, color—$C_2$. The data for each fragment is provided in tables below.

With the alpha values initialized to one, the alpha coverage array is shown below.

| 1 | 1 |
|---|---|
| 1 | 1 |

To compute color, the color values for each subpixel location are multiplied by the new alpha and the alpha from the coverage array. The result for the subpixel locations is then divided by four (one divided by the number of subpixel locations). Finally, the contribution from all of the subpixel locations is summed to find the accumulated color.

| coverage mask | color | alpha for new frag. | alpha from coverage array alpha | subpixel contribution |
|---|---|---|---|---|
| 1 | $C_0$ | 0.5 | 1 | ¼ |
| 1 | $C_0$ | 0.5 | 1 | ¼ |
| 0 | $C_0$ | 0.5 | 1 | ¼ |
| 0 | $C_0$ | 0.5 | 1 | ¼ |

Using the formula, Alpha'=Alpha * (Max_alpha-new_alpha), the image processor computes the new alpha separately for each pixel location and stores it in the alpha coverage array in the table below.

| 0.5 | 0.5 |
|---|---|
| 1 | 1 |

The contribution of fragment 1 is set forth in the table below.

| coverage mask | color | alpha for new frag. | alpha from coverage array alpha | subpixel contribution |
|---|---|---|---|---|
| 0 | $C_1$ | 0.3 | 0.5 | ¼ |
| 0 | $C_1$ | 0.3 | 0.5 | ¼ |
| 0 | $C_1$ | 0.3 | 1 | ¼ |
| 1 | $C_1$ | 0.3 | 1 | ¼ |

The new alpha coverage array is as follows:

| 0.5 | 0.5 |
|---|---|
| 0.7 | 1 |

The contribution of fragment 2 is set forth in the table below.

| coverage mask | color | alpha for new frag. | alpha from coverage array alpha | subpixel contribution |
|---|---|---|---|---|
| 1 | $C_2$ | 0.8 | 0.5 | ¼ |
| 0 | $C_2$ | 0.8 | 0.5 | ¼ |
| 1 | $C_2$ | 0.8 | 1 | ¼ |
| 0 | $C_2$ | 0.8 | 0.7 | ¼ |

The alpha coverage array for the fragments after fragment 2 is as follows:

| 0.5 | 0.1 |
|---|---|
| 0.7 | 0.2 |

This method requires 2 * NUM_CVG_BITS multiplies (2*16=48 in the 4×4 case) per fragment for the computation of alpha and the color contribution. Note that the (1/NUM_CVG_BITS) scaling can be done with a shift if the number of bits in the coverage mask is a 2**n size (which is typically the case).

Figure 20:
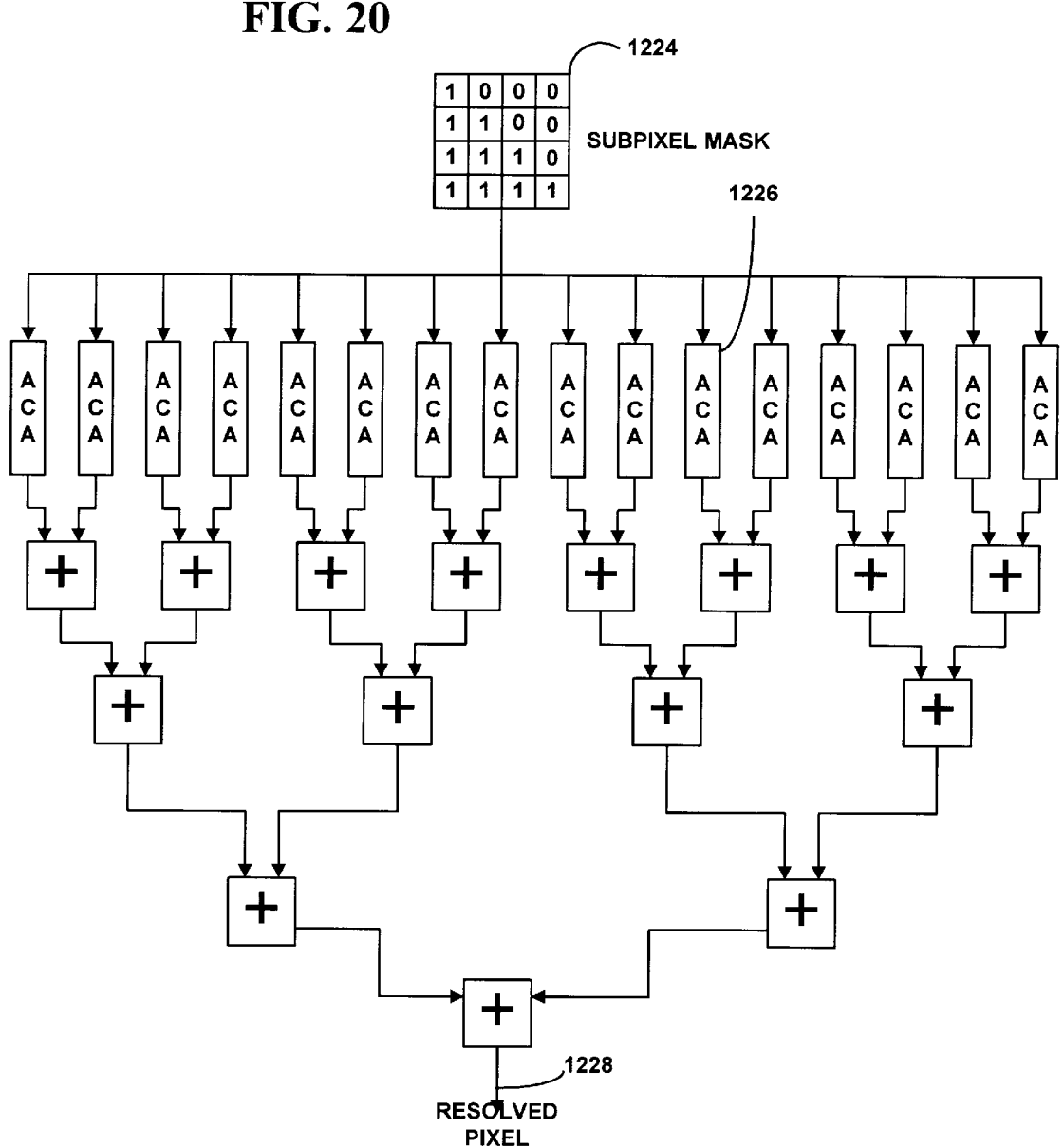
FIG. 20 is a block diagram illustrating a pixel resolution system in an embodiment.

FIG. 20 is a schematic diagram illustrating a hardware implementation of the approach described above for a pixel divided in 4×4 subpixel regions (1224). The resolve hardware includes a set of 16 identical processing and storage units called alpha and color accumulators (ACA) (1226), each ACA dedicated to one subpixel region of the pixel. During processing of the fragment list for each pixel location, the coverage masks of each fragment are used as a processing mask for the resolve hardware. The ACA performs a multiply for the alpha scale, color accumulation, and alpha accumulation. The (1/NUM_CVG_BITS) scaling is performed with a shift as set forth above. Once all fragments have been processed for a given pixel location, the output section combines the color and alpha values for all of the 16 subpixels in a hierarchical fashion (1228). The processors in the output combine the two incoming values and divide by 2. With hardware pipelining, the pixel resolve process uses only a single hardware clock per fragment entry.

An alternative technique reduces hardware requirements by treating subpixels having the same accumulated alpha similarly at each layer. This technique is based on the observation that the state in which subsamples have unique accumulated alpha values occurs gradually. Initially, all of the subsample alphas are set to zero (transparent). The first fragment accumulation can add at most one unique alpha value, resulting in one group of subsamples retaining the initial alpha value and the other group having the same new alpha value. The second fragment accumulation can result in no more than four unique alpha values. Overall, the number of unique subsample alpha values possible after 'n' fragment accumulations is 2n (or, more accurately, MIN(2n, NUM_CVG_BITS)).

This alternate technique uses this characteristic to reduce the number of accumulations required by only performing the color scale and accumulation for each unique alpha value within the subsamples rather than for every subsample. With this technique, at most one accumulate needs to occur for the first fragment, two for the second fragment, four for the third fragment, and so on, up to the number of subsamples in the pixel (e.g., with a 4×4 subsample array the worst case is 16 accumulations per fragment).

The foundation of the technique is to maintain the set of unique alpha values and their associated coverage masks during fragment accumulation, the intent of which is to perform a minimum number of color accumulations.

The alpha and coverage masks are stored in NUM_CVG_BITS element arrays of which some subset of these entries is actually valid (or 'in-use') at any time. The 'in-use' entries are those which hold the current set of unique alpha values. The in-use entries are identified by a NUM_CVG_BITS bit mask where a set bit indicates that the array element at that bit index is in-use. A convention is used in which the first set bit in the coverage mask of a {unique alpha, coverage mask} pair defines which array element that pair is stored in. Consider the following example of how the array is initialized and updated with the accumulation of three fragments (using 4 subsamples):

```
Initial state (X implies a 'don't care' value):
    0b0001       // in-use mask
    { 1., 0b1111 } // alpha, coverage pairs
    { X, 0bXXXX }
    { X, 0bXXXX }
    { X, 0bXXXX }
Accumulate fragment { .5 /* alpha */, 0b0011 /* coverage mask */}
    0b0101       // in-use mask
    { .5, 0b0011 } // alpha, coverage pairs
    { X, 0bXXXX }
    { 1., 0b1100 }
    { X, 0bXXXX }
Accumulate fragment { .3, 0b1000 }
    0b1101       // in-use mask
    { .5, 0b0011 } // alpha, coverage pairs
    { X, 0bXXXX }
    { 1., 0b0100 }
    { .7, 0b1000 }
Accumulate fragment { .8, 0b0101 }
    0b1111       // in-use mask
    { .1, 0b0001 } // alpha, coverage pairs
    { .5, 0b0010 }
    { .2, 0b0100 }
    { .7, 0b1000 }
```

The initial alpha coverage array is set forth below:

| x | 1 |
|---|---|
| x | x |

The in use mask is 0001, which specifies the location where the array mask is stored. The corresponding array mask is as follows:

| xxxx | 1111 |
|------|------|
| xxxx | xxxx |

After fragment 0, the alpha coverage mask appears as follows.

| x | 0.5 |
|---|-----|
| x | 1   |

The in use mask is 0101, and the array mask is as follows:

| xxxx | 0011 |
|------|------|
| xxxx | 1100 |

For elements in the in use mask that are set, the array mask is ANDed with the coverage mask for the new fragment to determine whether there is a change in alpha value. If there is a new alpha, the new value for the array mask is computed by: array mask AND NOT coverage mask. If there is a new value for the array mask, it is stored in the appropriate location.

After fragment 1, the alpha coverage mask appears as follows.

| x   | 0.5 |
|-----|-----|
| 0.7 | 1   |

The in-use mask is 1101, and the array mask is as follows:

| xxxx | 0011 |
|------|------|
| 1000 | 0100 |

After fragment 2, the alpha coverage mask appears as follows.

| 0.5 | 0.1 |
|-----|-----|
| 0.7 | 0.2 |

The in-use mask is 1111, and the array mask is as follows:

| 0010 | 0001 |
|------|------|
| 1000 | 0100 |

The number of unique alpha values at any time is equal to the number of set bits in the in-use mask. The complete solution includes two steps. The first step is performing the necessary color accumulations, where one accumulation is required per 'in-use' entry in the coverage/alpha array. The second step is to update the coverage/alpha array with the new fragment's values.

A complete implementation of this technique (for 4×4 subsamples) is as follows.

```
for (each fragmented pixel location) {
    //   initial state (per pixel)
    InUseMask = 0x0001;
    CoverageArrayMask[16] = { 0xffff, 0, . . . , 0 };
    CoverageArrayAlpha[16] = { MAX_ALPHA, MAX_ALPHA...,
    MAX_ALPHA };
    ColorAccum = 0;
    while (fragment list is not empty) {
        scan fragment list and extract closest fragment (coverage,
            color, alpha);
        // accumulate this fragment's color into ColorAccum
            for each in-use element
        InUseMaskScratch = InUseMask;
        while (InUseMaskScratch != 0x0000) {
            //  find first set bit in scratch in-use mask
            Index = FindFirstSetBit(InUseMaskScratch);
            //  clear this bit in scratch mask
            InUseMaskScratch &= ~(0x1 << Index);
            //  read old (or current) alpha for this entry—this
                is used
            //  in updating the non-covered area (which may be newly
                'in-use')
            AlphaOld = CoverageArrayAlpha[Index];
            //  alpha scale factor—used for scaling color
            //  for accumulation and to compute alpha for
                subsequent layers
            AlphaScale = AlphaOld * alpha;
            //  compute alpha for next layer—use this for updating
                alpha array
            //  AlphaNext = AlphaOld*(MAX_ALPHA-alpha) =
                AlphaOld-AlphaOld*alpha
            AlphaNext = AlphaOld - AlphaScale;
            //  compute mask for overlapped coverage—this is
            //  the portion of this array entry which is covered
            //  by the new fragment, so accumulate the color and
                update the array with new alpha value
            AccumCvgMask = coverage & CoverageArrayMask-
            [Index];
            if(AccumCvgMask != 0x0000) {
                //  accumulate the color
                nCoverageBits = CountSetBits(AccumCvgMask);
                ColorAccum += color*(AlphaScale *
                nCoverageBits/NUM_CVG_BITS));
                //  update alpha for covered portion (this may result in
                //    a 'new' in-use element or just overwrite
                      the old one)
                Index2 = FindFirstSetBit(AccumCvgMask);
                InUseMask |= (0x1 << Index2);
                CoverageArrayMask[Index2] = AccumCvgMask;
                CoverageArrayAlpha[Index2] = AlphaNext;
            }
            //  compute the mask for the non-covered area—this
            //  is the portion of this array entry which is unobscured
            //  by the new fragment, so just update the coverage (the
                alpha stays the same)
            UpdateCvgMask =~coverage & CoverageArrayMask-
            [Index];
            if(UpdateCvgMask!= 0x0000) {
                Index2 = FindFirstSetBit(UpdateCvgMask);
                InUseMask |= (0x1 << Index2);
                //  update for the non-covered area—this may
                //  result in a 'new' in-use element or just
                //  overwrite the old one (thus copy the alpha value
                    in case it is new . . . )
                CoverageArrayMask[Index2] = UpdateCvgMask;
                CoverageArrayAlpha[Index2] = AlphaOld;
            }
        }
    }
    ColorAccum is pixel color
}
```

The core arithmetic operation is the color accumulation, which requires a total of three multiplies per unique alpha value:

ColorAccum+=color*(alpha*AlphaOld*(nCoverageBits/ NUM_CVG_BITS));

Note that the third multiply may be somewhat simplified by the number of subsamples. For 16 subsamples, the third multiply involves 0.4 fixed point value, thus this multiplier can be a 8×4 (where the other multipliers are likely to be 8×8). Also note that, for 2**n sized coverage masks, the division shown above is merely a shift.

This technique requires a worst case total of, $$\sum_{n=1}^{NumFrags} \text{MIN}(2^n, 16)$$

accumulations. The typical case can be much less than this because the worst case occurs only when a new fragment's coverage has both set and unset values in each 'in-use' array element.

One useful optimization is to track coverage mask locations which have filly opaque alpha value. This is useful in the case in which fragments are being generated due to partial geometric coverage and not due to non-opaque transparency values. These fragments will normally have a fully opaque transparency value. Implementing this optimization is done by maintaining an additional mask value, the OpaqueAlphaMask. The OpaqueAlphaMask is set by OR-ing in coverage masks of fragments for which the alpha is fully opaque (this is done after accumulating the fragment's contribution). This mask is then used to disregard bits in the masks of subsequent fragments, since there can be no further color contribution to the corresponding subsamples.

Another possible optimization is to consolidate locations with identical alpha values, but this is significantly more expensive to implement, and the occurrence of identical alpha values which are not either 0 or MAX_ALPHA is not likely.

The example and pseudocode given above use a front-to-back depth sorting. It is equally possible to perform the same computations in a back-to-front depth sorting. Also, the computations given above use color components which have not been pre-multiplied by the alpha component. The same technique applies to pre-multiplied color components, with slightly different arithmetic computations (and identical control flow).

We have described various aspects of an graphics processing system, its architecture, and associated methods with references to several embodiments. While we have described several embodiments in detail, we do not intend to limit our invention to these specific embodiments.

In view of the many possible embodiments to which the principles of our invention may be put, we emphasize that the detailed embodiments described above are illustrative only and should not be taken as limiting the scope of our invention. Rather, we claim as our invention all such embodiments as may come within the scope and spirit of the following claims and equivalents to these claims.

We claim:

1. In a graphics rendering system for rendering geometric primitives to generate an image, a method for merging pixel fragments comprising:

rasterizing geometric primitives to generate pixel fragments having depth, color, and coverage data;

storing lists of selected pixel fragments in a fragment buffer, each list corresponding to a pixel location in the image;

for a first generated pixel fragment at a first pixel location, determining whether a selected pixel fragment in a corresponding list is within a predefined color tolerance, and determining whether the selected pixel fragment is within a predefined depth tolerance;

merging the generated pixel fragment with a first selected pixel fragment within the predefined color tolerance, and the predefined depth tolerance; and storing the merged pixel fragment in the corresponding list structure.

2. The method of claim 1 wherein the selected fragment in the corresponding list is the most recently added fragment to the corresponding list, and wherein the determining step comprises only determining whether the most recently added fragment is within a predefined color tolerance.

3. The method of claim 1 comprising the steps of:

rasterizing the geometric primitives to generate fully covered pixels having depth and color data, including rasterizing sets of the geometric primitives sorted among 2D subregions of the image being rendered;

generating pixel fragments for only one subregion of the image at a time; and storing selected fully covered pixels in a pixel buffer, with memory locations corresponding only to pixel locations in a single subregion.

4. The method of claim 1 comprising the steps of:

rasterizing the geometric primitives to generate pixel data including fully covered pixels having depth and color data;

performing a depth compare operation on the generated fully covered pixels to identify selected fully covered pixels; and storing selected fully covered pixels in a pixel buffer that has memory locations corresponding to only a single subregion of the image and that is reused for subregions in the image.

5. The method of claim 1 further including:

rasterizing the geometric primitives to generate pixel data including fully covered pixels having depth and color data, including rasterizing sets of the geometric primitives sorted among 2D subregions of the image being rendered;

performing a depth compare operation on the generated fully covered pixels to identify selected fully covered pixels;

storing selected fully covered pixels in a pixel buffer; and performing depth compare operations between the generated pixel fragments and corresponding selected fully covered pixels in the pixel buffer to identify the selected pixel fragments to store in the fragment buffer;

wherein pixel fragments are generated for only one subregion of the image at a time, and the fragment buffer is re-used for temporarily storing pixel fragments for subregions in the image.

6. The method of claim 1 wherein the coverage data includes a coverage mask, and the merging step comprises:

combining the coverage mask of the generated pixel fragment with the first selected pixel fragment within the predefined color tolerance, and the predefined depth tolerance; and storing the combined coverage mask in the merged pixel fragment.

7. The method of claim 6 further including:

rasterizing sets of the geometric primitives sorted among 2D subregions of the image being rendered for only one subregion at a time;

determining whether the merged pixel fragment has become a fully covered pixel as a result of the merging step; and if so, storing color and depth of the merged pixel fragment at a corresponding location in the pixel buffer, wherein the pixel buffer includes memory locations only for an array of pixel locations corresponding substantially to dimensions of each of the subregions.

8. The method of claim 1 further including:

resolving the lists of selected pixel fragments in the pixel buffer;

repeating the rasterizing and resolving steps to generate a display image; and generating the display image and subsequent images at rate greater than 10 Hz.

9. The method of claim 8 wherein the rasterizing step includes rasterizing sets of the geometric primitives sorted among 2D subregions of the image being rendered one subregion at a time, and the resolving step is performed for one subregion at a time such that lists of selected pixel fragments are maintained for only one subregion at a time.

10. The method of claim 1 wherein the predefined depth and color tolerances are user adjustable to regulate fragment memory consumption.

11. The method of claim 1 wherein the rasterizing step includes rasterizirig sets of the geometric primitives sorted among 2D subregions of the image being rendered; and further including:

generating pixel fragments for only one subregion of the image at a time; and resolving the pixel fragments generated for one subregion of the image at a time such that pixel fragments are maintained for only one subregion at a time.

12. The method of claim 11 wherein a single rasterization buffer with memory locations corresponding only to pixel locations of a single subregion is used to perform hidden surface removal and pixel resolve operations for each subregion in the image.

13. A system for rendering geometric primitive data to generate an image for a view space, the system comprising:

a rasterization buffer;

a rasterizer operable to receive geometric primitives and operable to rasterize the geometric primitives to produce pixel fragments including color, depth, and coverage data;

a pixel engine in communication with the rasterizer to receive the pixel fragments, operable to perform a depth compare operation to determine whether to store the pixel fragments in the rasterization buffer, the pixel engine in communication with the rasterization buffer to read stored pixel fragments, operable to compare a pixel fragment generated by the rasterizer with at least a first pixel fragment stored in the rasterization buffer to determine whether the generated pixel fragment is within a color tolerance, and operable to merge the generated pixel fragment with one of the pixel fragments stored in the rasterization buffer.

14. The system of claim 13 wherein the rasterization buffer includes a pixel buffer operable to store color and depth data for fully covered pixel locations in the view space, and a fragment buffer operable to store color, depth, and coverage data for partially covered pixel locations in the view space.

15. The system of claim 14 wherein the fragment buffer is operable for storing lists of the pixel fragments, the lists corresponding to one of the pixel locations in the view space.

16. The system of claim 13 wherein the pixel engine includes a comparator circuit to perform the depth compare operation.

17. The system of claim 13 wherein the pixel engine includes a comparator circuit to compare a pixel fragment generated by the rasterizer with at least a first pixel fragment stored in the rasterization buffer to determine whether the generated pixel fragment is within a color tolerance.

18. The system of claim 13 wherein the pixel engine includes a first comparator circuit to compare the pixel fragment generated by the rasterizer with at least the first pixel fragment stored in the rasterization buffer to determine whether the generated pixel fragment is within a color tolerance, and a second comparator circuit to compare the pixel fragment generated by the rasterizer with at least the first pixel fragment stored in the rasterization buffer to determine whether the generated pixel fragment is within a depth tolerance.

19. The system of claim 13 wherein the pixel engine is operable to maintain the most recent fragment stored in the rasterization buffer for each pixel location in the image, and wherein the pixel engine is operable to merge only the most fragment stored in the rasterization buffer for a pixel location corresponding to a pixel location of the generated fragment.

20. The system of claim 13 wherein the rasterizer is operable to rasterize sets of the geometric primitives sorted among 2D subregions of the image being rendered one subregion at a time and the rasterzation buffer only maintains pixel fragments for only one subregion at a time.

21. The system of claim 20 wherein the rasterizer and an antialiasing engine for resolving pixel fragments for a subregion are operable to generate a new image from an updated group of geometric primitives at a rate of greater than 10 Hz.

22. A system for rendering geometric primitive data to generate an image for a view space, the system comprising:

a rasterization buffer including a pixel buffer operable to store pixel records having color and depth data only for pixel locations in a subregion of the image, and a fragment buffer operable to store lists of fragment records corresponding to the pixel locations, the fragment records including color, coverage and depth data for partially cove red pixel locations;

a rasterizer operable to receive geometric primitives and operable to rasterize the geometric primitives to produce pixel data including color, depth, and coverage data, operable to rasterize sets of the geometric primitives sorted among 2D subregions of the image being rendered one subregion at a time;

a pixel engine in communication with the rasterzer to receive the pixel data, operable to perform a depth compare operation to determine whether to store the pixel data as pixel records or fragment records in the rasterization buffer, the pixel engine in communication with the rasterization buffer to read stored fragment records, operable to compare color data for a partially covered pixel location generated by the rasterizer with at least a first fragment record stored in the fragment buffer to determine whether the color data is within a color tolerance, and operable to merge the color data with one of the fragment records stored in the fragment buffer.

23. In an image processing system for rendering geometric primitives to generate an image, a method for merging pixel fragments comprising:

rasterizing sets of geometric primitives sorted amond 2D subregions of the image to generate pixel data including color, depth, and coverage data, the pixel data corresponding to pixel locations in the subregion of the image being rasterized;

storing pixel records for fully covered pixels in memory elements of a pixel buffer, where the number of memory elements in the pixel buffer correspond approximately to M×N where M and N are dimensions of the subregions;

storing fragment records in a fragment buffer for partially covered pixels or pixels having translucency in linked lists corresponding to the memory elements of the pixel buffer, wherein fragment records are stored for only the subregion being rasterized;

for incoming pixel data generated in the rasterizing step, performing depth compare operations between the incoming pixel data and corresponding pixel records stored in the pixel buffer to determine whether to replace pixel records stored in the pixel buffer, and to determine whether to add fragment records to corresponding fragment lists;

before adding a new fragment record to a corresponding list, determining whether a fragment record added to the corresponding list is within a predefined color tolerance and a predefined depth tolerance relative to the color and depth of the new fragment;

merging the new fragment with the fragment record most recently added to the corresponding list when the new fragment is within the predefined color tolerance, and the predefined depth tolerance; and storing the merged fragment record in the corresponding list structure.

* * * * *

UNITED STATES PATENT AND TRADEMARK OFFICE
CERTIFICATE OF CORRECTION

PATENT NO.   : 5,990,904
DATED        : November 23, 1999
INVENTOR(S)  : Kent E. Griffin It is certified that error appears in the above-identified patent and that said Letters Patent is hereby corrected as shown below:

Title page 2,
Line 3, "uri" should read -- url --.

Column 1,
Line 61, "interconnected polygons,." should read -- interconnected polygons. --.

Column 3,
Line 4, "a continuos object" should read -- a continuous object --.
Line 18, "depth order *and" should read -- depth order and --.
Line 42, "stored in the z" should read -- stored in the Z --.
Line 45, "If :not," should read -- If not, --.
Line 66, "One type data type" should read -- One data type --.

Column 4,
Line 7, "prirnitives" should read -- primitives --.

Column 5,
Line 16, "color, depth.," should read -- color, depth, --.

Column 6,
Line 36, "are a flow" should read -- are flow --.

Column 11,
Line 37, "implemented on board" should read -- implemented on a board --.
Line 57, "implement our the image" should read -- implement the image --.

Column 12,
Line 17, "includes fuinctions" should read -- includes functions --.

Column 13,
Line 27, "5A and SB" should read -- 5A and 5B --.

Column 14,
Line 43, "step is determine" should read -- step is to determine --.
Line 46, "by transforms" should read -- by transforming --.

UNITED STATES PATENT AND TRADEMARK OFFICE
CERTIFICATE OF CORRECTION

PATENT NO. : 5,990,904
DATED : November 23, 1999
INVENTOR(S) : Kent E. Griffin

It is certified that error appears in the above-identified patent and that said Letters Patent is hereby corrected as shown below:

Column 17,
Line 33, "R G B (alpha)" should read -- R G B α (alpha) --.
Line 54, "image procession" should read -- image processing --.

Column 19,
Line 66, "10 and 111" should read -- 10 and 11 --.

Column 26,
Line 25, "of entries" should read -- entries --.

Column 27,
Line 38, "(R G B)" should read -- (R G B α) --.

Column 28,
Line 40, "either a 2X2 or" should read -- either a 2 by 2 or --.

Column 29,
Line 2, "1344=32" should read -- 1344X32 --.

Column 30,
Line 51, "can implemented" should read -- can be implemented --.

Column 35,
Line 10, "pre-computed tabled" should read -- pre-computed table --.

Column 36,
Line 24, "is the closer" should read -- is closer --.

Column 38,
Line 35, "z-buffer" should read -- Z-buffer --.

Column 42,
Line 67, "separately is." should read -- separately is --.

UNITED STATES PATENT AND TRADEMARK OFFICE
CERTIFICATE OF CORRECTION

PATENT NO. : 5,990,904
DATED : November 23, 1999
INVENTOR(S) : Kent E. Griffin

It is certified that error appears in the above-identified patent and that said Letters Patent is hereby corrected as shown below:

Column 43,
Line 17, "AlphAccum" should read -- AlphaAccum --.
Line 30, "in table" should read -- in the table --.
Line 36, "color--$C^2$" should read -- color=$C^2$ --.

Column 46,
Line 10, "follows." should read -- follows: --.
Line 32, "follows." should read -- follows: --.
Line 45, "follows." should read -- follows: --.
Line 67, "follows." should read -- follows: --.

Column 50,
Line 12, "at rate" should read -- at a rate --.

Column 52,
Line 14, "sorted amond" should read -- sorted among --.

Signed and Sealed this

Ninth Day of October, 2001

*Attest:*

NICHOLAS P. GODICI
*Attesting Officer*    *Acting Director of the United States Patent and Trademark Office*

UNITED STATES PATENT AND TRADEMARK OFFICE
CERTIFICATE OF CORRECTION

PATENT NO. : 5,990,904
DATED : November 23, 1999
INVENTOR(S) : Kent E. Griffin

It is certified that error appears in the above-identified patent and that said Letters Patent is hereby corrected as shown below:

<u>Title page 2,</u>
Line 3, "uri" should read -- url --.

<u>Column 1,</u>
Line 61, "interconnected polygons,." should read -- interconnected polygons. --.

<u>Column 3,</u>
Line 4, "a continuos object" should read -- a continuous object --.
Line 18, "depth order *and" should read -- depth order and --.
Line 42, "stored in the z" should read -- stored in the Z --.
Line 45, "If :not," should read -- If not, --.
Line 66, "One type data type" should read -- One data type --.

<u>Column 4,</u>
Line 7, "prirnitives" should read -- primitives --.

<u>Column 5,</u>
Line 16, "color, depth.," should read -- color, depth, --.

<u>Column 6,</u>
Line 36, "are a flow" should read -- are flow --.

<u>Column 11,</u>
Line 37, "implemented on board" should read -- implemented on a board --.
Line 57, "implement our the image" should read -- implement the image --.

<u>Column 12,</u>
Line 17, "includes fuinctions" should read -- includes functions --.

<u>Column 13,</u>
Line 27, "5A and SB" should read -- 5A and 5B --.

<u>Column 14,</u>
Line 43, "step is determine" should read -- step is to determine --.
Line 46, "by transforms" should read -- by transforming --.

UNITED STATES PATENT AND TRADEMARK OFFICE
CERTIFICATE OF CORRECTION

PATENT NO. : 5,990,904
DATED : November 23, 1999
INVENTOR(S) : Kent E. Griffin

It is certified that error appears in the above-identified patent and that said Letters Patent is hereby corrected as shown below:

Column 17,
Line 33, "R G B (alpha)" should read -- R G B α (alpha) --.
Line 54, "image procession" should read -- image processing --.

Column 19,
Line 66, "10 and 111" should read -- 10 and 11 --.

Column 26,
Line 25, "of entries" should read -- entries --.

Column 27,
Line 38, "(R G B)" should read -- (R G B α) --.

Column 28,
Line 40, "either a 2X2 or" should read -- either a 2 by 2 or --.

Column 29,
Line 2, "1344=32" should read -- 1344X32 --.

Column 30,
Line 51, "can implemented" should read -- can be implemented --.

Column 35,
Line 10, "pre-computed tabled" should read -- pre-computed table --.

Column 36,
Line 24, "is the closer" should read -- is closer --.

Column 38,
Line 35, "z-buffer" should read -- Z-buffer --.

Column 42,
Line 67, "separately is." should read -- separately is --.

UNITED STATES PATENT AND TRADEMARK OFFICE
CERTIFICATE OF CORRECTION

PATENT NO. : 5,990,904
DATED : November 23, 1999
INVENTOR(S) : Kent E. Griffin

It is certified that error appears in the above-identified patent and that said Letters Patent is hereby corrected as shown below:

Column 43,
Line 17, "AlphAccum" should read -- AlphaAccum --.
Line 30, "in table" should read -- in the table --.
Line 36, "color--$C^2$" should read -- color=$C^2$ --.

Column 46,
Line 10, "follows." should read -- follows: --.
Line 32, "follows." should read -- follows: --.
Line 45, "follows." should read -- follows: --.
Line 67, "follows." should read -- follows: --.

Column 50,
Line 12, "at rate" should read -- at a rate --.

Column 52,
Line 14, "sorted amond" should read -- sorted among --.

Signed and Sealed this

Sixth Day of November, 2001

Attest:

NICHOLAS P. GODICI
*Attesting Officer*   *Acting Director of the United States Patent and Trademark Office*